(12) United States Patent
Oba

(10) Patent No.: US 12,717,335 B2
(45) Date of Patent: Aug. 25, 2026

(54) INFORMATION PROCESSING SYSTEM AND INFORMATION PROCESSING DEVICE

(71) Applicant: SONY SEMICONDUCTOR SOLUTIONS CORPORATION, Kanagawa (JP)

(72) Inventor: Eiji Oba, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 195 days.

(21) Appl. No.: 18/571,808

(22) PCT Filed: Jun. 28, 2022

(86) PCT No.: PCT/JP2022/025754
§ 371 (c)(1),
(2) Date: Dec. 19, 2023

(87) PCT Pub. No.: WO2023/277012
PCT Pub. Date: Jan. 5, 2023

(65) Prior Publication Data

US 2024/0280997 A1 Aug. 22, 2024

(30) Foreign Application Priority Data

Jun. 28, 2021 (JP) ................................ 2021-106749

(51) Int. Cl.
*G05D 1/224* (2024.01)
*B62D 15/02* (2006.01)
(Continued)

(52) U.S. Cl.
CPC ......... *G05D 1/2242* (2024.01); *B62D 15/025* (2013.01); *G05D 1/2243* (2024.01);
(Continued)

(58) Field of Classification Search
CPC .. G05D 1/2242; G05D 1/2243; G05D 1/2245; G05D 2105/22; G05D 2107/13;
(Continued)

(56) References Cited

U.S. PATENT DOCUMENTS 9,682,761 B2 * 6/2017 Okuda ................ G01C 21/203
2017/0078465 A1 * 3/2017 Ito ......................... B60K 35/10
(Continued)

FOREIGN PATENT DOCUMENTS

CN 207843056 U 9/2018
CN 209142009 U 7/2019
(Continued)

OTHER PUBLICATIONS

International Search Report and Written Opinion of PCT Application No. PCT/JP2022/025754, issued on Aug. 9, 2022, 11 pages of ISRWO.

*Primary Examiner* — Dale W Hilgendorf
(74) *Attorney, Agent, or Firm* — CHIP LAW GROUP

(57) ABSTRACT

There is provided an information processing system for remotely steering a mobile body, the information processing system including an information acquisition unit that acquires information concerning the mobile body and information concerning a periphery of the mobile body and an information generation unit that generates, based on the acquired information, tactile information for performing the remote steering and presents the generated tactile information to an operator who performs the remote steering via an interface corresponding to the tactile information.

18 Claims, 29 Drawing Sheets

(51) Int. Cl.
*G05D 105/22* (2024.01)
*G05D 107/13* (2024.01)
*G05D 109/10* (2024.01)

(52) U.S. Cl.
CPC ......... *G05D 1/2245* (2024.01); *G05D 1/2247* (2024.01); *G05D 2105/22* (2024.01); *G05D 2107/13* (2024.01); *G05D 2109/10* (2024.01)

(58) Field of Classification Search
CPC . G05D 2109/10; G05D 1/2247; B62D 15/025
See application file for complete search history.

(56) References Cited

U.S. PATENT DOCUMENTS

2018/0095457 A1* 4/2018 Lee .................... B60W 50/029
2018/0267558 A1* 9/2018 Tiwari .................. H04N 23/90
2018/0364702 A1* 12/2018 Liu ....................... G07C 5/008
2019/0019349 A1* 1/2019 Dolgov ................ G05D 1/2247
2019/0241190 A1* 8/2019 Fung ..................... G06V 40/70
2019/0265710 A1* 8/2019 Kaneko ............... B60W 50/082
2019/0304309 A1* 10/2019 Sakamoto ............. B60W 30/16
2019/0389508 A1 12/2019 Varunjikar
2020/0010061 A1* 1/2020 Tiwari ................ B60W 10/192
2020/0307644 A1* 10/2020 Hattori .................. B60W 50/16
2021/0088784 A1* 3/2021 Whitmire ............. G02B 27/017
2021/0089049 A1* 3/2021 Gu ....................... G05D 1/0214
2021/0191403 A1* 6/2021 Rastoll ................. G05D 1/0223
2023/0017970 A1* 1/2023 Oba .................. G01C 21/3626
2023/0060236 A1* 3/2023 Fukudome .......... B60W 40/109
2025/0109002 A1* 4/2025 Anderson-Sprecher .................... G05D 1/0246

FOREIGN PATENT DOCUMENTS

DE 102018215556 A1 3/2020
EP 3772678 A1 2/2021
JP 2018086920 A 6/2018
JP 2018-140755 A 9/2018
JP 2020-072401 A 5/2020
JP 2020-167551 A 10/2020
WO 2018/155159 A1 8/2018

* cited by examiner

FIG.1

| AUTOMATIC DRIVING LEVEL | NAME | | EXECUTION SUBJECT OF DRIVING TASK | MONITORING SUBJECT RELATING TO SAFE DRIVING |
|---|---|---|---|---|
| 0 | MANUAL DRIVING (DIRECT DRIVING STEERING) | NO DRIVING SUPPORT | DRIVER | DRIVER |
| 1 | MANUAL DRIVING (DIRECT DRIVING STEERING) | WITH DRIVING SUPPORT (AUTOMATIC BRAKE, ACC, LKAS, AND THE LIKE) | DRIVER | DRIVER |
| 2 | AUTOMATIC DRIVING FUNCTION UNDER SPECIFIC CONDITION (PARTIAL DRIVING AUTOMATION) | | DRIVER (PARTIAL SYSTEM) | DRIVER |
| 3 | CONDITIONAL AUTOMATIC DRIVING | | SYSTEM | SYSTEM (PARTIAL DRIVER) |
| 4 | FULLY AUTOMATIC DRIVING UNDER SPECIFIC CONDITION (ADVANCED DRIVING AUTOMATION) | | SYSTEM | SYSTEM |

103B
102B
101B
102R
102L
103R
103L
101F
102F
103F
1
106
105

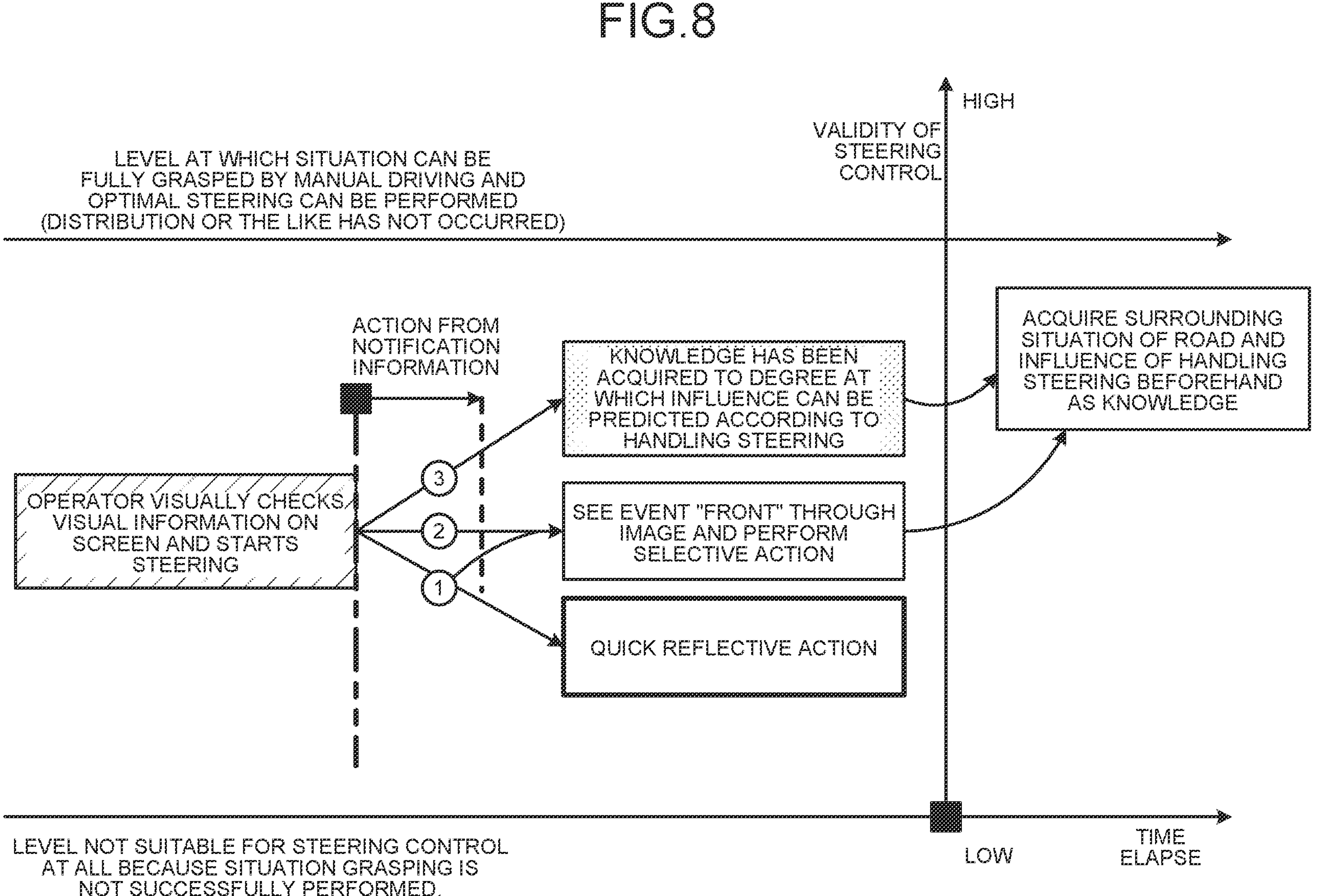
FIG.8
LEVEL AT WHICH SITUATION CAN BE FULLY GRASPED BY MANUAL DRIVING AND OPTIMAL STEERING CAN BE PERFORMED (DISTRIBUTION OR THE LIKE HAS NOT OCCURRED)
VALIDITY OF STEERING CONTROL
HIGH
ACTION FROM NOTIFICATION INFORMATION
OPERATOR VISUALLY CHECKS VISUAL INFORMATION ON SCREEN AND STARTS STEERING
3
2
1
KNOWLEDGE HAS BEEN ACQUIRED TO DEGREE AT WHICH INFLUENCE CAN BE PREDICTED ACCORDING TO HANDLING STEERING
SEE EVENT "FRONT" THROUGH IMAGE AND PERFORM SELECTIVE ACTION
QUICK REFLECTIVE ACTION
ACQUIRE SURROUNDING SITUATION OF ROAD AND INFLUENCE OF HANDLING STEERING BEFOREHAND AS KNOWLEDGE
LEVEL NOT SUITABLE FOR STEERING CONTROL AT ALL BECAUSE SITUATION GRASPING IS NOT SUCCESSFULLY PERFORMED.
LOW
TIME ELAPSE

STOP ON ROAD SHOULDER AND THE LIKE PROHIBITED

HANDOVER COMPLETION LIMIT POINT

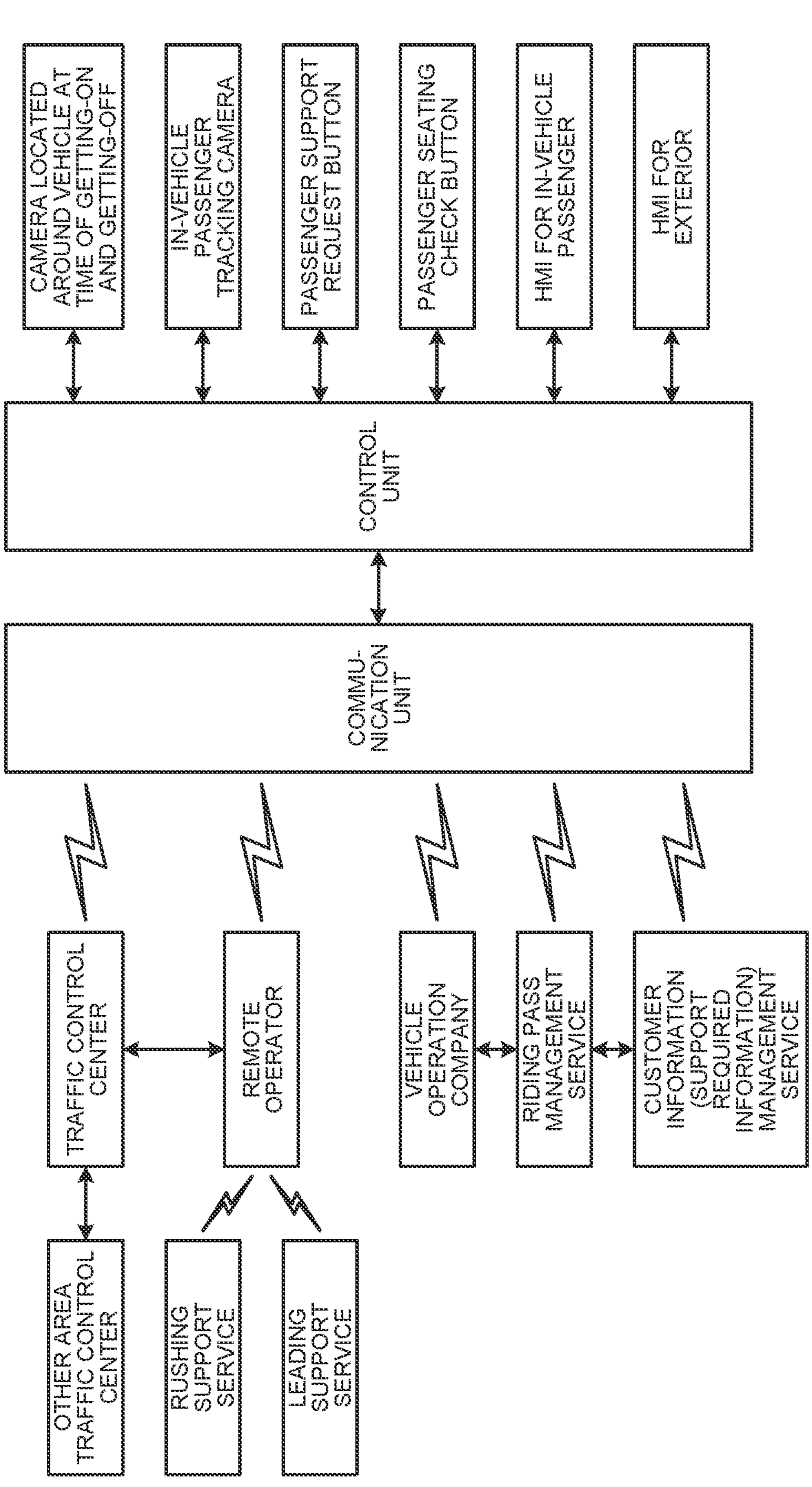
FIG.19
CAMERA LOCATED AROUND VEHICLE AT TIME OF GETTING-ON AND GETTING-OFF
IN-VEHICLE PASSENGER TRACKING CAMERA
PASSENGER SUPPORT REQUEST BUTTON
PASSENGER SEATING CHECK BUTTON
HMI FOR IN-VEHICLE PASSENGER
HMI FOR EXTERIOR
CONTROL UNIT
COMMU-NICATION UNIT
TRAFFIC CONTROL CENTER
REMOTE OPERATOR
VEHICLE OPERATION COMPANY
RIDING PASS MANAGEMENT SERVICE
CUSTOMER INFORMATION (SUPPORT REQUIRED INFORMATION) MANAGEMENT SERVICE
OTHER AREA TRAFFIC CONTROL CENTER
RUSHING SUPPORT SERVICE
LEADING SUPPORT SERVICE

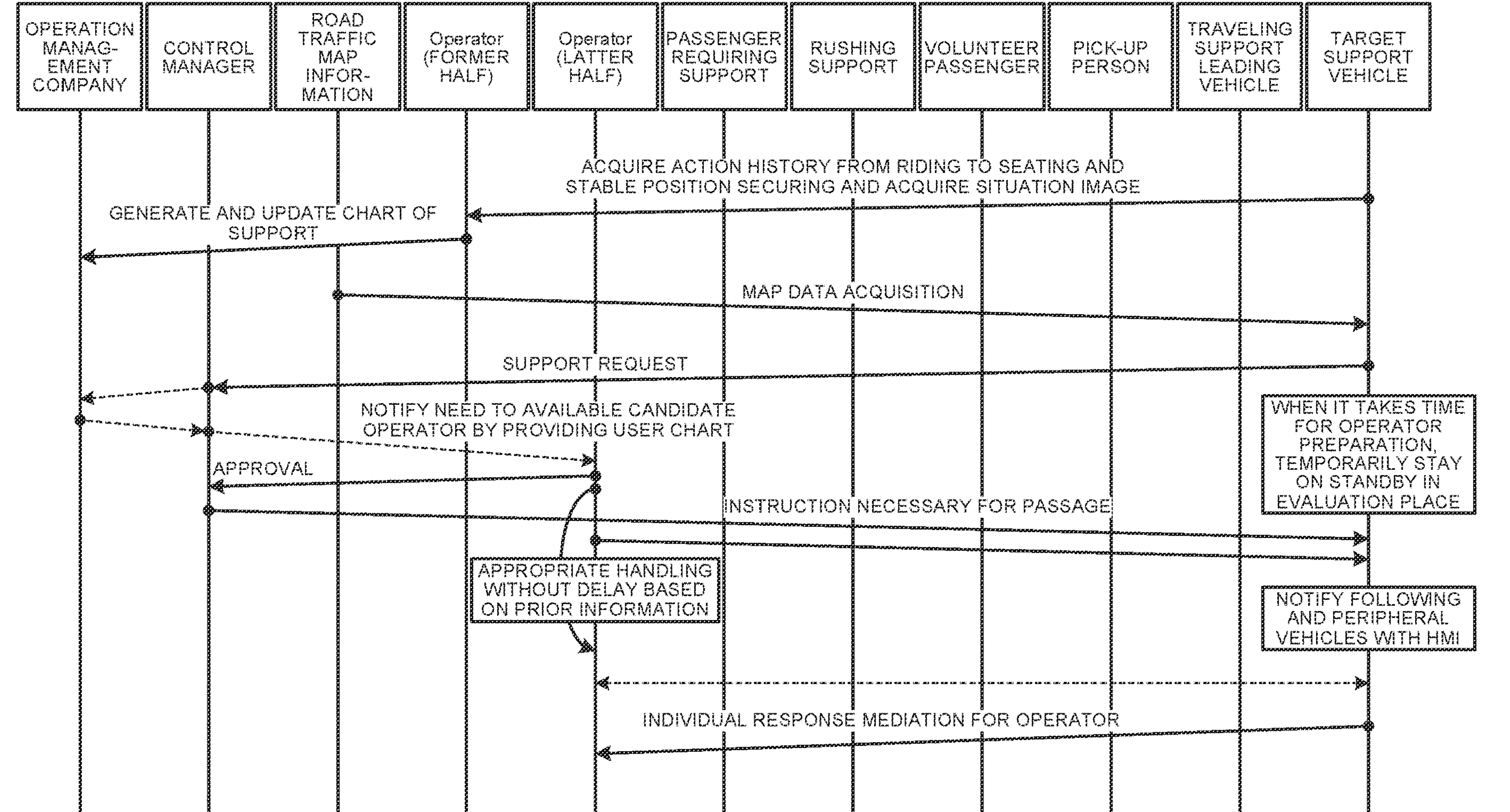
FIG.21B
OPERATION MANAG-EMENT COMPANY
CONTROL MANAGER
ROAD TRAFFIC MAP INFOR-MATION
Operator (FORMER HALF)
Operator (LATTER HALF)
PASSENGER REQUIRING SUPPORT
RUSHING SUPPORT
VOLUNTEER PASSENGER
PICK-UP PERSON
TRAVELING SUPPORT LEADING VEHICLE
TARGET SUPPORT VEHICLE
ACQUIRE ACTION HISTORY FROM RIDING TO SEATING AND STABLE POSITION SECURING AND ACQUIRE SITUATION IMAGE
GENERATE AND UPDATE CHART OF SUPPORT
MAP DATA ACQUISITION
SUPPORT REQUEST
NOTIFY NEED TO AVAILABLE CANDIDATE OPERATOR BY PROVIDING USER CHART
WHEN IT TAKES TIME FOR OPERATOR PREPARATION, TEMPORARILY STAY ON STANDBY IN EVALUATION PLACE
APPROVAL
INSTRUCTION NECESSARY FOR PASSAGE
APPROPRIATE HANDLING WITHOUT DELAY BASED ON PRIOR INFORMATION
NOTIFY FOLLOWING AND PERIPHERAL VEHICLES WITH HMI
INDIVIDUAL RESPONSE MEDIATION FOR OPERATOR 500
592
580
582
584
562
550

500
594
580
574
562
550

INFORMATION PROCESSING SYSTEM AND INFORMATION PROCESSING DEVICE

CROSS REFERENCE TO RELATED APPLICATIONS

This application is a U.S. National Phase of International Patent Application No. PCT/JP2022/025754 filed on Jun. 28, 2022, which claims priority benefit of Japanese Patent Application No. JP 2021-106749 filed in the Japan Patent Office on Jun. 28, 2021. Each of the above-referenced applications is hereby incorporated herein by reference in its entirety.

FIELD

The present disclosure relates to an information processing system and an information processing device.

BACKGROUND

In recent years, technology concerning automatic driving has been actively developed. The automatic driving technology is a technology for automatically traveling on a road using a control system mounted on a vehicle (a mobile body) and is predicted to rapidly spread in the future.

CITATION LIST

Patent Literature

Patent Literature 1: JP 2020-72401 A

SUMMARY

Technical Problem

However, in the present situation, it is difficult to handle all situations with the automatic driving technology and, when a user (a driver) riding the vehicle cannot operate the vehicle, support for remotely steering the vehicle (the mobile body) with an external operator or the like is considered to be necessary. However, since the operator does not continuously ride the actual vehicle, it is difficult for the operator to accurately grasp a situation of the vehicle and a situation around the vehicle and perform appropriate remote steering. Therefore, the present disclosure proposes an information processing system and an information processing device that enable an operator to quickly and accurately grasp a situation of a vehicle and a situation around the vehicle and shift to appropriate remote steering.

Solution to Problem

According to the present disclosure, there is provided an information processing system for performing remote steering of a mobile body. The information processing system includes an information acquisition unit that acquires information concerning the mobile body and information concerning a periphery of the mobile body; and an information generation unit that generates, based on the acquired information, tactile information for performing the remote steering and presents, via an interface corresponding to the tactile information, the generated tactile information to an operator who performs the remote steering.

Furthermore, according to the present disclosure, there is provided an information processing device for performing remote steering of a mobile body. The information processing device includes an information acquisition unit that acquires information concerning the mobile body and information concerning a periphery of the mobile body; and an information generation unit that generates, based on the acquired information, tactile information for performing the remote steering and presents the generated tactile information to an operator who performs the remote steering via an interface corresponding to the tactile information.

Note that the information presented to the operator who performs the remote steering is not limited to information transmitted from ae vehicle (the mobile body) and includes information acquired by a section leading vehicle or the like.

BRIEF DESCRIPTION OF DRAWINGS

FIG. 1 is an explanatory diagram for explaining an example of automatic driving levels.

FIG. 8 is an explanatory diagram for explaining action determination by the operator.

FIG. 14 is an explanatory diagram (part 3) for explaining the example of the HMI according to the first embodiment of the present disclosure.

Figure 15:
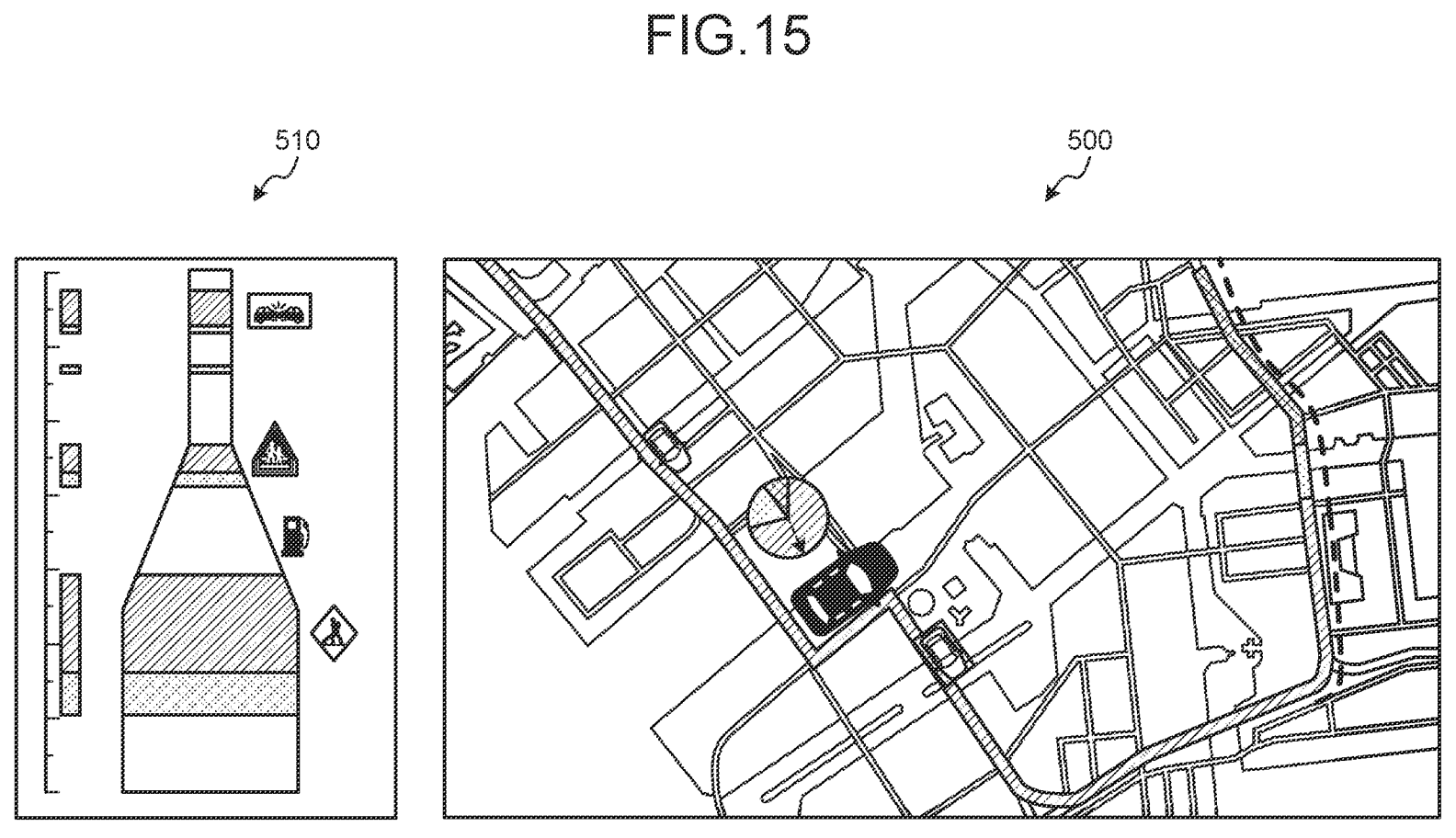

FIG. 15 is an explanatory diagram (part 4) for explaining the example of the HMI according to the first embodiment of the present disclosure.

FIG. 19 is an explanatory diagram illustrating an overview of an information processing system according to the second embodiment of the present disclosure.

FIG. 21B is a sequence chart (part 2) for explaining the processing procedure according to the second embodiment of the present disclosure.

DESCRIPTION OF EMBODIMENTS

Figure 2:
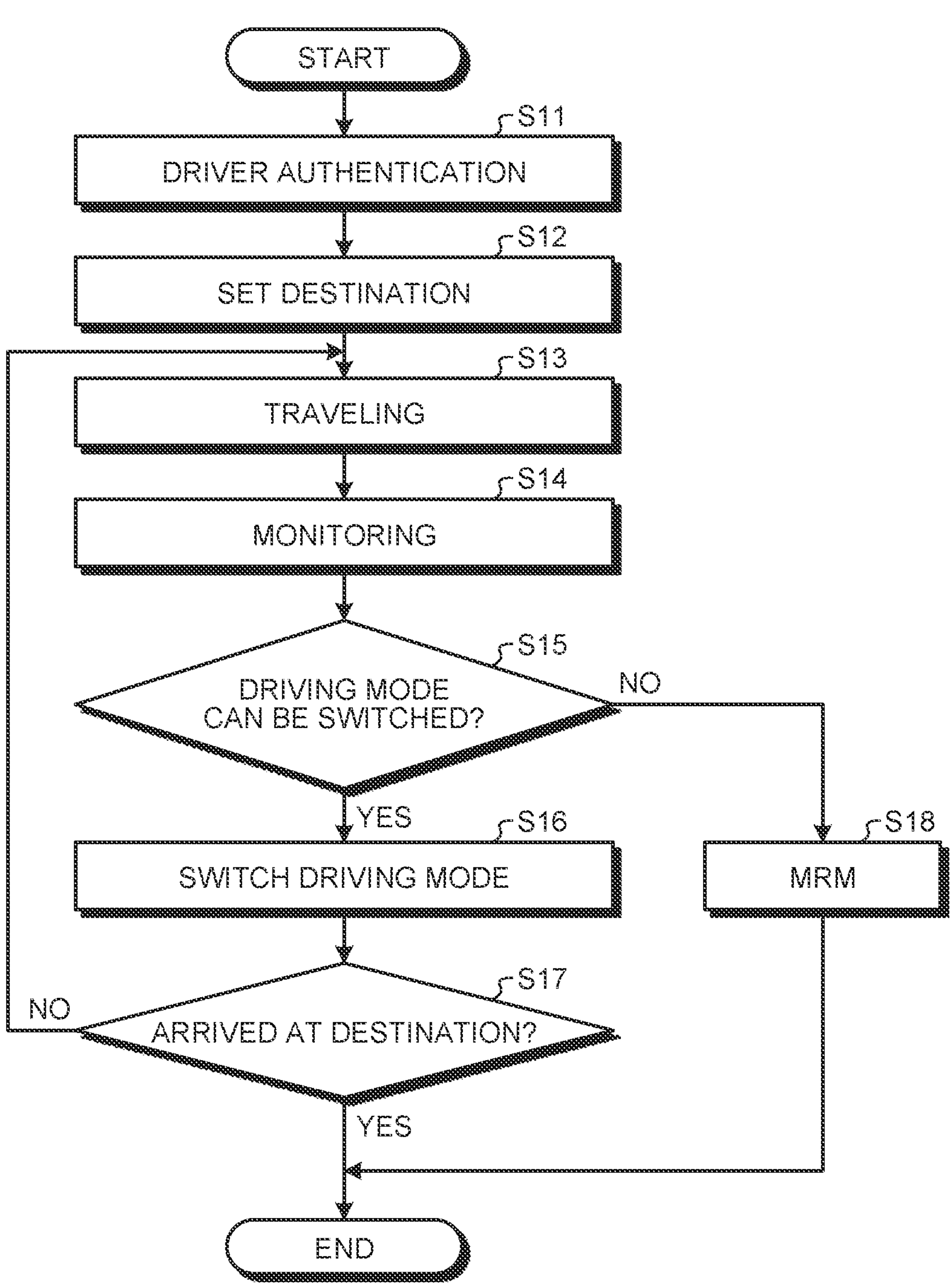
FIG. 2 is a flowchart for explaining an example of traveling according to an embodiment of the present disclosure.

Preferred embodiments of the present disclosure are explained in detail below with reference to the accompanying drawings. Note that, in the present specification and the drawings, components having substantially the same functional configurations are denoted by the same reference numerals and signs, whereby redundant explanation of the components is omitted. In addition, in the present specification and the drawings, a plurality of components having substantially the same or similar functional configurations are sometimes distinguished by attaching different alphabets after the same reference numerals. However, when it is not particularly necessary to distinguish each of the plurality of components having substantially the same or similar functional configurations, only the same reference numerals and signs are attached.

Note that, in the embodiment of the present disclosure, a case in which the present disclosure is applied to automatic driving of an automobile is explained as an example. However, the embodiment of the present disclosure is not limited to be applied to the automobile and can be applied to mobile bodies such as an automobile, an electric vehicle, a hybrid electric vehicle, a motorcycle, a personal mobility, an airplane, a ship, a construction machine, and an agricultural machine (a tractor).

Note that the explanation is made in the following order.

1. Example of automatic driving levels
2. Example of traveling
3. Example of transition of the automatic driving levels
4. Configuration example of a vehicle control system
5. Background leading to creation of embodiments of present
disclosure
6. First Embodiment
   6.1 Control center
   6.2 Overview of a work procedure of an operator
   6.3 Action determination
   6.4 LSAD
   6.5 Detailed configuration of a server
   6.6 Details of processing procedure
   6.7 Details of an HMI
7. Second Embodiment
8. Summary
9. Hardware configuration
10. Supplement

1. Example of Automatic Driving Levels

First, before details of an embodiment of the present disclosure are explained, automatic driving levels of an automatic driving technology are explained with reference to FIG. 1. FIG. 1 is an explanatory diagram for explaining an example of the automatic driving levels. FIG. 1 illustrates automatic driving levels defined by the society of automotive engineers (SAE). Note that, in the following explanation, the automatic driving levels defined by the SAE are basically referred to. However, in study of the automatic driving levels illustrated in FIG. 1, problems and validity in the case in which the automatic driving technology is widely spread are not thoroughly examined. Therefore, in the following explanation, based on these problems and the like, there are some parts that are not necessarily explained by interpretation as defined in the SAE.

In the present specification, vehicle traveling is not roughly divided into the two types of the manual driving and the automatic driving explained above but is classified in stages according to contents of tasks automatically performed by a system side. For example, as illustrated in FIG. 1, it is assumed that the automatic driving levels are classified into, for example, five stages of a level 0 to a level 4 (note that, when a level at which unmanned automatic driving is possible is included, classified into six stages). First, the automatic driving level 0 is manual driving without driving support by the vehicle control system (direct driving steering of a driver). The driver executes all driving tasks and also executes monitoring relating to safe driving (for example, an action of avoiding danger).

Subsequently, the automatic driving level 1 is manual driving (direct driving steering) in which driving support (automatic brake, adaptive cruise control (ACC), lane keeping assistant system (LKAS) and the like) by the vehicle control system can be executed. The driver executes all driving tasks other than a supported single function and also executes monitoring relating to safe driving.

Next, the automatic driving level 2 is also referred to as "partial driving automation". In the automatic driving level 2, the vehicle control system executes a sub-task of a driving task relating to vehicle control in both the front-rear direction and the left-right direction of the vehicle under a specific condition. For example, in the automatic driving level 2, the vehicle control system controls both steering operation and acceleration and deceleration in cooperation (for example, cooperation between the ACC and the LKAS). However, even in the automatic driving level 2, an execution subject of the driving task is basically the driver and a subject of monitoring relating to safe driving is also the driver.

The automatic driving level 3 is also referred to as "conditional automatic driving". In the automatic driving level 3, the vehicle control system can execute all the driving tasks in a limited region in which conditions for enabling the vehicle control system to perform handling with functions mounted on the vehicle are satisfied. In the automatic driving level 3, an execution subject of the driving tasks is the vehicle control system and a subject of monitoring relating to safe driving is also basically the vehicle control system. However, in this level, the vehicle control system is not requested to perform handling under all situations. A user (the driver) at the time of the preliminary response is expected to appropriately respond to an intervention request or the like of the vehicle control system and, in some cases, is requested to respond to a system failure called a so-called silent failure in which the vehicle control system cannot autonomously find.

Incidentally, in the automatic driving level 3 defined by the SAE, what kind of secondary task (here, the "secondary task" is an operation other than an action concerning driving performed by the driver during traveling) the driver can actually execute is not clearly defined. Specifically, the driver is considered to be able to perform work and actions other than steering, for example, secondary tasks such as operation of a portable terminal, a telephone conference, video viewing, reading, a game, thought, and conversation with other passengers during traveling in the automatic driving level 3. On the other hand, in the range of the definition of the automatic driving level 3 of the SAE, it is expected that the driver appropriately takes measures for, for example, performing driving operation in response to a request or the like from the vehicle control system side due to a system failure, deterioration in a traveling environment, or the like. Therefore, in the automatic driving level 3, in order to ensure safe traveling, even in a situation in which the secondary tasks explained above are executed, the driver is expected to always maintain a preparation state in which the driver is capable of immediately returning to the manual driving.

Further, the automatic driving level 4 is also referred to as "advanced driving automation". In the automatic driving level 4, the vehicle control system executes all driving tasks within a limited region. In the automatic driving level 4, an execution subject of the driving tasks is the vehicle control system and a subject of monitoring relating to safe driving is also the vehicle control system. However, in the automatic driving level 4, unlike the automatic driving level 3 explained above, it is not expected that the driver takes measures for, for example, performing driving the operation (the manual driving) in response to a request or the like from the vehicle control system side due to a system failure or the like. Therefore, in the automatic driving level 4, the driver is capable of performing the secondary tasks explained above and, depending on a situation, for example, is capable of taking a nap in a section where conditions are satisfied.

As explained above, in the automatic driving level 0 to the automatic driving level 2, the driver travels in the manual driving mode in which the driver independently executes all or a part of the driving tasks. Therefore, in these three automatic driving levels, the driver is not allowed to engage in the secondary tasks that are actions other than the manual driving and motions relating thereto that, for example, deteriorates attention or impairs forward attention during traveling.

On the other hand, in the automatic driving level 3, the driver travels in the automatic driving mode in which the vehicle control system independently executes all the driving tasks. However, as explained above, in the automatic driving level 3, a situation can occur in which the driver performs the driving operation. Therefore, in the automatic driving level 3, when the secondary tasks are allowed for the driver, the driver is requested to be in the preparation state in which the driver can return from the secondary tasks to the manual driving.

Further, when it is assumed that a situation in which the vehicle traveling in the automatic driving level 4 is allowed is satisfied, the driver travels in the automatic driving mode in which the vehicle control system executes all the driving tasks. However, since a situation dynamically changes because of a maintenance situation in an actual road infrastructure, a change in weather, a change in performance of the vehicle itself due to a flying stone, a flying object, or the like, a section in which the automatic driving level 4 cannot be applied to a part of a travel route is sometimes found halfway in a travel itinerary. In such a case, before approaching and entering the relevant section, for example, the driver is requested to set and transition the section to the automatic driving level 2 or the lower level recognized depending on conditions. Then, in the section set to the automatic driving level 2 or the lower level in this way, the driver is requested to independently execute the driving tasks. That is, even in the automatic driving level 4, since the situation changes from moment to moment halfway in the itinerary as explained above, even halfway in an itinerary planned in advance as the automatic driving level 4, the transition to the automatic driving level 2 or the lower level can actually occur. Therefore, the driver is requested to shift to the preparation state in which the driver can return from the secondary tasks to the manual driving at appropriate advance notice timing after the transition of the automatic driving levels is notified to the driver.

What is important here is that, in the present specification, the controllable automatic driving levels of the vehicles from the automatic driving level 0 to the level 4 are levels that change depending on a situation where control equivalent to the automatic driving sections is possible and, in general use, even in a vehicle having automatic traveling performance up to the automatic driving level 4, traveling in the automatic driving level is not always ensured for the vehicle.

2. Example of Traveling

Next, an example of traveling according to the embodiment of the present disclosure is explained with reference to FIG. 2 based on the automatic driving levels explained above. FIG. 2 is a flowchart for explaining the example of the traveling according to the embodiment of the present disclosure. As illustrated in FIG. 2, in the traveling according to the embodiment of the present disclosure, the vehicle control system executes, for example, steps from step S11 to step S18. Details of these steps are explained below.

First, the vehicle control system executes driver authentication (Step S11). The driver authentication can be performed by possession authentication by a driver's license, a vehicle key (including a portable wireless device), or the like, knowledge authentication by a password, a personal identification number, or the like, or biometric authentication by a face, a fingerprint, an iris of a pupil, a voiceprint, or the like. Furthermore, in the present embodiment, the driver authentication may be performed by using all or two or more of the possession authentication, the knowledge authentication, and the biometric authentication. In the present embodiment, such driver authentication is executed before traveling is started, whereby, even when a plurality of drivers drive the same vehicle, information specific to the drivers such as histories of actions and characteristics of the drivers can be acquired in association with the drivers. Note that, in the present embodiment, when a plurality of passengers (occupants) are on board the vehicle and the plurality of passengers can be drivers, it is preferable to perform authentication for all the drivers.

Next, a destination is set by, for example, a human machine interface (HMI) 31 (see FIG. 4) explained below being operated by the driver or the like (step S12). Note that, here, an example is explained in which the driver gets on the vehicle and sets a destination. However, the embodiments of the present disclosure are not limited to this. For example, the vehicle control system may preset a destination based on destination information and calendar information manually input to a smartphone or the like (assumed to be communicable with the vehicle control system) before the driver gets on the vehicle. Alternatively, the vehicle control system may automatically preset a destination by acquiring, via a concierge service, schedule information and the like stored in advance in a smartphone or the like or a Cloud server or the like (assumed to be communicable with the vehicle control system).

Then, the vehicle control system performs preplanning setting for a traveling route or the like based on the set destination. Further, the vehicle control system acquires and updates, for example, information concerning a road environment of the set traveling route, that is, local dynamic map (LDM) information and the like in which traveling map information of roads on which the vehicle travels is always updated at high density. At this time, the vehicle control system repeats, along the traveling during the itinerary, for each of fixed sections, the acquisition of the LDM and the like corresponding to a section in which the vehicle is about to travel. In addition, the vehicle control system updates and resets, as appropriate, an appropriate automatic driving level as appropriate for the sections on the traveling route based on the acquired latest LDM information and the like. Therefore, even if section entry is started in the automatic driving level 4, when a handover point to new manual driving, which has not been found at the time of starting the itinerary, is detected from information updated at every moment, the driver is requested to recognize notification for requesting handover and to take handover measures according to a changed part.

Subsequently, the vehicle control system starts displaying a traveling section on the traveling route. Then, the vehicle control system starts traveling according to the set automatic driving level (Step S13). Note that, when the traveling is started, the display of the traveling section is updated based on position information of the vehicle (an own vehicle) and acquired LDM update information. Note that, in the present specification, "traveling" also includes safe handling that is automatically performed when the driver cannot return from the automatic driving to the manual driving and more specifically includes a stop involved in, for example, a minimal risk maneuver (MRM) determined by the vehicle control system.

Subsequently, the vehicle control system executes monitoring (observation) of a state of the driver as appropriate (step S14). In the embodiment of the present disclosure, the monitoring is executed to, for example, acquire teacher data for determining a return response level of the driver. In the present embodiment, the monitoring is executed in a situation in which return notification is performed at appropriate timing based on a prior state check of the driver necessary for switching the driving mode according to the automatic driving levels set in the sections on the travel route and estimation information of the initial state of the driving observed from the periodic monitoring, including an unexpected return request from the automatic driving to manual driving generated after the start of the itinerary, and it is necessary to check, according to a change with time of a travel environment, whether the driver has appropriately performed a return action in response to those notifications or an alarm.

Subsequently, when the vehicle reaches a switching point from the automatic driving mode to the manual driving mode based on the automatic driving levels set for the sections on the traveling route, the vehicle control system determines whether the driving mode can be switched (step S15). Then, when determining that the driving mode can be switched (step S15: Yes), the vehicle control system proceeds to processing in step S16 and, when determining that the driving mode cannot be switched (step S15: No), the vehicle control system proceeds to, for example, processing in step S18.

Subsequently, the vehicle control system switches the driving mode (step S16). Further, the vehicle control system determines whether the vehicle (the own vehicle) has arrived at the destination (step S17). The vehicle control system ends the processing when the vehicle has arrived at the destination (step S17: Yes) and returns to the processing in step S13 when the own vehicle has not arrived at the destination (step S17: No). Thereafter, the vehicle control system repeats the processing in step S13 to step S17 as appropriate until the vehicle arrives at the destination. When the driving mode cannot be switched from the automatic driving to the manual driving, the vehicle control system may execute an emergency stop by the MRM or the like (step S18).

Note that the flowchart of FIG. 2 is a diagram for schematic explanation and illustrates a flow as a simple model while omitting explanation about a detailed procedure involved in handover and detailed procedures of a state check at the time of handover, handling processing and determination in automatic control and description of detailed steps. That is, assuming that the processing in step S13 includes a series of handling processing automatically performed when the driver cannot return, explanation of the processing is omitted.

Note that, in the embodiment of the present disclosure, even in the same road section, an allowable automatic driving level can change from moment to moment according to vehicle performance, road conditions, weather, and the like. Even in the same vehicle, allowable Operational Design Domain (ODD) sometimes also changes depending on a case in which detection performance is deteriorated because of primary contamination of equipment loaded on an own vehicle, contamination of sensors, or the like. Therefore, an allowable automatic driving level sometimes also changes while the vehicle travels from a departure place to a destination. Further, in the case of transition of the automatic driving level in which switching measures from the automatic driving to the manual driving is requested, a handover section for the measures may is sometimes also set. Therefore, in the embodiment of the present disclosure, an ODD is set and updated based on various kinds of information that change from moment to moment. Note that, in the present specification, an actual use range for each of the automatic driving levels allowed according to an infrastructure, a traveling environment, and the like is referred to as "operation design domain" (ODD).

Further, when the ODD set for the traveling vehicle changes, contents of the secondary tasks allowed for the driver also change. In other words, since the contents of the unacceptable secondary tasks change according to the ODD, a range of the contents of the driver's actions considered to be traffic rule violations also change. For example, in the case of the automatic driving level 4, even the driver is allowed to perform a secondary task such as reading, when the automatic driving level 4 transitions to the automatic driving level 2, the secondary task such as reading is a violation act. In addition, since there is also sudden transition of the automatic driving levels in the automatic driving, the driver is requested to be in a preparation state in which the driver can immediately return to the manual driving from the secondary task depending on a situation.

3. Example of Transition of the Automatic Driving Levels

Figure 3:
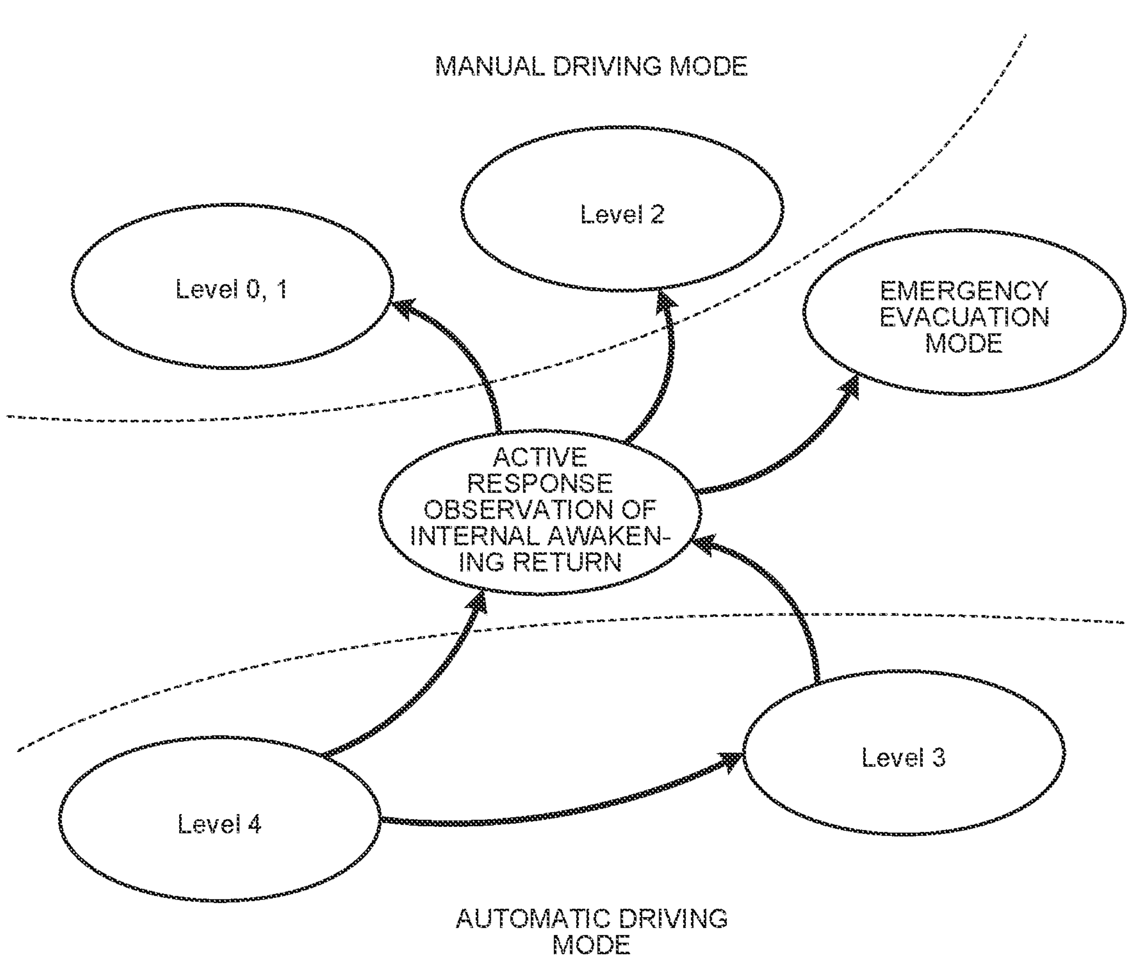
FIG. 3 is an explanatory diagram for explaining an example of transition of the automatic driving levels according to the embodiment of the present disclosure.

Subsequently, an example of transition of the automatic driving levels according to the embodiment of the present disclosure is explained more in detail with reference to FIG. 3. FIG. 3 is an explanatory diagram for explaining the example of the transition of the automatic driving levels according to the embodiment of the present disclosure.

As illustrated in FIG. 3, it is assumed that the switching from the automatic driving mode (a range on the lower side in FIG. 3) to the manual driving mode (a region on the upper side in FIG. 3) is executed, for example, when sections of the automatic driving level 3 and the automatic driving level 4 on the traveling route are transitioned to sections of the automatic driving levels 0 and 1 and the automatic driving level 2.

Incidentally, it is difficult for the driver to consciously maintain the preparation state in which the driver can return to the manual driving while traveling in the automatic driving mode. For example, while traveling in the automatic driving mode, it is conceivable that the driver is indulged in a secondary task such as sleep (nap), viewing of a television or a video, or a game. For example, the driver only releases his/her hands from a steering wheel and is sometimes gazing forward or around the vehicle, is sometimes reading a book, or is sometimes dozing off as at the time of the manual driving. An awakening level (an awareness level) of the driver is different depending on the differences of the secondary tasks.

Further, when the driver falls into sleep while traveling in the automatic driving mode, the driver's consciousness level or determination level falls, that is, the awakening level falls. Since the driver cannot perform normal manual driving in a state in which the awakening level falls, when the driver switches the automatic driving mode to the manual driving mode in that state, it is likely that the driver causes an accident in the worst case. Therefore, even in the state in which the awakening level falls, the driver is requested to return to a high awakening state in which the driver can drive the vehicle under normal consciousness (an internal awakening restored state) immediately before switching to the automatic driving mode to the manual driving mode. That is, in order to ensure safe traveling, switching from the automatic driving mode to the manual driving mode is requested to be executed only when it can be observed that an internal awakening state of the driver has restored.

Therefore, in the embodiment of the present disclosure, in order to avoid induction of an accident or the like, such switching of the driving mode can be executed only when the driver is in a return response level to the manual driving mode, that is, when an active response indicating internal awakening restoration (a state in which the internal awakening state of the driver is restored) has been successfully observed (illustrated in the center of FIG. 3). In the present embodiment, as illustrated in FIG. 3, when the active response indicating the internal awakening restoration cannot be observed, the driving mode is switched to an emergency evacuation mode such as the MRM. Note that, in the emergency evacuation mode, processing such as deceleration, a stop, parking on a road, or parking in a side strip or an evacuation space is performed. In FIG. 3, about the transition from the automatic driving level 4 to the automatic driving level 3, since the driver does not always approach a point where it is necessary to perform handling as an operation action immediately by switching the driving mode, it is not possible to expect observation itself of an active response indicating the internal awakening restoration explained above. However, the present embodiment is not limited to the example illustrated in FIG. 3 and, even in the transition from the automatic driving level 4 to the automatic driving level 3, the transition may be performed based on the observation or the observation result explained above if conditions under which safety handling and emergency evacuation capable of performing remote support without adversely affecting the following vehicle even if the driver cannot perform the driving steering or the driver cannot perform handling are satisfied. Note that, even if there is an active response of the driver, the response is sometimes a reactive action not involving a normal awakening thought and the driver is not in a state of accurately grasping related all situations. Therefore, it can be said that ensuring safety is a necessary condition in handing over steering.

Specifically, when the active response indicating the internal awakening restoration is not observed when the transition from the automatic driving level 4 to the automatic driving level 3 is performed, even if the driver should be obliged to return to the manual driving according to a legal system, the driver is not always in a state in which the driver can appropriately cope with a return request RTI (Request to Intervene) serving as the automatic driving level 3 from the vehicle control system. More specifically, in response to the return request RTI serving as the automatic driving level 3, the driver is not always in a state in which a brain awakening state is restored and not always can return to a manually drivable physical state such as absence of numbness or the like in the body. If the transition from the automatic driving level 4 to the automatic driving level 3 is performed in such a case, it is likely that a situation beyond a design idea assumed beforehand in the vehicle control system is reached and there is a possibility that an accident or the like is induced in a so-called dreaming state in which the driver has not yet grasped all situations or in a stage where the driver still lacks Situation Awareness. Therefore, in the embodiment of the present disclosure, in order to reduce the possibility explained above, even in a stage in which the vehicle control system side (can perform normal Situation Awareness and) does not yet need to issue the return request RTI to the driver, preventive dummy return request RTI/pseudo control response task presentation may be performed as appropriate in order to check a return response level (for example, an awakening level) of the driver and an active response indicating the internal awakening return of the driver may be observed from the response observation.

Note that arrows indicating the transition of the automatic driving levels illustrated in FIG. 3 indicate directions of transition allowed to automatically perform switching. Further, transition in the opposite directions of arrows is not recommended because the transition causes misrecognition of the driver about a state of the vehicle control system. That is, in the vehicle control system according to the embodiment of the present disclosure, it is desirable that the vehicle control system is designed such that, when transition of the automatic driving levels is once performed to switch the automatic driving mode to the manual driving mode in which the driver intervenes, the vehicle control system does not automatically return to the automatic driving mode again without an active instruction from the driver. As explained above, providing directivity (irreversibility) in the switching of the driving mode means that the automatic driving mode is designed to be prevented from being set without a clear intention of the driver. Therefore, with the vehicle control system, since the automatic driving mode cannot be enabled only when the driver has a clear intention, for example, it is possible to, when the driving mode is not the automatic driving mode, prevent the driver from misunderstanding that the driving mode is the automatic driving mode and easily starting the secondary tasks.

As explained above, in the embodiment of the present disclosure, in order to ensure safe traveling, the switching from the automatic driving mode to the manual driving mode is executed only when it can be observed that the driver is in an internal restoration state.

4. Configuration Example of the Vehicle Control System

Figure 4:
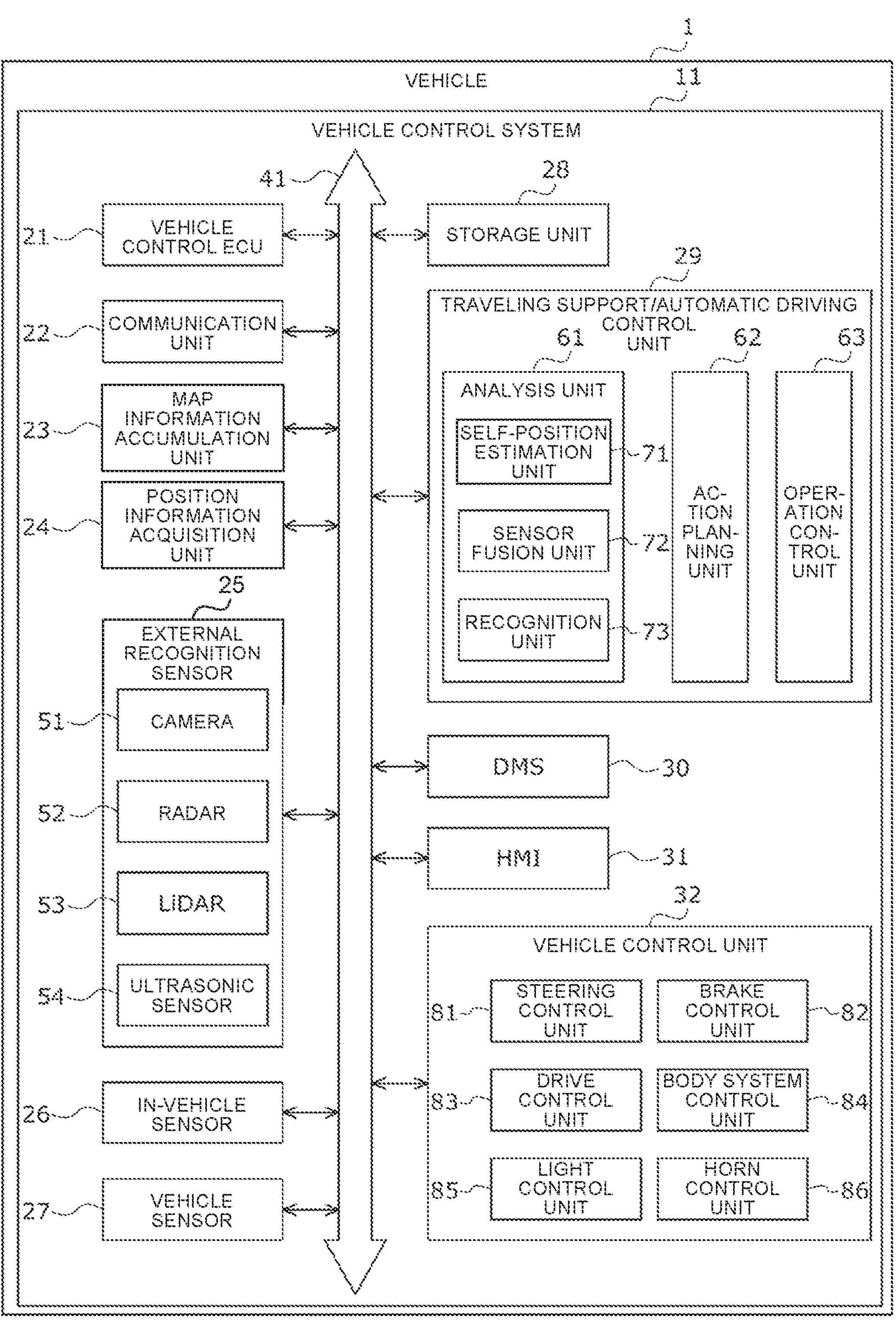
FIG. 4 is a block diagram illustrating a configuration example of a vehicle control system 11, which is an example of a mobile device control system to which a technology of the present disclosure is applied.

Next, a configuration example of a vehicle control system 11, which is an example of a mobile device control system to which the technology of the present disclosure is applied, is explained with reference to FIG. 4. FIG. 4 is a block diagram illustrating a configuration example of the vehicle control system 11, which is an example of the mobile device control system to which the present technology is applied.

The vehicle control system 11 is provided in a vehicle 1 and performs processing concerning traveling support and automatic driving of the vehicle 1.

The vehicle control system 11 mainly includes an electronic control unit (ECU) 21, a communication unit 22, a map information accumulation unit 23, a position information acquisition unit 24, an external recognition sensor 25, an in-vehicle sensor 26, a vehicle sensor 27, a storage unit 28, a traveling support/automatic driving control unit 29, a driver monitoring system (DMS) 30, a human machine interface (HMI) 31, and a vehicle control unit 32.

The vehicle control ECU 21, the communication unit 22, the map information accumulation unit 23, the position information acquisition unit 24, the external recognition sensor 25, the in-vehicle sensor 26, the vehicle sensor 27, the storage unit 28, the traveling support/automatic driving control unit 29, the driver monitoring system (DMS) 30, the human machine interface (HMI) 31, and the vehicle control unit 32 are communicably connected to one another via a communication network 41. The communication network 41 is configured by, for example, a vehicle-mounted communication network, a bus, or the like conforming to a digital bidirectional communication standard such as a controller area network (CAN), a local interconnect network (LIN), a Local Area Network (LAN), FLEXRAY®, or ETHERNET®. The communication network 41 may be properly used depending on a type of data to be transmitted. For example, the CAN may be applied to data concerning vehicle control and the Ethernet may be applied to large-capacity data. Note that the units of the vehicle control system 11 may be directly connected, not via the communication network 41, using wireless communication that assumes communication at a relatively short distance such as near field communication (NFC) or BLUETOOTH®.

Note that, in the following explanation, when the units of the vehicle control system 11 perform communication via the communication network 41, description of the communication network 41 is omitted. For example, when the vehicle control ECU 21 and the communication unit 22 perform communication via the communication network 41, it is simply described that the vehicle control ECU 21 and the communication unit 22 perform communication.

The vehicle control ECU 21 is configured by various processors such as a central processing unit (CPU) and a micro processing unit (MPU). The vehicle control ECU 21 performs control of the entire or a part of functions of the vehicle control system 11.

The communication unit 22 performs communication with various kinds of equipment inside and outside the vehicle, other vehicles, a server, a base station, and the like and performs transmission and reception of various data. At this time, the communication unit 22 can perform communication using a plurality of communication schemes.

Communication with the outside of the vehicle executable by the communication unit 22 is schematically explained. The communication unit 22 performs communication with a server (hereinafter referred to as external server) or the like present on an external network via the base station or an access point according to a wireless communication scheme such as a 5th generation mobile communication system (5G), long term evolution (LTE), or dedicated short range communications (DSRC). The external network with which the communication unit 22 performs communication is, for example, the Internet, a Cloud network, a network specific to a company, or the like. A communication scheme for the communication unit 22 to perform communication with the external network is not particularly limited if the communication scheme is a wireless communication scheme capable of performing digital bidirectional communication at communication speed equal to or higher than predetermined communication speed and in a distance equal to or longer than a predetermined distance.

For example, the communication unit 22 can perform communication with a terminal present near the own vehicle using a peer to peer (P2P) technology. The terminal present near the ow car is, for example, a terminal worn by a mobile body moving at relatively low speed such as a pedestrian or a bicycle, a terminal installed in a store or the like in a fixed position, or a machine type communication (MTC) terminal. Further, the communication unit 22 can also perform V2X communication. The V2X communication means communication between the own vehicle and another vehicle such as vehicle to vehicle communication between the own vehicle and another vehicle, vehicle to infrastructure communication between the own vehicle and a roadside device or the like, vehicle to home communication between the own vehicle and a home, and vehicle to pedestrian communication between the own vehicle and a terminal or the like carried by a pedestrian.

The communication unit 22 can receive, from the outside, for example, a program for updating software for controlling an operation of the vehicle control system 11 (Over The Air). The communication unit 22 can further receive map information, traffic information, information around the vehicle 1, and the like from the outside. For example, the communication unit 22 can transmit information concerning the vehicle 1, information around the vehicle 1, and the like to the outside. Examples of the information concerning the vehicle 1 transmitted to the outside by the communication unit 22 include data indicating a state of the vehicle 1 and a recognition result by a recognition unit 73. Further, for example, the communication unit 22 performs communication corresponding to a vehicle emergency call system such as an eCall.

For example, the communication unit 22 receives an electromagnetic wave transmitted by a road traffic information communication system (VICS®: Vehicle Information and Communication System) such as a radio wave beacon, an optical beacon, or FM multiplex broadcast.

Communication with a vehicle interior executable by the communication unit 22 is schematically explained. The communication unit 22 can perform communication with kinds of equipment in the vehicle using, for example, wireless communication. The communication unit 22 can perform wireless communication with the equipment in the vehicle according to a communication scheme capable of performing digital bidirectional communication at communication speed equal to or higher than predetermined communication speed through wireless communication such as wireless LAN, BLUETOOTH®, NFC, or wireless USB (WUSB). Not only this, but the communication unit 22 can also perform communication with the kinds of equipment in the vehicle using wired communication. For example, the communication unit 22 can perform communication with the kinds of equipment in the vehicle through wired communication via a cable connected to a not-illustrated connection terminal. The communication unit 22 can perform communication with the kinds of equipment in the vehicle according to a communication scheme capable of performing digital bidirectional communication at communication speed equal to or higher than predetermined communication speed through wired communication such as a universal serial bus (USB), a high-definition multimedia interface (HDMI®), or a mobile high-definition link (MHL).

Here, the equipment in the vehicle indicates, for example, equipment not connected to the communication network 41 in the vehicle. As the equipment in the vehicle, for example, mobile equipment and wearable equipment carried by an occupant such as a driver and information equipment brought into the vehicle and temporarily installed are assumed.

The map information accumulation unit 23 accumulates one or both of a map acquired from the outside and a map created by the vehicle 1. For example, the map information accumulation unit 23 accumulates a three-dimensional precision map, a global map having lower accuracy than the high-precision map and covering a wide area, and the like.

The high-precision map is, for example, a dynamic map, a point Cloud map, a vector map, or the like. The dynamic map is, for example, a map including four layers of dynamic information, semi-dynamic information, semi-static information, and static information and is provided to the vehicle 1 from the external server or the like. The point Cloud map is a map configured by point Cloud (point group data). The vector map is, for example, a map in which traffic information such as a lane and a position of a traffic light is associated with the point Cloud map and adapted to an advanced driver assistance system (ADAS) or an autonomous driving (AD).

The point Cloud map and the vector map may be provided from, for example, the external server or may be created by the vehicle 1 as a map for performing matching with a local map explained below based on a sensing result by a camera 51, a radar 52, a LiDAR 53, or the like and accumulated in the map information accumulation unit 23. When the high-precision map is provided from the external server or the like, for example, map data of several hundred meters square concerning a planned path on which the vehicle 1 is about to travel is acquired from the external server or the like in order to reduce a communication capacity.

The position information acquisition unit 24 receives a global navigation satellite system (GNSS) signal from a GNSS satellite and acquires position information of the vehicle 1. The acquired position information is supplied to the traveling support/automatic driving control unit 29. Note that the position information acquisition unit 24 is not limited to the scheme using the GNSS signal and may acquire the position information using, for example, a beacon.

The external recognition sensor 25 includes various sensors used for recognize a situation outside the vehicle 1 and supplies, to the units of the vehicle control system 11, sensor data supplied from the sensors. Types and the number of sensors included in the external recognition sensor 25 are optional.

For example, the external recognition sensor 25 includes the camera 51, the radar 52, the LiDAR (Light Detection and Ranging, Laser Imaging Detection and Ranging) 53, and an ultrasonic sensor 54. Not only this, but the external recognition sensor 25 may be configured to include one or more types of sensors among the camera 51, the radar 52, the LiDAR 53, and the ultrasonic sensor 54. The numbers of cameras 51, radars 52, LiDAR 53, and ultrasonic sensors 54 are not particularly limited if these can be practically installed in the vehicle 1. Types of the sensors included in the external recognition sensor 25 are not limited to this example. The external recognition sensor 25 may include other types of sensors. An example of sensing regions of the sensors included in the external recognition sensor 25 is explained below.

Note that a photographing scheme of the camera 51 is not particularly limited. For example, cameras of various photographing schemes such as a Time of Flight (ToF) camera, a stereo camera, a monocular camera, and an infrared camera, which are photographing scheme capable of performing distance measurement, can be applied to the camera 51 according to necessity. Not only this, but the camera 51 may a camera for simply acquiring a captured image irrespective of the distance measurement.

For example, the external recognition sensor 25 can include an environment sensor for detecting an environment for the vehicle 1. The environment sensor is a sensor for detecting environments such as weather, atmospheric phenomena, and brightness and can include various sensors such as a raindrop sensor, a fog sensor, a sunshine sensor, a snow sensor, and an illuminance sensor.

Further, for example, the external recognition sensor 25 includes a microphone used to detect sound around the vehicle 1, a position of a sound source, and the like.

The in-vehicle sensor 26 includes various sensors for detecting information inside the vehicle and supplies, to the units of the vehicle control system 11, sensor data supplied from the sensors. Types and the number of the various sensors included in the in-vehicle sensor 26 are not particularly limited if the sensors can be practically installed in the vehicle 1.

For example, the in-vehicle sensor 26 can include one or more types of sensors among a camera, a radar, a seating sensor, a steering wheel sensor, a microphone, and a biological sensor. As the cameras included in the in-vehicle sensor 26, for example, cameras of various photographing schemes capable of performing distance measurement such as a ToF camera, a stereo camera, a monocular camera, and an infrared camera can be used. Not only this, but the cameras included in the in-vehicle sensor 26 may be cameras for simply acquiring a captured image irrespective of the distance measurement. The biological sensor included in the in-vehicle sensor 26 is provided in, for example, a seat or a steering wheel and detects various kinds of biological information of an occupant such as a driver.

The vehicle sensor 27 includes various sensors for detecting a state of the vehicle 1 and supplies, to the units of the vehicle control system 11, sensor data supplied from the sensors. Types and the number of various sensors included in the vehicle sensor 27 are not particularly limited if the sensors can be practically installed in the vehicle 1.

For example, the vehicle sensor 27 mainly includes a speed sensor, an acceleration sensor, an angular velocity sensor (a gyro sensor), and an inertial measurement unit (IMU) obtained by integrating the sensors. For example, the vehicle sensor 27 includes a steering angle sensor that detects a steering angle of a steering wheel, a yaw rate sensor, an accelerator sensor that detects an operation amount of an accelerator pedal, and a brake sensor that detects an operation amount of a brake pedal. For example, the vehicle sensor 27 includes a rotation sensor that detects the number of revolutions of an engine or a motor, an air pressure sensor that detects air pressure of tires, a slip rate sensor that detects a slip rate of the tires, and a wheel speed sensor that detects rotating speed of wheels. For example, the vehicle sensor 27 includes a battery sensor that detects the residual power and temperature of a battery and an impact sensor that detects an impact from the outside.

The storage unit 28 includes at least one of a nonvolatile storage medium and a volatile storage medium and stores data and a program. The storage unit 28 is used as, for example, an electrically erasable programmable read only memory (EEPROM) and a random access memory (RAM). As a storage medium, a magnetic storage device such as a hard disc drive (HDD), a semiconductor storage device, an optical storage device, and a magneto-optical storage device can be applied. The storage unit 28 records various programs and data used by the units of the vehicle control system 11. For example, the storage unit 28 includes an event data recorder (EDR) and a data storage system for automated driving (DSSAD) and stores information concerning the vehicle 1 before and after an event such as an accident and biological information acquired by the in-vehicle sensor 26.

The traveling support/automatic driving control unit 29 performs control of traveling support and automatic driving of the vehicle 1. For example, the traveling support/automatic driving control unit 29 includes an analysis unit 61, an action planning unit 62, and an operation control unit 63.

The analysis unit 61 performs analysis processing for a situation of the vehicle 1 and a situation around the vehicle 1. The analysis unit 61 includes a self-position estimation unit 71, a sensor fusion unit 72, and a recognition unit 73.

The self-position estimation unit 71 estimates a self-position of the vehicle 1 based on sensor data supplied from the external recognition sensor 25 and the high-precision map accumulated in the map information accumulation unit 23. For example, the self-position estimation unit 71 generates a local map based on the sensor data supplied from the external recognition sensor 25 and estimates a self-position of the vehicle 1 by performing matching of the local map and the high-precision map. The position of the vehicle 1 is based on, for example, the center of a rear wheel pair axle.

The local map is, for example, a three-dimensional high-precision map created using a technology such as simultaneous localization and mapping (SLAM), an occupancy grid map, or the like. The three-dimensional high-precision map is, for example, the point Cloud map explained above. The occupancy grid map is a map in which a three-dimensional or two-dimensional space around the vehicle 1 is divided into grids of a predetermined size to indicate an occupancy state of an object in units of the grids. The occupancy state of the object is indicated by, for example, presence or absence and a presence probability of the object. The local map is also used for, for example, detection processing and recognition processing for a situation on the outside of the vehicle 1 by the recognition unit 73.

Note that the self-position estimation unit 71 may estimate a self-position of the vehicle 1 based on the position information acquired by the position information acquisition unit 24 and the sensor data of the vehicle sensor 27.

The sensor fusion unit 72 performs sensor fusion processing for combining a plurality of different kinds of sensor data (for example, image data supplied from the camera 51 and sensor data supplied from the radar 52) to obtain new information. As a method of combining different kinds of sensor data, there are integration, fusion, association, and the like.

The recognition unit 73 executes detection processing for performing detection of a situation on the outside of the vehicle 1 and recognition processing for performing recognition of the situation on the outside of the vehicle 1.

For example, the recognition unit 73 performs the detection processing and the recognition processing for the situation on the outside of the vehicle 1 based on information supplied from the external recognition sensor 25, information supplied from the self-position estimation unit 71, information supplied from the sensor fusion unit 72, and the like.

Specifically, for example, the recognition unit 73 performs detection processing, recognition processing, and the like for an object around the vehicle 1. The detection processing for the object is processing for detecting, for example, presence or absence, a size, a shape, a position, and a movement the object. The recognition processing for the object is, for example, processing for recognizing an attribute such as a type of the object and identifying a specific object. However, the detection processing and the recognition processing are not always clearly divided and sometimes overlap.

For example, the recognition unit 73 detects an object around the vehicle 1 by performing clustering for classifying point Clouds based on sensor data by the radar 52, the LiDAR 53, or the like into each mass of a point group. Consequently, presence or absence, a size, a shape, and a position of the object around the vehicle 1 are detected.

For example, the recognition unit 73 detects a movement of the object around the vehicle 1 by performing tracking for following a movement of the mass of the point group classified by the clustering. Consequently, speed and a traveling direction (a movement vector) of the object around the vehicle 1 are detected.

For example, the recognition unit 73 detects or recognizes a vehicle, a person, a bicycle, an obstacle, a structure, a road, a traffic light, a traffic sign, a road sign, and the like based on image data supplied from the camera 51. The recognition unit 73 may recognize the type of the object around the vehicle 1 by performing recognition processing such as semantic segmentation.

For example, the recognition unit 73 can perform recognition processing for traffic rules around the vehicle 1 based on a map accumulated in the map information accumulation unit 23, an estimation result of the self position by the self-position estimation unit 71, and a recognition result of the object around the vehicle 1 by the recognition unit 73.

With this processing, the recognition unit 73 can recognize a position and a state of a traffic light, contents of a traffic sign and a road sign, contents of traffic rules, a travelable lane, and the like.

For example, the recognition unit 73 can perform recognition processing for an environment around the vehicle 1. As the environment around the vehicle 1 to be recognized by the recognition unit 73, weather, temperature, humidity, brightness, a state of a road surface, and the like are assumed.

The action planning unit 62 creates an action plan of the vehicle 1. For example, the action planning unit 62 creates an action plan by performing processing for path planning and path following.

Note that the path planning (Global path planning) is processing for planning a rough path from a start to a goal. This path planning is called track planning and includes processing for performing local path planning that enables safe and smooth advance near the vehicle 1 considering motion characteristics of the vehicle 1 in a planned path.

The path following is processing for planning an operation for safely and accurately traveling on the path planned by the path planning within a planned time. The action planning unit 62 can calculate target speed and target angular velocity of the vehicle 1 based on, for example, a result of the path following processing.

The operation control unit 63 controls an operation of the vehicle 1 in order to realize the action plan created by the action planning unit 62.

For example, the operation control unit 63 controls a steering control unit 81, a brake control unit 82, and a drive control unit 83 included in the vehicle control unit 32 explained below and performs acceleration/deceleration control and direction control such that the vehicle 1 advances on a track calculated by the track planning. For example, the operation control unit 63 performs cooperative control for the purpose of implementing functions of an ADAS such as collision avoidance or shock absorbing, follow-up traveling, vehicle speed maintaining traveling, collision warning of the own vehicle, lane deviation warning of the own vehicle, and the like. For example, the operation control unit 63 performs cooperative control for the purpose of automatic driving or the like for autonomously travelling without depending on operation of the driver.

The DMS 30 performs authentication processing for the driver, recognition processing for a state of the driver, and the like based on sensor data supplied from the in-vehicle sensor 26, input data input to the HMI 31 explained below, and the like. In this case, as the state of the driver to be recognized by the DMS 30, for example, a physical condition, an awakening level, a concentration level, a fatigue level, a line-of-sight direction, a drunkenness level, driving operation, and a posture are assumed. Further, the DMS 30 may perform the authentication processing for the driver, the recognition processing for the state of the driver, and the like with reference to sleep disorder having a risk of affecting driving, a medical history leading to consciousness disorder and insufficient sleep, a part of life record information, and the like.

Note that the DMS 30 may perform authentication processing for an occupant other than the driver and recognition processing for a state of the occupant. For example, the DMS 30 may perform recognition processing for a situation inside the vehicle based on sensor data supplied from the in-vehicle sensor 26. As the situation inside the vehicle to be recognized, for example, temperature, humidity, brightness, and odor are assumed.

The HMI 31 inputs various data, instructions, and the like and performs presentation of various data to the driver or the like.

Data input by the HMI 31 is schematically explained. The HMI 31 includes an input device for a person to input data. The HMI 31 generates an input signal based on data, an instruction, or the like input by the input device and supplies the input signal to the units of the vehicle control system 11. The HMI 31 includes operation pieces such as a touch panel, buttons, switches, and a lever as the input device. Not only this, but the HMI 31 may further include an input device capable of inputting information with a method other than manual operation using voice, gesture, or the like. Further, the HMI 31 may use, as the input device, for example, a remote control device using infrared rays or radio waves or external connection equipment such as mobile equipment or wearable equipment adapted to operation of the vehicle control system 11.

Presentation of data by the HMI 31 is schematically explained. The HMI 31 performs generation of visual information, auditory information, and tactile information for an occupant or the outside of the vehicle. The HMI 31 performs output control for controlling an output, output content, output timing, an output method, and the like of these kinds of generated information. The HMI 31 generates and outputs, as the visual information, for example, an operation screen, state display of the vehicle 1, warning display, an image such as a monitor image indicating a situation around the vehicle 1, and information indicated by light. The HMI 31 generates and outputs, as the auditory information, information indicated by sound such as voice guidance, warning sound, and a warning message. Further, the HMI 31 generates and outputs, as the tactile information, information given to a tactile sense of an occupant by, for example, force, vibration, or movement.

As an output device with which the HMI 31 outputs the visual information, for example, a display device that presents the visual information by displaying an image by itself or a projector device that presents visual information by projecting an image can be applied. Note that the display device may be a device that displays the visual information in the field of view of the passenger such as a head-up display, a transmissive display, or a wearable device having an augmented reality (AR) function other than a display device including a normal display. In the HMI 31, a display device included in a navigation device, an instrument panel, a camera monitoring system (CMS), an electronic mirror, a lamp, or the like provided in the vehicle 1 can also be used as an output device that outputs the visual information.

As the output device with which the HMI 31 outputs the auditory information, for example, an audio speaker, a headphone, or an earphone can be applied.

As the output device with which the HMI 31 outputs the tactile information, for example, a haptics element using a haptics technology can be applied. The haptics element is provided in, for example, a portion with which an occupant of the vehicle 1 comes into contact such as a steering wheel or a seat.

Note that, besides being used as normal information notification means to the driver, when a partial defect is found in a system self-diagnosis of the vehicle 1 or when periodic maintenance of the vehicle 1 is urged the output device that outputs the auditory information, the output device that outputs the tactile information, and the like explained above may emit noise or imitating noise that would occur when the vehicle 1 is in a failure situation or abnormal vibration. In this way, the output device that outputs the auditory information, the output device that outputs the tactile information, and the like explained above can be extended and used as an HMI, which is one of information transmission means for preventing a notification by a lamp such as a tell-tail from being disregarded by the user.

The vehicle control unit 32 performs control of the units of the vehicle 1. The vehicle control unit 32 includes a steering control unit 81, a brake control unit 82, a drive control unit 83, a body system control unit 84, a light control unit 85, and a horn control unit 86.

The steering control unit 81 performs detection, control, and the like of a state of a steering system of the vehicle 1. The steering system includes, for example, a steering mechanism including a steering wheel and the like and an electric power steering. The steering control unit 81 includes, for example, a steering ECU that performs control of the steering system and an actuator that performs driving of the steering system.

The brake control unit 82 performs detection, control, and the like of a state of the brake system of the vehicle 1. The brake system includes, for example, a brake mechanism including a brake pedal, an antilock brake system (ABS), and a regenerative brake mechanism. The brake control unit 82 includes, for example, a brake ECU that performs control of the brake system and an actuator that performs driving of the brake system.

The drive control unit 83 performs detection, control, and the like of a state of a drive system of the vehicle 1. The drive system includes, for example, a driving force generation device for generating a driving force such as an accelerator pedal, an internal combustion engine, or a driving motor and a driving force transmission mechanism for transmitting the driving force to wheels. The drive control unit 83 includes, for example, a drive ECU that performs control of the drive system and an actuator that performs driving of the drive system. The body system control unit 84 performs detection, control, and the like of a state of a body system of the vehicle 1. The body system includes, for example, a keyless entry system, a smart key system, a power window device, a power seat, an air conditioner, an airbag, a seat belt, and a shift lever. The body system control unit 84 includes, for example, a body system ECU that controls the body system and an actuator that drives the body system.

The light control unit 85 performs detection, control, and the like of states of various lights of the vehicle 1. As the lights to be controlled, for example, headlights, backlights, fog lights, turn signals, brake lights, a projection, and a display of a bumper are assumed. The light control unit 85 includes a light ECU that performs control of the lights and an actuator that drives the lights.

The horn control unit 86 performs detection, control, and the like of a state of a car horn of the vehicle 1. The horn control unit 86 includes, for example, a horn ECU that performs control of a car horn and an actuator that drives the car horn.

Figure 5:
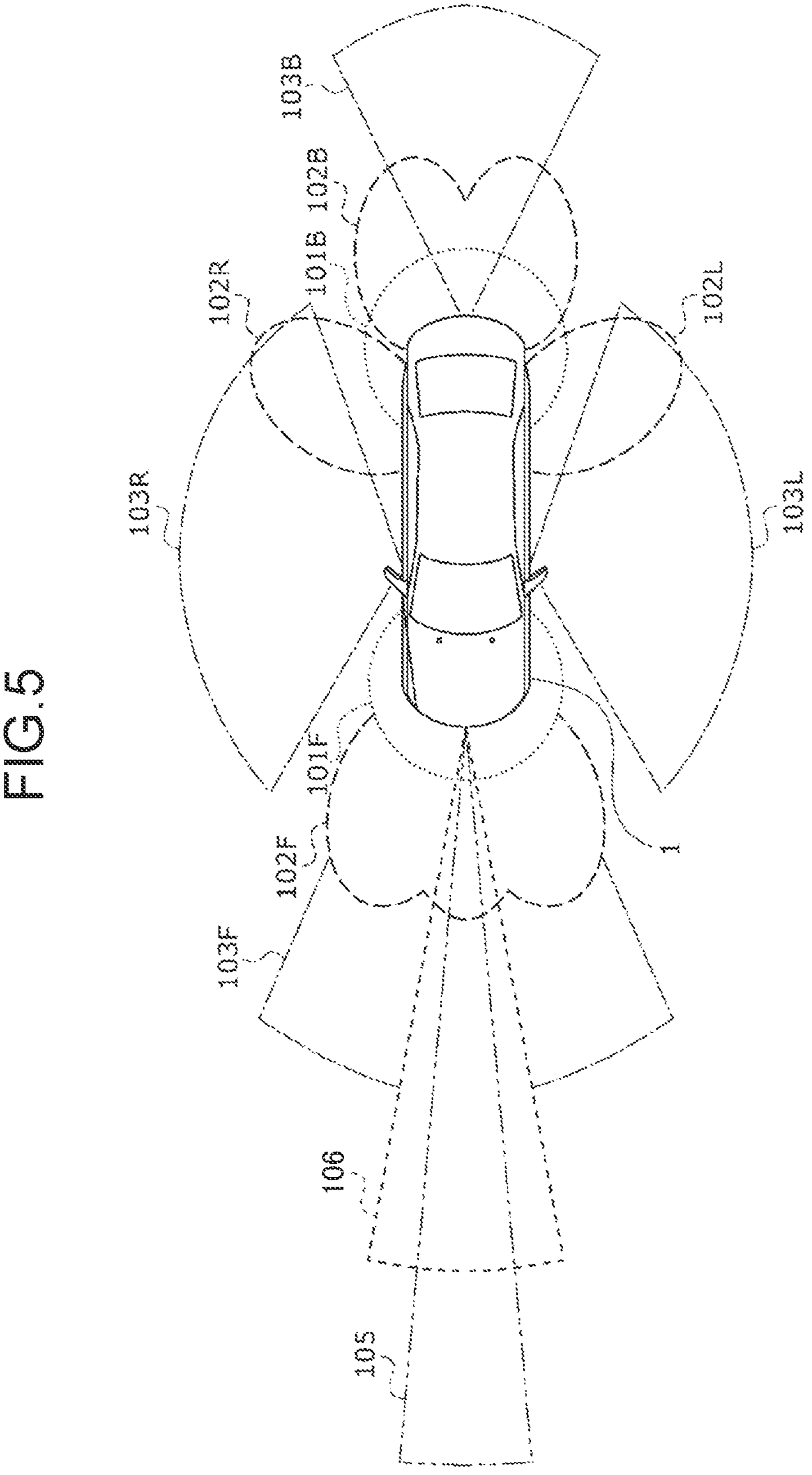
FIG. 5 is a diagram illustrating an example of sensing regions.

FIG. 5 is a diagram illustrating an example of sensing regions by the camera 51, the radar 52, the LiDAR 53, the ultrasonic sensor 54, and the like of the external recognition sensor 25 illustrated in FIG. 4. Note that, in FIG. 5, a state in which the vehicle 1 as viewed from above is illustrated and the left end side is the front end (front) side of the vehicle 1 and the right end side is the rear end (rear) side of the vehicle 1.

A sensing region 101F and a sensing region 101B indicate examples of sensing regions of the ultrasonic sensor 54. The sensing region 101F covers the front end periphery of the vehicle 1 with a plurality of ultrasonic sensors 54. The sensing region 101B covers the rear end periphery of the vehicle 1 with a plurality of ultrasonic sensors 54.

Sensing results in the sensing region 101F and the sensing region 101B are used, for example, for parking support for the vehicle 1.

A sensing region 102F and a sensing region 102B indicate examples of sensing regions of the radar 52 for a short distance or a middle distance. The sensing region 102F covers up to a position farther than the sensing region 101F in the front of the vehicle 1. The sensing region 102B covers up to a position farther than the sensing region 101B in the rear of the vehicle 1. A sensing region 102L covers the rear periphery of the left side surface of the vehicle 1. A sensing region 102R covers the rear periphery of the right side surface of the vehicle 1.

A sensing result in the sensing region 102F is used to, for example, detect a vehicle, a pedestrian, or the like present in the front of the vehicle 1. A sensing result in the sensing region 102B is used for, for example, a collision prevention function or the like in the rear of the vehicle 1. Sensing results in the sensing region 102L and the sensing region 102R are used to, for example, detect an object in blind spots on the sides of the vehicle 1.

A sensing region 103F and a sensing region 103B indicate examples of sensing regions by the camera 51. The sensing region 103F covers up to a position farther than the sensing region 102F in the front of the vehicle 1. The sensing region 103B covers up to a position farther than the sensing region 102B in the rear of the vehicle 1. A sensing region 103L covers the periphery of the left side surface of the vehicle 1. A sensing region 103R covers the periphery of the right side surface of the vehicle 1.

A sensing result in the sensing region 103F can be used for, for example, recognition of a traffic light or a traffic sign, a lane deviation prevention support system, and an automatic headlight control system. A sensing result in the sensing region 103B can be used for, for example, parking support and a surround view system. Sensing results in the sensing region 103L and the sensing region 103R can be used for, for example, the surround view system.

A sensing region 106 indicates an example of a sensing region of the LiDAR 53. The sensing region 106 covers up to a position farther than the sensing region 103F in the front of the vehicle 1. On the other hand, the sensing region 106 has a narrower range in the left-right direction than the sensing region 103F.

A sensing result in the sensing region 106 is used for, for example, detecting an object such as a vehicle in the periphery.

A sensing region 105 indicates an example of a sensing region of the radar 52 for long distance. The sensing region 105 covers up to a position farther than the sensing region 106 in the front of the vehicle 1. On the other hand, the sensing region 105 has a narrower range in the left-right direction than the sensing region 106.

A sensing result in the sensing region 105 is used for, for example, adaptive cruise control (ACC), emergency braking, and collision avoidance.

Note that the sensing regions of the sensors of the camera 51, the radar 52, the LiDAR 53, and the ultrasonic sensor 54 included in the external recognition sensor 25 may have various configurations other than the configurations illustrated in FIG. 2. Specifically, the ultrasonic sensor 54 may sense the sides of the vehicle 1 as well or the LiDAR 53 may sense the rear of the vehicle 1. Installation positions of the sensors are not limited to the examples explained above. The numbers of sensors may be one or may be plural.

5. Background to Creation of the Embodiments of the Present Disclosure

Next, before the embodiments of the present disclosure are explained, a background leading to creation of the embodiments of the present disclosure by the present inventor is explained. First, a usage example of a remote driving support service is explained.

An example of a case in which a remote steering support service provided from a control center is provided is a case in which, while the vehicle 1 is traveling in automatic driving, a situation occurs in which the driver cannot appropriately hand over manual driving even if an automatic driving section ends and is switched to a manual driving section. In such a case, an operator (a controller or a remote steering person) of the control center is sometimes requested to take emergency measures in which the operator has to immediately take measures. more, in such a case, specifically, since a target vehicle 1 is in a road section of a general road where a wide variety of vehicles 1 pass and a large number of vehicles 1 are traveling at the same time around the target vehicle 1, if the target vehicle 1 is suddenly decelerated in the road section or an MRM such as an evacuation stop or a minimal risk condition (MRC) is executed, there is a high risk of inducing congestion or an accident such as collision of a following vehicle. Therefore, the operator quickly and smoothly hands over driving of the target vehicle 1 while keeping cruise speed and performs steering until the safety of the vehicle 1 can be secured.

On the other hand, for example, in the vehicle 1 traveling at low speed in a specified route such as a route traveling bus, a case is conceivable in which a remote operation support service is received in order to continue traveling in automatic driving when an abnormality occurs. However, in such a case, since the target vehicle 1 is capable of decelerating, slowing down, stopping and staying on standby, or the like, it is considered that the emergency measures of the operator of the control center immediately taking measures are not always necessary.

Even if the automatic driving technology greatly advances, it is difficult for the vehicle control system to execute all situation handling beyond human ability and it is also difficult to mount a vehicle control system having advanced and universal performance on all vehicles 1. Therefore, it is considered that there are many cases requiring support by remote steering by the operator other than the cases explained above.

That is, it can be said that there are various use forms and urgency of use of the remote steering support service provided from the control center as explained above. Therefore, in order to ensure the safety of the target vehicle 1, the operator is requested to check information of the vehicle 1 having a high necessity of the support, a situation of a route on which the vehicle 1 travels, and the like without excess or deficiency, grasp information necessary for the support in advance, and handle an event based on the grasped information. Note that, for example, when the vehicle 1 requests remote steering support from the control center at a switching point after advancing from the automatic driving section to the switching point of the manual driving section, there is a high possibility that the vehicle 1 falls into a situation in which the vehicle 1 cannot instantaneously receive support. In such a case, the vehicle 1 has no option other than, for example, an emergency stop by the MRM. In other words, for example, even if a remote steering request is received from certain one vehicle 1, when a controller and an operator are taking care of other vehicles, the request is rejected, the vehicle 1 has to wait for a long time, and there is a high probability that an emergency stop by the MRM is eventually performed.

Incidentally, in recent years, a use form such as Low Speed Mobility Service, a so-called mobility as a service (MaaS) assumed to be used in a narrow range has been known. Such a form is a use form of an unmanned automatic driving vehicle specifically called “Last One Mile” or the like, the use form including a school bus that operates on a specified low-speed traveling route not using a main road and the vehicle 1 publicly operated in a sparsely populated area. When the remote steering support is provided to such low-speed moving means, it is conceivable that the operator remotely watches and monitors whether the vehicle 1 is in a situation falling into handling difficulty and performs remote control when it is determined that handling is difficult or when there is a request. In such a case, one operator only has to monitor a large number of vehicles 1 at the same time, receive a request, and handle the vehicles 1 according to the availability of the operator. Such an operation is considered close to an elevator operation monitoring system. However, even if an immediate response is not always necessary, it is not preferable that the vehicle 1 traveling on a public road be put on standby for a long time unlike the elevator. Therefore, in an operation currently being searched for, it is assumed that one operator is limited to handle one or several vehicles 1.

However, if the number of vehicles 1 requiring support and the number of operators are the same, an operation is not much different from the operator directly riding the vehicle 1 and driving the vehicle 1. Therefore, there is no advantage in remotely performing support. For example, even if it is assumed that support by the operator is necessary in about 10% or less of the vehicles 1 traveling in the automatic driving section and it is assumed that a time spent for handling the vehicles 1 including a time in which the operator prepares for the remote steering support requires a time twice as long as a time for actually performing the remote steering, the operator is considered to have many time periods not occupied by the handling of the vehicles 1. Therefore, in such time periods, the operator should be capable of supporting the other vehicle 1 as well in terms of time. Further, it is considered that the number of controllers and operators in the control center is limited these days due to a shortage of manpower and it is difficult to allocate one operator to each one vehicle. That is, it is difficult in terms of cost to put many controllers and operators in a standby state in order to cope with an event that is unknown when the event occurs.

In addition, since the number of operators is limited, even if an operator can be allocated to the vehicle 1, it is difficult for the operator to execute, beforehand and continuously, sufficient situation grasping of the vehicle 1 requiring support. Then, when such situation grasping is not successfully performed, there is a possibility that a quick and prompt handover cannot be performed. In particular, when the vehicle 1 approaches a situation in which the ODD where the vehicle 1 is capable of using automatic driving ends during the automatic driving, unless the automatic driving can be quickly handed over to the manual driving or the remote steering by the operator, it is necessary to control emergency handling such as stopping the vehicle 1 on a road with control called MRM or MRC or moving the vehicle 1 to a road shoulder and stopping the vehicle 1. If traffic congestion or visibility deterioration occurs on the road as a result of performing such a sudden stop, collision accident induction or the like is caused. Therefore, social influence is large and it is difficult to obtain social acceptance for the remote steering support service and eventually the automatic driving.

Although there are various reasons for promoting introduction of the automatic driving, one of major causes of accidents is an artificial steering error. Such accidents can be reduced by automation. Since the human error is sometimes caused by fatigue or the like accumulated by engaging in driving steering work for a long time, it can be expected to reduce the human error by substituting the driving steering work with automatic driving by the system in a part of the driving steering or in a fixed section to reduce a load on the driver. Furthermore, there is a social need to cause a public vehicle to drive by the automatic driving in order to supplement a decrease in driver population who operates hardware of transportation means required in the society.

It is conceivable that the necessity of the remote steering support decreases as the automatic driving technology is further improved and a situation in which more and more various situations can be gradually automatically handled. However, it is conceivable that, rather than waiting for the universal performance to be realized, realizing early practical use, enrichment, and sophistication of the automatic driving technology while performing remote steering support in a necessary section or the like and introducing the automatic driving technology into the society promote further development and acceleration of the automatic driving technology, leading to solution of social problems.

As explained above, in the remote steering support, if the vehicle 1 and the operator remain on a one-to-one basis, it cannot be said that all the advantages that would be obtained by the social introduction of the automatic driving technology can be enjoyed. Therefore, it is requested to preferentially allocate the operator to a supported vehicle with high necessity, perform triage to lower the priority of allocation for the vehicle 1 that can be put on stand, balance supply of the operator and demand of the support request, and efficiently operate the remote steering support without excess or deficiency. That is, it is requested to level demand by many supported vehicles 1 and supply with a limited number of operators who execute the actual support and perform pairing between the vehicle 1 and the operator without interrupting the supply of the immediate support. For the leveling explained above, it is preferable to provide flexibility to the pairing such that one operator does not fix the vehicle 1 corresponding to the operator and can cope with the vehicle 1 while performing handover among a plurality of operators according to a change in a situation.

However, if the corresponding vehicle 1 is not fixed, it is difficult for the operator to acquire and grasp information necessary for the remote steering of the target vehicle 1 in advance. Specifically, when suddenly supporting an unspecified large number of vehicles 1 in various environments, information that can be acquired in advance by the operator before pairing is only a situation at normal time of a road in an in-charge area. Therefore, it is difficult to cause Situation Awareness necessary to accurately perform the remote steering of the allocated vehicle 1 to reach a high level beforehand.

The handling performance of the operating operator tends to greatly change according to a work load. Therefore, from the viewpoint of safety, it is ideal that one operator always handle one vehicle 1 in order to reduce the work load. However, as explained above, there are problems in terms of securing human resources of operators and cost. Therefore, it is always difficult to perform operation using such abundant resources unless a considerable advantage can be found. Therefore, in reality, the plurality of vehicles 1 is allocated to one operator in a time-division manner. That is, for example, the controller allocates the vehicle 1 to the operator in an available state in descending order of priority. At this time, in order to maintain the performance of the operator at a fixed level or higher, the controller performs the allocation while being aware of optimization of a work load applied to one operator.

Note that a flow of a series of work of the operator is considered to be monitoring a plurality of vehicles 1 that apply for support simultaneously in parallel and, during standby, understanding information obtained by the monitoring while organizing the information in the head, and, based on the understanding, remotely steering the vehicle 1 until the vehicle 1 passes through a necessary section, and standing by for the next support request. Here, when the support request of the vehicle 1 is excessively performed during the standby, the brain of the operator exceeds the ability to handle determination, so-called intelligent information transmission in the brain reaches a congestion state, the determination is blunted, and, as a result, the probability of causing erroneous determination increases. Therefore, it is not preferable to excessively increase the number of targets that the operator follows at the same time. As explained above, the work load of the operator includes not only a load while steering is simply performed but also a load for acquisition and understanding of information in the standby stage. Specifically, as the acquisition of the information concerning the vehicle 1 that requests support, the operator acquires information such as a road condition, road characteristics, congestion, and accident occurrence in a supported section in addition to information concerning a vehicle type, a cargo, and the like before the actual remote steering is started.

Further, in allocating the vehicle to the operator, it is not simply required that the work load of the operator is always in a low load state. It is known that a decrease in a degree of a work load due to automation of a system of a worker or the like causes a new problem. In other words, in the system that reduces the load on the worker through automation or the like, an attention load requested to the worker is greatly reduced. Therefore, it is known that attention to work is removed and a serious accident is caused instead rather than becoming safe.

Here, a reason for the above is considered using the manual driving as an example. The most significant example of a negative aspect of safety involved in a decrease in a work load is driving on a monotonous road with little change during traveling. On such a road, since the vehicle travels as it is even if the driver does not actively intervene in steering much, attention of the driver in periphery monitoring for traveling is reduced and the driver falls into careless driving, leading to an accident. A situation is the same even for the operator who performs the remote driving support. The number of vehicle targets to be supported is excessively reduced, there is no need to follow the support request, and, when the work load is constantly reduced, a sense of a request becomes dull. This is due to distribution of mental resources occurring in the brain for risk handling. In a state in which fixed stress is applied for risk handling, a state in which intracerebral (synapse of memory linked with related information) potential that prompts determination for a risk factor is activated is maintained. On the other hand, when the operator is simply placed in the careless standby state, the state does not change to a state of prompting attention confirmation and the like. In this case, there is no restraint of thought for attention, many mental resources in the brain are unconsciously consumed for mind wondering and attention confirmation is neglected. Therefore, balanced operation with which the operator can obtain an appropriate tension state and an appropriate break during the tension state is requested.

Further, the operator is requested to grasp a situation concerning the allocated vehicle 1 and quickly hand over the driving. If such an operation cannot be performed, necessary support is delayed and there is likely that many social negative effects are caused because of an emergency stop, slow evacuation, deceleration, or the like in a road network or a lane with a large traffic volume or a secondary collision accident caused by sudden vehicle deceleration in a road section with a poor front visibility. That is, for the operator to efficiently provide a quick remote steering support service, an HMI that can acquire Situation Awareness necessary for the operator to perform timely and appropriate steering is required. More specifically, an HMI is important with which the operator can raise the Situation Awareness to a level sufficient to start normal and smooth remote steering within a relatively short time from the allocation of the vehicle 1 until actual remote steering is performed. Then, via such an HMI, the operator sequentially acquires fixed prior information, understands prior information necessary for timely and appropriate remote steering such as a situation where the supported vehicle 1 is placed, and, based on the understanding, performs mental resource distribution for each risk to a vehicle type, a road condition, passenger information, and the like necessary for steering to make is possible to maximize the level of the Situation Awareness necessary for support.

Therefore, in view of such a situation, the present inventor has created the embodiments of the present disclosure explained below. The present disclosure proposes embodiments concerning an HMI for an operation in which one operator remotely steer a plurality of vehicles 1.

Specifically, for the operator to perform remote steering of the vehicle 1, it is necessary to grasp a series of situations concerning vehicle control. That is, the operator needs a series of information concerning, for example, what kind of a load, a passenger, and the like are loaded on what kind of a vehicle in what kinds of vehicle characteristics and what kind of support for handling a situation is required. In particular, in steering support during traveling, unless timely information provision is performed, appropriate remote steering cannot be performed and an accident is induced by inappropriate steering measures with instant handover. Therefore, it is necessary to raise Situation Awareness of the operator necessary for steering control to a sufficient level before executing the remote steering. At the same time, the operator needs to determine, according to the situation grasped by the operator, how quickly the handling can be performed and perform time allocation until reaching a handover completion point.

For example, about various accidents such as an aircraft accident and a medical accident in surgery, a main cause is often that necessary information cannot be accurately grasped, handling is erroneously performed, time allocation is erroneously performed, or grasping is not in time and handling is neglected. In order not to cause these accidents, both of an appropriate HMI serving as a mechanism for increasing a level of situation grasping, that is, Situation Awareness and an information collection mechanism that can be presented to the operator via the HMI are strongly requested (further, a section passing leading vehicle and the like are also requested).

According to the embodiments of the present disclosure, when the operator receives a request for remote steering support from an unspecified large number of vehicles 1, it is possible to provide the target vehicle 1 and the periphery of the target vehicle 1, which are information actually necessary for remote steering, in an appropriate form and appropriate timing. According to the present embodiment, appropriate determination and handling can be quickly performed. As a result, it is possible to realize remote support for maintaining smooth traveling without forcing the traveling vehicle 1 to stop and stand by. Details of the embodiments of the present disclosure created by the present inventors are explained below.

6. First Embodiment

<6.1 Control Center>

Figure 6:
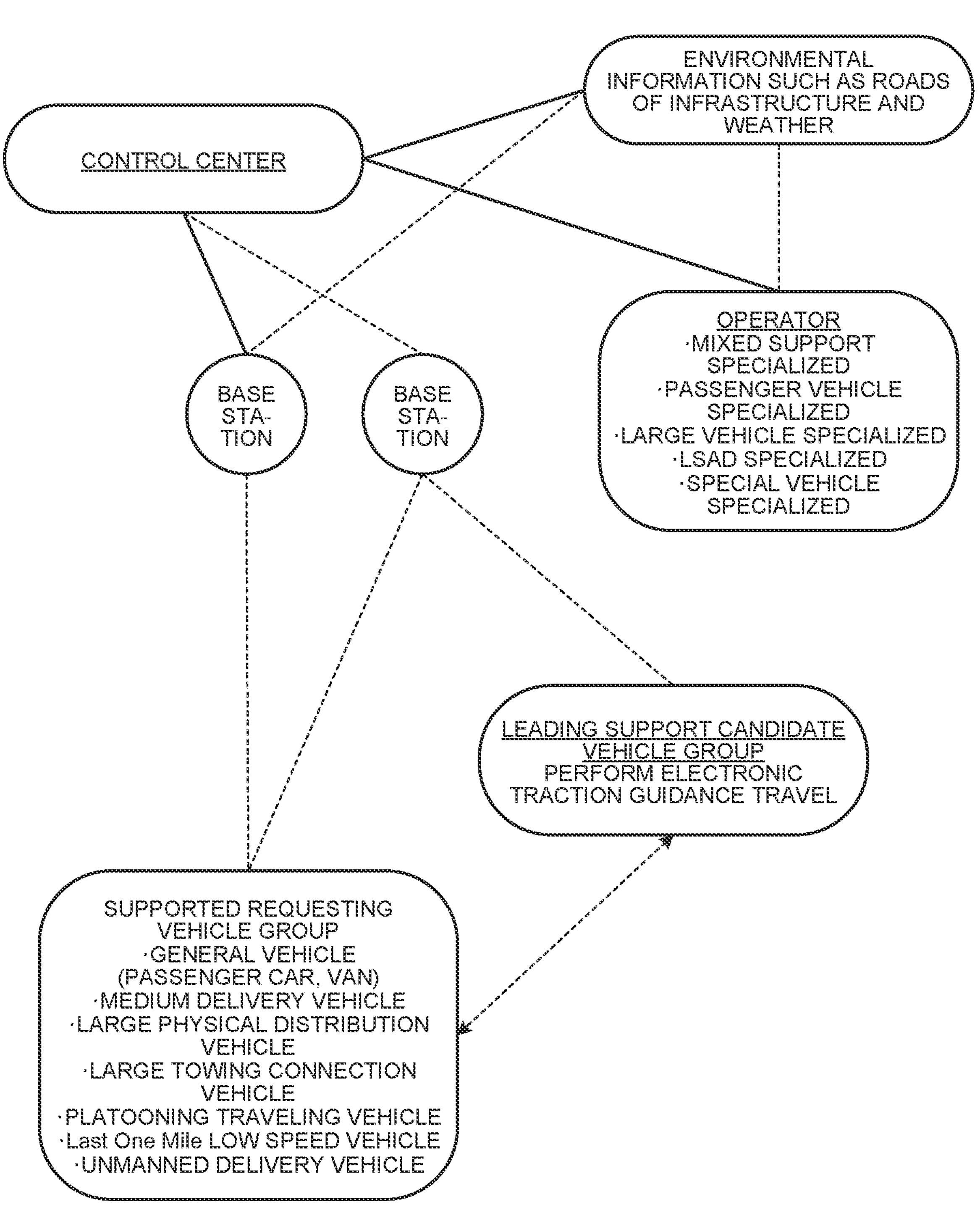
FIG. 6 is an explanatory diagram for explaining a relation between a control center and a vehicle 1.

First, a control center according to a first embodiment of the present disclosure is explained with reference to FIG. 6. FIG. 6 is an explanatory diagram for explaining a relation between the control center and the vehicle 1.

A controller who allocates an operator to a vehicle requesting support and an operator who performs actual remote steering belong to the control center. The control center can provide a remote steering support service to the vehicle 1. Note that, in the present embodiment, basically, the controller allocates (matches) the operator and the vehicle 1 and, when the allocation is decided, the controller returns to an overall traffic monitoring operation and does not intervene in individual remote support itself. Note that, as a limited use case that the controller continues to handle, there is a case in which, even if the operator has handed over driving (has started the remote steering), an inappropriate response has occurred and emergency handling for preventing development to an accident or the like has become necessary. Even in this case, the controller basically, for example, only transmits an emergency handling command, reports occurrence of a risk incident of a handover failure to the control server, and activates an MRC for autonomous emergency. The controller enables to these kinds of handling to leave room for instruction transmission or an emergency stop or the like sudden physical condition deterioration or inability of handling of the operator, whereby it is possible to notify occurrence of an abnormal situation beforehand to the following vehicle of the vehicle 1 and to reduce a risk of secondary damage such as collision.

Specifically, as illustrated in FIG. 6, the control center (specifically, a server) can receive support requests from the vehicle 1 via a base station. Examples of the support requesting vehicle 1 include a general vehicle (a passenger car and a van), a medium delivery vehicle, a large physical distribution vehicle, a large towing connection vehicle, a platooning traveling vehicle, a Last One Mile low speed vehicle, and an unmanned delivery vehicle.

The server of the control center is communicably connected to an HMI or the like of an operator who actually performs remote steering. Note that, in the operator, for example, a specialized team may be provided for each of support targets. Examples of the specialized team can include a mixed support specialized team that can support various vehicles, a passenger car specialized tasks force that supports general passenger cars, a large vehicle specialized team that supports large vehicles, a low-speed automated driving (LSAD) specialized vehicle that supports low speed vehicles, and a special vehicle specialized team that supports special vehicles. Operators may be divided into such teams.

Further, the control center is communicably connected to a server that stores and distributes, for allocation and steering support, map information (LDM) of roads serving as infrastructures and environmental information such as weather of an in-charge area. For example, the control center acquires, from the server, sequentially updated infrastructure information (information concerning road conditions, accidents, and the like), atmospheric phenomena, weather information, calendar information, service usage statistical information that can be used as learning data, service usage pre-reservation information, and allowable accommodation residual amount information of a vehicle evacuation center. Based on these kinds of information, the server of the control center can predict a margin of a communication infrastructure, predict a margin of service provision, predict urgency of support of the vehicles 1 demanding the support, select a candidate of an operator to be matched with a support target vehicle, and generate work schedules of the controller and the operator. Note that the server of the control center can perform the prediction and the like explained above by statistically processing obtained information or performing machine learning.

The vehicle 1 demanding support is originally the vehicle 1 assumed to travel in automatic driving. Therefore, it is assumed that an infrastructure for the automatic driving is developed in a section where the vehicle 1 travels and the vehicle 1 equipped with ADAS equipment is traveling around the vehicle 1. Therefore, the control center has a mechanism that can acquire not only sensing data directly connected to the supported vehicle 1 such as sensing data captured when the vehicle 1 travels but also information captured in an LDM Cloud in a relevant region. By interchanging these kinds of information, information necessary for determination relating to the operator who actually performs the remote driving support is appropriately and selectively provided and the operator starts grasping a situation beforehand through the operation HMI. Therefore, it is possible to improve Situation Awareness necessary when actually starting the remote steering.

Note that, in operation of automatic driving, means for obtaining information concerning traveling is necessary. However, in many roads, it is considered unrealistic to install cameras and the like in all sections by infrastructure investment. Therefore, it is considered realistic to provide a mechanism in which, in return for many vehicles 1 obtaining information such as images of roads, the own vehicle 1 transmits information such as camera images (falling object discovery, flooding information, snowing information, and the like in a passing road section), risk notification, and the like from the own vehicle 1 as well and shares the information with infrastructures and peripheral traveling vehicles such as the following vehicle. Such a function may not always be mounted on all the vehicles 1. However, it is considered that information can be shared if several ADAS function-equipped vehicles 1 having a peripheral monitoring function are traveling. Since there is a possibility that there is a problem in reliability of risk notifications obtained from the vehicles 1, it is preferable that the risk notifications are once notified to the control center, and, after the controller or the system promptly makes a determination, the risk notifications are shared among relevant vehicles 1 according to necessity.

That is, circular utilization of risk information progresses in which, in many vehicles traveling on a public road including the own vehicle, the system automatically detects information that can be a risk for the following vehicle to pass through a section or the driver or the like senses the information and notifies a local traffic management Cloud and an information update generation Cloud of the LDM by, for example, pressing a notification button or the like, and the notification information is utilized according to the reliability of the provider of the information. In normal manual driving, not only the driver is looking behind the preceding vehicle but also distance situations enter the field of view and various risk situations such as accidents and construction unconsciously seen in the field of view ahead of a traveling road are unconsciously captured and the driver approaches, handles, and passes through points in a situation in which Situation Awareness is increased. In remote steering of a supported vehicle switching type for switching a supported vehicle, it is difficult to grasp a visual situation equivalent to that obtained by continuously looking forward in a driver's seat, unlike when getting on the vehicle and directly steering the vehicle. Therefore, instead, information having high reliability and credibility is provided to the operator together with information concerning an LDM, which is always updated, based on information complemented and provided by the preceding vehicle or the like. Therefore, it is possible to increase Situation Awareness of a risk of a road.

A service provided by the control center is not limited to only the remote steering support and may include a service for guiding traveling of the target vehicle 1 with the leading guide vehicle. Therefore, it is preferable that the control center is also communicably connected to, via the base station, the vehicle 1 that is a candidate of a guidance vehicle that performs leading support.

When the remote operator performs remote steering, the remote operator does not always need to directly steer a supported vehicle. When the operator attempts to realize direct support of the vehicle 1, it is assumed that the operator needs highly accurate information concerning the entire periphery of the vehicle 1 necessary for safe traveling from the supported vehicle 1 via wireless communication. Therefore, the vehicle 1 inevitably becomes expensive because of necessity of improving equipment performance and a situation in which it is difficult to widely and generally purchase the vehicle 1 is also predicted. Therefore, when the remote driving support is performed, one dedicated towing service vehicle may be further dispersedly disposed between the supported vehicle and the operator to cause the towing service vehicle to acquire surrounding environment information and perform advanced and high-speed communication and the remote operator may support, based on information acquired from the towing service vehicle, traveling section passage of the supported vehicle 1 in a form of leading and electronically towing the towing service vehicle. Here, although the towing service vehicle is disposed, the vehicle may actually be a two-wheeled vehicle, a three-wheeled vehicle, or a small vehicle excellent in undercarriage or a mobile body in a form different from a normal vehicle such as a drone may be used as information acquisition equipment at the time of leading and remote steering. In particular, since the mobile bodies excellent in undercarriage is requested to quickly respond to a change over time of a road environment and incident occurrence and information collection in development and operation of an always updated LDM that supports vehicle traveling in the automatic driving, it is also assumed that these mobile bodies are disposed with a main object of collecting information concerning probing at important and main points where there is a risk of a road. Therefore, an operation shared with such usage may be used.

<6.2 Overview of a Work Procedure of the Operator>

Figure 7:
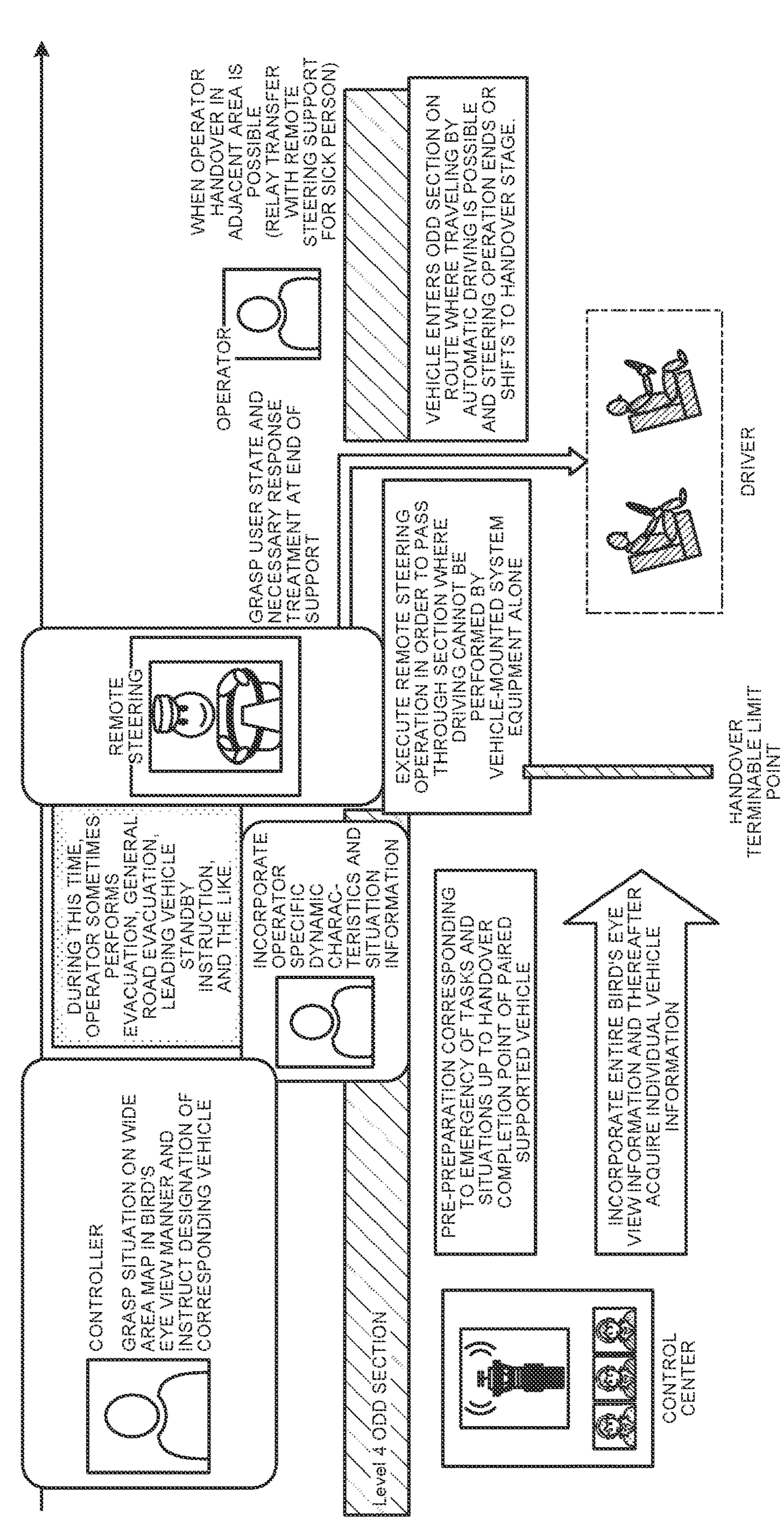
FIG. 7 is an explanatory diagram for explaining an overview of a work procedure of an operator.

Next, an overview of a work procedure of the operator is explained with reference to FIG. 7. FIG. 7 is an explanatory diagram illustrating the overview of the work procedure of the operator.

It is assumed that the operator is also similar to a driver riding in the vehicle 1 and the brain's thought ability behaves substantially the same as that of a general driver. Furthermore, in general, there is a limit in thought that a person can handle at the same time. An ability of simultaneously think of a plurality of things in parallel is poor. Therefore, it is considered preferable to limit, to a certain degree, the information to be presented to the operator. If all kinds of information about the vehicle 1 that needs to be handled is presented from the beginning, the operator's Working Memory focuses on grasping all the information and, even if bird's-eye view information is given on a map, the operator's Working Memory is occupied by the information presented first and overlooks information that could have been understood by looking down on the map may be overlooked.

Therefore, the information to be presented to the operator is considered to be preferably provided in order centering on 1. information about a surrounding situation in which the supported vehicle is placed,
2. information about dynamic characteristics of the vehicle, and
3. a moving image of a traveling scene.

Note that the Working Memory explained above means a memory task that can be simultaneously executed by the brain that behaves as if the capacity thereof is finite. Then, Situation Awareness is generated by a mechanism that captures information that is memory information having a risk of decline with time and is perceived by the brain necessary for the latest action determination. The information can be linked with situation grasping necessary for action determination by being captured by the brain, selected by the brain, and temporarily retained.

The Working Memory is temporarily occupied for excessive situation grasping until the operator obtains information necessary for stable remote steering and shifts to stable remote steering. However, when the operator gradually shifts to the stable remote steering, it becomes easy to capture new information. Therefore, it is preferable to provide information according to a situation of the operator. Further, when the operator has shifted to the stable remote steering, it is also possible to start preparation for remote steering for the vehicle 1 to be handled after the remote steering is ended. That is, it is possible to acquire information concerning the next target vehicle 1 for which the remote steering has been completed at the present point in time. That is, since a wide variety of the supported vehicles 1 are switched, if surrounding images acquired suddenly during traveling are displayed one after another to request the operator to perform steering, depending on a surrounding situation, the information may be excessive, the situation determination cannot catch up with the information, and the operator panics, or prompt reflective steering not involving target action thought is likely be performed.

Specifically, as illustrated in FIG. 7, the controller grasp, in a bird's-eye view manner, via a monitor on which a wide-area map is displayed, a situation of the in-charge area. Then, when a support request is sent to the control center from the vehicle 1, the control center designates vehicles corresponding to the support request and instructs the operators while receiving the support of the server of the control center. Here, as illustrated in FIG. 7, it is assumed that the vehicle 1 performs the support request before the ODD section at the level 4 ends.

The operator visually checks the position of the vehicle to be supported in the in-charge area via the monitor on which the wide-area map is displayed until the allocation (designation of an in-charge vehicle) by the controller is completed and acquires bird's-eye view information (standby). At this time, it is preferable that, on the wide-area map, not only the position is displayed to be easily visually recognized by the supported vehicle but also the priority of the correspondence of the vehicles 1 is displayed to be understood at a glance. Note that, in the present embodiment, in a situation in which the number of the support requesting vehicles 1 is small, the operator may play the role of the controller, and the allocation (pairing) of the operator to the vehicle 1 may be performed by utilizing a function or the like of the server of the control center performing optimum allocation with a learning model such as artificial intelligence.

Then, as illustrated in FIG. 7, before the vehicle 1 reaches the handover terminable limit point, the operator acquires necessary information concerning the target vehicle 1 as preliminary preparation corresponding to a degree of urgency of a task or a situation until handover completion of the paired supported vehicle 1. For example, the operator acquires individual vehicle information such as a vehicle type and a loaded cargo and situation information such as individual dynamic characteristics (braking, acceleration, steering wheel steering amount, and steering torque), a support urgency, and a support request reason (movement of a sick person, use of a vehicle by a non-healthy person, part of an LSAD normal operation service, discharge guidance support of a non-leading vehicle traveling in a platoon to a general road away from the platoon, an emergency support request of a sudden illness driver of a general vehicle, emergency request support of a passenger of a ridesharing bus due to a driver's sudden illness, automatic or manual remote support of a sudden change in a physical condition of a freight vehicle driver, restoration give-up/emergency support within a time from a secondary task by a driver when using a general passenger vehicle, emergency support for prevention of unexpected dozing in use in the level 3 of a general passenger vehicle, and preventive remote steering evacuation support for avoiding a stop in an emergency MRM vehicle stop prohibited section, and the like).

Operation of a local transportation service by an LSAD is explained as details of one case of importance of prior information acquisition by the operator. In a bus including standing seats used by elderly people and school children in a region such as a route bus, a driver carefully operates the bus while observing seating states of passengers and presence or absence of not-seated passengers through a mirror in a vehicle interior and performing handling such as acceleration at a start time and prior deceleration and caution announcement at the time of turning a curve to prevent passengers from falling down. If the vehicle is to be remotely steered in such an LSAD, the operator cannot give the same attention care as when riding and driving because the operator is in a situation in which the operator does not know passenger information in the vehicle interior at all. Therefore, in a vehicle in which posture care for passengers is necessary, for example, a state detection is performed for the positions of the riding passengers, standing seat postures, posture securing with straps held by one hand, and operating smartphones without holding straps, and, for example, red or alerting display is superimposed on a riding position of a passenger in a falling risk posture the bird's-eye view information in the vehicle interior and presented to the remote operator. By performing such presentation, the operator who has started the handover steering can start the steering while paying attention as in the case of the riding driving. In this case, since detailed analysis of the postures of the passengers is desirable, it is preferable to use posture analysis equipment capable of performing a three-dimensional analysis such as a sensor by a Time of Flight (ToF) method, a sensor by a Structured Light method, or a stereo camera. These kinds of passenger posture analysis equipment may be used to acquire information for determining an upper limit of acceleration/deceleration of automatic control at the time of normal autonomous automatic driving control besides providing a passenger posture notification to the remote steering operator.

As explained above, to realize safe handover by the operator in order to provide the service by the remote driving operator to a wide variety of vehicles 1, the operator is requested to maximize the Situation Awareness before an instance of starting steering. Therefore, it is preferable to collect various kinds of prior information not only from the vehicle 1 but also from other than the vehicle 1 and display the information to the operator as appropriate. However, it is not always the case that an image of the interior of the vehicle is simply displayed and the operator has time to carefully look at each passenger like carefully as if searching for an error with respect to the image. In order to urge the operator to grasp a situation requiring attention in a short time, the system recognizes in advance, for each of passengers, a type of passenger to be noted such as an elderly person by the system explained above, use of a walking assist device (such as a cane), and the like, and transmits an advance notification at a point in time of a remote support request. This helps the operator to grasp the attention.

That is, the operator acquires information for raising the level of the Situation Awareness for steering based on a correct determination at the time of performing remote steering, such as in what kind of situation an individual vehicle requesting support is approaching an automatic driving limit point. For example, the operator acquires information such as a traveling point and a traveling direction on a map, a road situation (a congestion risk and a collision risk), a road surface situation of a section, a user situation, a driving caution point (a point where accidents frequently occur, a section where traffic congestions frequently occur, an uphill, a junction, and the like) of a relevant traveling route based on past records, presence or absence of a peripheral approaching traveling vehicle on the map (confirmed by presence or absence of a vehicle symbol or the like traveling ahead of a traveling direction on the map), a risk avoidance option and a limit exit, a PA/SA point, presence or absence of a retreat road shoulder of a traveling road section, and characteristics unique to a target vehicle. At this stage, the operator is requested to have a sufficient level of prior Situation Awareness necessary for stable remote steering.

Next, the operator acquires a front image and a side mirror image of the vehicle 1 necessary to perform the remote steering. Note that, in the present embodiment, in order to avoid excessive information, it is preferable not to provide these kinds of information first. Since a moving image that changes at high speed maximizes a thought load, the operator's Working Memory is occupied by processing of the moving image. Then, a part of information that cannot be intuitively grasped is blocked, even though the information is important. Therefore, for example, if the operator has acquired information of individual dynamic characteristics such as ineffective sudden braking (there are many loaded cargos and a moving distance is long) before this stage, it is possible to smoothly determine to decelerate early in order to avoid sudden steering or braking.

Then, before the vehicle 1 reaches the handover terminable limit point, the operator grasps a necessary situation (increases the Situation Awareness) and starts the remote steering. That is, the vehicle 1 executes a remote operation in order to pass through a section where driving cannot be performed by vehicle-mounted system equipment alone. Although it is exceptional, in the information acquisition period explained above, the operator sometimes instructs evacuation, evacuation to a general road, standby of a leading vehicle (if there is a party to be paired to lead), or the like depending on a situation.

Further, the operator completes the driving handover and shifts to stable remote steering. At this stage, the operator continuously acquires information concerning a surrounding situation necessary for steady remote steering. When the remote steering has been successfully started, the operator may notify the completion of the handover to the driver of the target vehicle 1.

When the end of the remote steering section is approaching, the handling changes depending on a situation. For example, when the driver of the target vehicle 1 is a sick person and cannot recover, an operator in the adjacent area performs handover again. Therefore, at this stage, the operator sometimes monitors a state of the driver such as whether the driver has recovered to a state in which the driver can use the automatic driving.

As explained above, the remote steering is mainly assumed to be used in a requested section passing region of a part of a moving section of the vehicle 1, that is, there is an end point in a section where the remote steering is supported. When the vehicle 1 approaches the end point of the remote steering support, the handling changes depending on a situation. For example, when the driver of the target vehicle 1 is a sick person and cannot recover, an operator in the adjacent area performs handover again. Therefore, at this stage, the operator preferably monitors a state of the driver such as whether the driver has recovered to a state in which the driver can use the automatic driving.

According to the end of the remote steering section, if a situation that the operator should handle is a public route bus such as the supported vehicle 1 being an unmanned LSAD, temporary handling support at the time of using the automatic driving of the level 4 in the normal vehicle 1 for personal use, movement support for a sick person, or the like, it is preferable to make a support end announcement that gives a sense of security to passengers. Further, in the case of primary support of an individually-used vehicle, it is preferable to check completion of support to a requesting driver by telephone call and, in the case of support across in-charge sections in movement of a sick person or the like, it is preferable to check handover with an adjacent section support operator who performs the handover. Further, the remote support system may assist the announcement, the notification, the check, and the like explained above via the HMI thereof.

Specifically, when the target vehicle 1 enters the ODD section where the automatic driving in the level 4 is possible, whereby the remote steering support by the operator is ended, it is necessary to have the driver of the target vehicle 1 recognize the support end. A reason for this is that, since the traveling is continued without intervention in steering, there is a possibility that the driver has an illusion that the vehicle is protected by the operator's remote steering even if the driver does not return. Then, even if the ODD section where the vehicle can travel at the next level 4 approaches the end, the driver is likely to misunderstand that there is no problem even if the driver overlooks a return request notification from the system. That is, this is because it is necessary to reset the driver's mind. Therefore, the operator monitors a driver's condition such as whether the driver has returned to a state in which the driver can use the automatic driving and grasps the driver's condition. In a case where the return of the driver cannot be confirmed, the operator performs necessary handling such as evacuation and a stop. However, if it has been successfully confirmed during the support that the driver clearly recognizes that the driver is receiving the support, work of urging the driver's recognition is unnecessary.

In a case of handover to an operator in the next adjacent area, it is preferable to display the operator in the adjacent area on the map and transmit cautions using verbal communication by voice conversation. By doing so, it is possible to expect a reduction in carelessness and the like in terms of ergonomics. However, there is also a case in which the voice conversation is not suitable at timing when the operator has already shifted to other vehicle handling and started to provide a service according to an occurrence frequency and handover point approach time. Therefore, the voice conversation may be combined with an information transmission means by a map monitor or an information monitor.

When the support request is received at the last moment, it is also possible that there is no time to sufficiently grasp a situation. In such a case, it is desirable that, originally, the operator avoids unnecessary deceleration of the vehicle during cruise traveling adjusted to the periphery. However, the operator may decelerate early if grasping of a situation necessary for handover is insufficient. At this time, while taking care not to disturb traveling of other peripheral vehicles and the following vehicle so much, the operator may request the following vehicle to decelerate and slow down by performing information transmission of a light or a warning mode to the following vehicle according deceleration or the like using V2V communication by utilizing DRSC or the like.

Note that, since the remote steering support is support using communication, it is naturally difficult to perform remote support when communication is interrupted. Therefore, in order to reliably execute the support, the operator may avoid a risk of interruption of the communication by, for example, grasping in advance a congestion state of a communication network in a planned course in which the target vehicle 1 advances after request or making reservation of high-speed wireless communication to secure a use band in advance.

<6.3 Action Determination>

Action determination of the operator is explained with reference to FIG. 8. FIG. 8 is an explanatory diagram for explaining the action determination of the operator.

Incidentally, normally, the driver performs a defect check of the vehicle 1 on which the driver rides and checks characteristics of the vehicle 1, passengers, baggage, weather of a travel itinerary, a congestion state, and the like in advance. Then, during traveling, the driver also cares about road information and information concerning a following vehicle at a distance on a road and performs steering at that instance based on fixed prior knowledge. Since the remote operator cannot directly perform pre-operation inspection performed by the driver, the remote operator is in a state in which the remote operator significantly lacks a sense of prior caution that can be acquired from various inspections and operational feelings unconsciously performed by a normal driver before operation or during driving such as a degree of tire pressure, a state of application of a brake, loaded cargo, and the like. Then, in such a state, the operator shifts to execution of a series of remote driving support.

Then, when the determination of the driver shifts to actions, the actions can be classified into the following actions.

1. Danger is imminent, and Quick reflective action.
2. Selective action based on visual information or the like captured instantaneously and directly.
3. There is time to make a decision, and a selective action after predicting a result exerted by the action.

Based on the information acquisition, the determination based on the information acquisition, and the action selection by the driver explained above, information acquisition, determination based on the information acquisition, and action selection by the operator are examined. Specifically, as illustrated in FIG. 8, the operator visually checks visual information on the monitor screen and starts steering. Then, the operator starts an action based on the notification information obtained in this way. As explained above, as a first action, there is a quick reflective action. However, the quick reflective action is not a preferable action as an action of the operator because the quick reflective action involves a risk. As a second action, there is a selective action based on an event of "front of eyes" captured through an image. As a third action, there is a selective action performed after acquiring knowledge to a degree that influence prediction can be performed according to handling steering. Such a selective action can be considered a preferable action not only for the driver on board but also for the operator who performs the remote steering. That is, the second and the third actions are preferable. Until such actions can be selected, it can be considered that the Situation Awareness is secured at a fixed level or more by placing oneself in a state in which knowledge about a surrounding situation of a road and the influence of the handling steering can be acquired in advance. In driving in a town, a situation of a nearby road is looked over and, in a freeway, driving is performed with a gaze directed to a distant place at the time of high-speed traveling on a straight road in order to ensure this predictability.

Further, the operator who performs the remote steering support is naturally one human, and an action at the time when the human performs some handling action includes a quick reflective action for mainly securing his/her own safety, an initial action considering influence caused by an action started by the reflective action, and a thought action based on determination further added with prediction. When there is no stimulus that makes people aware of urgency, in some case, the action does not lead to the quick reflective action and shifts to the thought action from the beginning. In particular, in the case of the remote operation support, although it is expected that the thought action mainly occurs, in order to realize the remote operation support, it is necessary to provide, to the operator, information that causes the action determination in advance.

For example, a case in which the operator is notified of only a request without being given any prior information at all is examined. In this case, the operator takes a reflective action for a display image based on experience only from an initial image. Then, the operator understands the validity of the first reflective action based on transition due to a dynamics change of the target vehicle 1 as a result of the reflective action and additionally obtained information such as vision and then determines an appropriate remote steering amount and the like to perform the remote steering on a full scale. Such a method is not suitable for application to general vehicles because there is a high risk of causing a secondary induced accident when being performed in high-speed traveling and social acceptability is low. For example, it is preferable to limit the method to operation in Low Speed Mobility for a local service in which a route is defined in advance. In the Low Speed Mobility serving as moving means of a Last One Mile system such as a local service, the operator can have, as knowledge, beforehand, characteristics of a traveling vehicle, a traveling road, an assumed situation, and the like to some degree. Therefore, the information that the operator has as such knowledge supports Situation Awareness and can be applied in immediately preceding information provision.

Incidentally, in biological information transmission transmitted via nerve cells, neural transmission information emitted from individual terminal nerves or memory information is electrically transmitted through Axon and chemically transmitted between nerve cells via a site of a neuron cell called synapse. Furthermore, the information transmission is taken over by one of a large number of dendrites, which are receivers, extending from the neuron cells. Nerve cells in which the large number of inputs cross act in an overlapping manner on a node called a soma portion and are input and integrated in the soma portion from a large number of neurons to the nerve cell. However, information that reaches one neuron cell is not simply transmitted in a relay manner. In order to encounter a danger and proceed with further information transmission that urges determination and action, it is necessary that an input of information that is the last deciding factor exceeding a threshold value enters the synapse at a stage where further information "relay" that proceeds to determination of a neuron connected to the synapse is not interrupted. A node of the neuron exceeds a threshold with an information input necessary for firing, and information concerning the firing is relayed to the next nerve via an axon. Note that if a situation in which attention or the like to a related event is not paid continues or information concerning a priority event is added, the firing is inhibited. Such subtraction of the potential in the soma portion called inhibitor does not resultantly link the firing of the transmission to action determination.

From a macroscopic point of view, in order for the operator to make appropriate action determination, as a previous stage of receiving a stimulus as information that is the final deciding factor, it is necessary to pay attention to redundant related information and to be in a state in which the neuron group is activated to before a threshold of so-called firing.

In addition, from a microscopic point of view, many memories and input stimuli occur simultaneously and in parallel in a multiplex manner and, in the manual driving, in order to acquire information leading to a determination action at every moment, the driver looks at a distance, looks into a rearview mirror, and unconsciously takes information such as intervals between right and left parallel traveling vehicles of the vehicle, a situation of a traveling road, and the like, which serve as a transmission trigger for instructing determination of steering such as a steering wheel, an accelerator, and a brake at every moment.

As explained above, the driver who is continuously performing the manual driving unconsciously scans and captures various kinds of information while steering the vehicle. When a physical command is issued at the time of steering a steering wheel or stepping on an accelerator or a brake pedal, a series of kinds of information obtained unconsciously are relayed many times and a determination is fired. The background of the rapid determination of the appropriate action is that a relay-type firing occurs in nerve nodes and the neuron is at a fixed level of a ready state because of this simultaneous parallel unconscious information collection and transmission relay, which is performed several times to enable the determination. These states taken as comprehensive results appear as driver's Situation Awareness.

When all the actions of the person are executed for the first time after tracing only a loop explained above, result prediction for a handling action is performed based on matching with the memory and a matching result and determination for a risk reduction is made and an action is performed. Therefore, there is a possibility that the handling will be late. On the other hand, in living in nature, there are many situations in which it is too late to avoid danger after such hierarchical risk assessment is sequentially performed. Therefore, a person has acquired a mechanism for avoiding danger or obtaining food by a reflective action as an instinctive mechanism.

In an artificial action such as driving of a car, an intelligent determination action is added. However, an action that requires instantaneous handling includes a so-called spinal reflective action in which an action is performed without waiting for a result of a thought risk decision. Further, when a quick action is taken and a reflective action thereof involves a risk, an action for suppressing the reflective action sometimes is involved when the risk is recognized. Such a reflective action sometimes appears even during driving. In addition, if feedback of the suppression does not work well, excessive steering information transmission is performed without being suppressed, which is dangerous.

Therefore, when the operator handles an unspecified large number of vehicles 1, it is necessary for the operator to grasp appropriate information necessary for action determination at appropriate timing in order to appropriately raise the Situation Awareness before starting the remote steering and to enable a shift to safe remote steering within a preparation time actually allowed until handover completion. In addition, the information needs to be accurately captured through the five senses. That is, it is necessary to give, to the operator as well, information equivalent to a situation that the operator riding the vehicle would obtain at the time of the manual driving. Note that, since appropriate determination of the driver can be made only based on accumulated information obtained in a cumulative manner, information has to be provided, for example, at least ten seconds or more before handover and it is preferable to start from a stage where the entire situation is grasped for ten or more seconds to several minutes.

That is, as information provision to the operator, in order to appropriately increase the Situation Awareness, it is preferable to a. for safe remote steering support, provide a series of fixed information and variation information that determine driving characteristics unique to a supported person, b. provide prior prediction information on an itinerary section road when receiving support of a support scheduled vehicle, and c. provide necessary information for determining in what kind of a positional correlation a supported driving vehicle and peripheral vehicles are, peripheral vehicle information, congestion induction risk to a following vehicle and peripheral traffic due to sudden deceleration, a visual field obstruction risk with to the following vehicle or the like in the case of deceleration or a stop, and the like.

<6.4 LSAD>

Here, LSAD is explained. In so-called Low-Speed Automated Driving (LSAD) in which an operation vehicle can be stopped at any time to earn a handling time, a handling time can be sufficiently secured and, if it is difficult to immediately perform handling, standby on a road shoulder or the like is possible. However, even in such a vehicle, when it is attempted to improve convenience by performing wide-area operation, it is conceivable to assume use of a road environment in which general vehicles are mixed in a part of operation sections.

Since it is assumed that infrastructure investment is not always possible from the background that the purpose of widespread use of automatic driving is to ensure mobility in a region where population decreases or the like, use of a road environment in which general vehicles are mixed is also assumed in LSAD. In such a case, in order to minimize the influence on the following vehicle, there is a high possibility that the operator is requested to grasp live information such as traveling points of a relevant vehicle and usage conditions of a relevant road and to perform handling such as remote steering with a necessary priority.

Therefore, the operator needs to know average cruising speed of the peripheral vehicles at a point when the vehicle 1 receives support and then obtain information necessary for the remote steering support. Note that the above is not applied in a situation in which the number of vehicles traveling around the vehicle is small and there is no risk to the following vehicle or the like even if the vehicle performs deceleration, evacuation and slow down, or the like.

Under such a situation, when the LSAD receives the remote steering support, it is desirable that the LSAD decelerates and slows down to stop and stand by in a section with good visibility while avoiding a curve section, a tunnel, an exit, and the front and the rear of a bridge and an intersection, and the like where there is a risk in a visibility reduction range of other approaching following vehicles or collision avoidance control and, in a freeway, the LSAD moves to a service area or a waiting area at low speed and stands by. In addition, when the operator cannot immediately start support, the operator or the controller may designate the nearest points on the map to evacuate the vehicle 1. That is, as an interface of the operator, a display system that provides these kinds of determination information is necessary as hardware and a hardware configuration that transmits information necessary for control determination derived from a state in which the vehicle 1 is placed and position information is necessary on the vehicle 1 side.

<6.5 Detailed Configuration of the Server>

Figure 9:
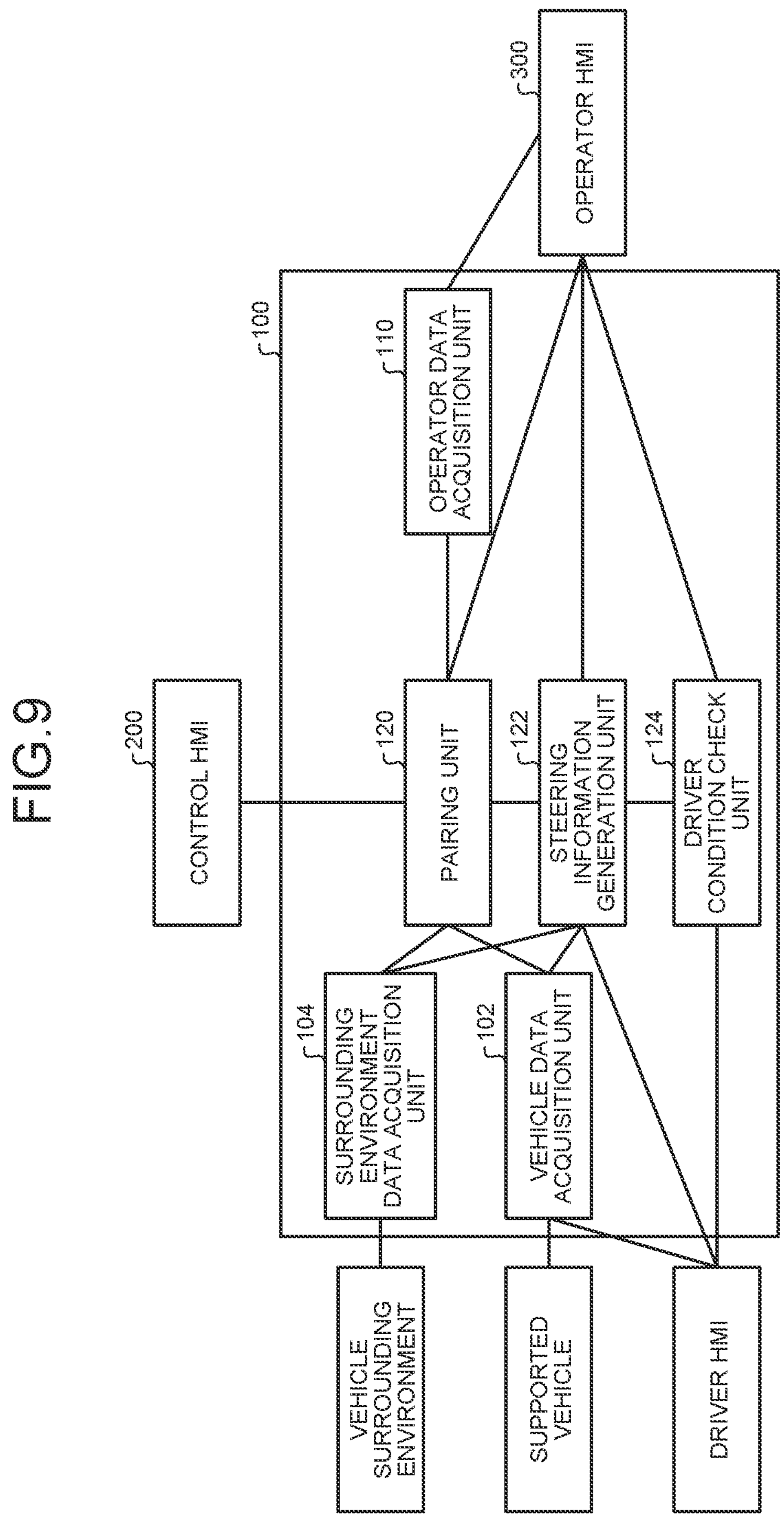
FIG. 9 is an example of a block diagram of a server 100 according to a first embodiment of the present procedure.

Next, details of a functional configuration of a server (an information processing device) 100 according to the first embodiment of the present disclosure is explained with reference to FIG. 9. FIG. 9 is an example of a block diagram of the server 100 according to the first embodiment of the present disclosure. The server 100 is an information processing device for performing remote steering for acquiring and presenting information for performing allocation of operators and remote steering by a controller in a control center. Note that FIG. 9 mainly illustrates only functional units relating to acquisition and presentation of information. Specifically, as illustrated in FIG. 9, the server 100 mainly includes a vehicle data acquisition unit (an information acquisition unit) 102, a surrounding environment data acquisition unit (an information acquisition unit) 104, an operator data acquisition unit (an operator information acquisition unit) 110, a pairing unit 120, a steering information generation unit (an information generation unit) 122, and a driver condition check unit 124. Details of the functional blocks of the server 100 are sequentially explained below. Note that illustration of a probe, electronic towing travel by a leading vehicle, a dedicated leading mobile body, and the like is regarded as a part of the surrounding environment data acquisition unit 104 explained below and is omitted in FIG. 9.

(Vehicle Data Acquisition Unit 102)

The vehicle data acquisition unit 102 can acquire information (for example, a request for remote steering support) concerning the vehicle 1 from the supported vehicle 1 or a driver (specifically, a driver HMI) rising the vehicle 1 and output the information to the pairing unit 120 and the like explained below.

(Surrounding Environment Data Acquisition Unit 104)

The surrounding environment data acquisition unit 104 can acquire information concerning the periphery of the vehicle 1 (for example, ODD, a congestion situation, a speed limit, cruising speed, obstacle position information, risk information, position information of an emergency evacuation space, position information of a surrounding image, and position information of a support image) from a camera provided on the road or another vehicle 1 around the vehicle 1 and output the situation and the like of the traveling road or the like to the pairing unit 120 and the like explained below When other information is provided by a leading vehicle capable of providing information, an update data collecting probe car of LDM, drone type probing means, and the like complementary provision of information that can be acquired by the supported vehicle may be performed in response to a request. Although these pieces of complementary information are greatly helpful in steering by the remote operator and in increasing the previous Situation Awareness, not only a wireless communication network but also a communication band of a wired communication network from a local base station to the operator are finite asset and are limited. Initial information provided to the operator or the controller is type information that can be provided. The operator selectively requests information based on a degree of urgency in terms of safety and a degree of influence on traffic due to success or failure of takeover of a vehicle and adaptively acquires provision of complementary information from the provider in response to the request. Therefore, for example, the HMI is preferably able to acquire information from the provider or acquire information once complemented by a regional server or the like. Here, the HMI is a button type operation piece, a voice call utilizing artificial intelligence, or a selection instruction involving finger pointing call of a menu via a display screen and does not need to be limited to specific means such as mouse or touch pad selection.

(Operator Data Acquisition Unit 110)

The operator data acquisition unit 110 can acquire, via an OPERATOR HMI 300, information such as an operation status and a remote steering amount of an operator who performs remote steering and output the acquired information to the pairing unit 120 and the like explained below.

(Pairing Unit 120)

Based on the information from the vehicle data acquisition unit 102, the surrounding environment data acquisition unit 104, and the operator data acquisition unit 110, the pairing unit 120 can present information concerning the operator, who is a pairing candidate, in order to support the controller in pairing the supported vehicle 1 and the operator. Then, the controller operates the CONTROL HMI 200 based on the presented information and determines an operator to be finally paired.

(Steering Information Generation Unit 122)

The steering information generation unit 122 can generate information necessary for the controller and generate information necessary for the operator to perform remote steering in an appropriate form at appropriate timing based on the information from the vehicle data acquisition unit 102, the surrounding environment data acquisition unit 104, and the operator data acquisition unit 110. Specifically, the steering information generation unit 122 can generate visual information, auditory information, and tactile information and present the generated information to the operator via interfaces corresponding to types of sensations of the generated information. Further, in the present embodiment, the steering information generation unit 122 preferably presents the generated information in order determined based on a thought load of the operator in the remote steering.

(Driver Condition Check Unit 124)

The driver condition check unit 124 can check a state of the driver according to necessity at the end of the remote steering by the operator.

Note that the server 100 according to the present embodiment is not limited to the configuration illustrated in FIG. 9 and may include other functional blocks and the like. The server 100 may include, for example, a remote control unit (not illustrated) that controls the vehicle 1 based on a remote steering amount of the operator. Further, the server 100 may perform a broadcast function for, for example, notifying the peripheral vehicles 1 that the vehicle 1 is remotely steered.

Further, in the present embodiment, the server 100 may be an information processing system configured by a plurality of devices rather than a single device.

<6.6 Details of a Processing Procedure>

Figure 10:
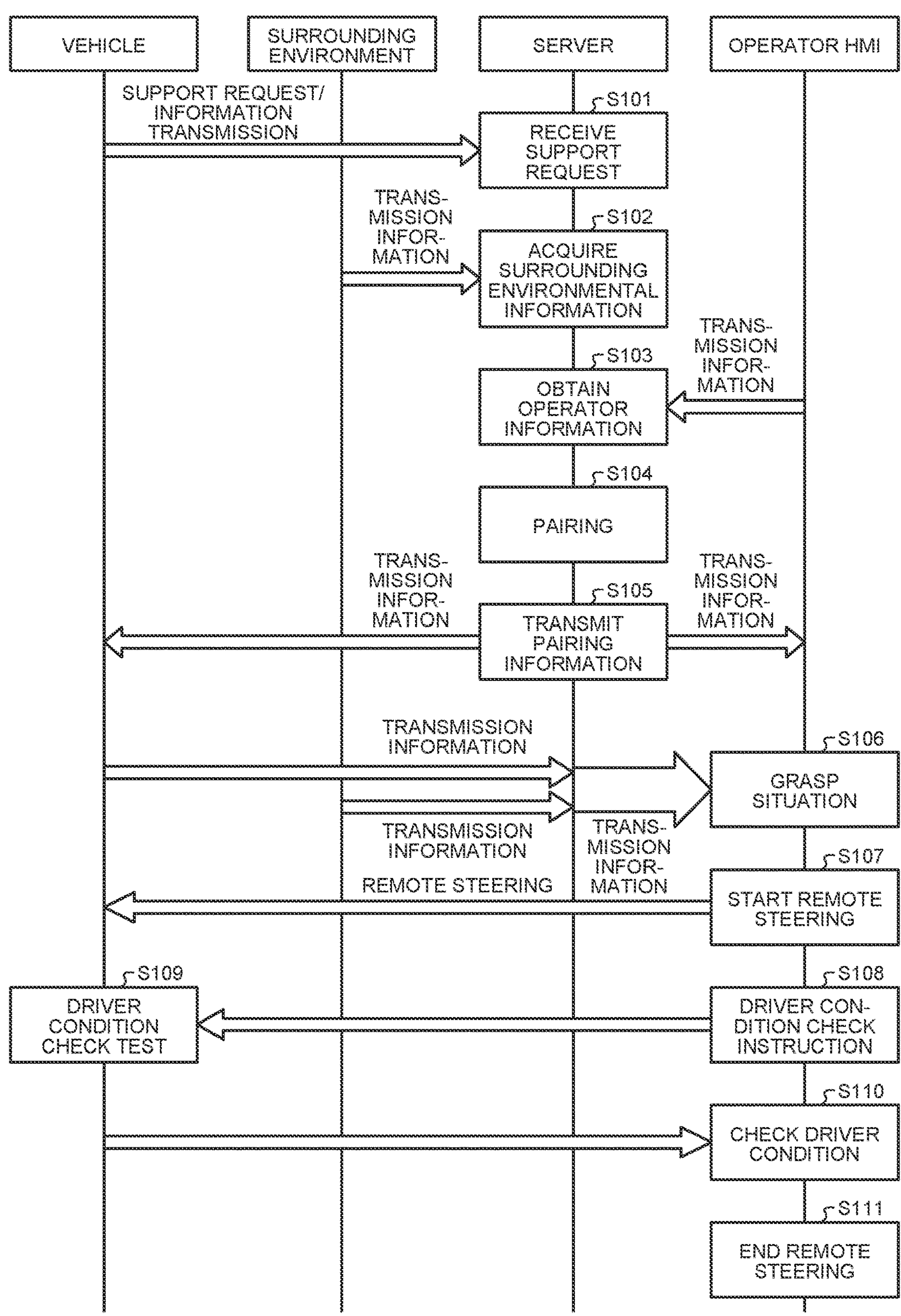
FIG. 10 is a sequence chart illustrating a processing procedure according to the first embodiment of the present disclosure.
Figure 11:
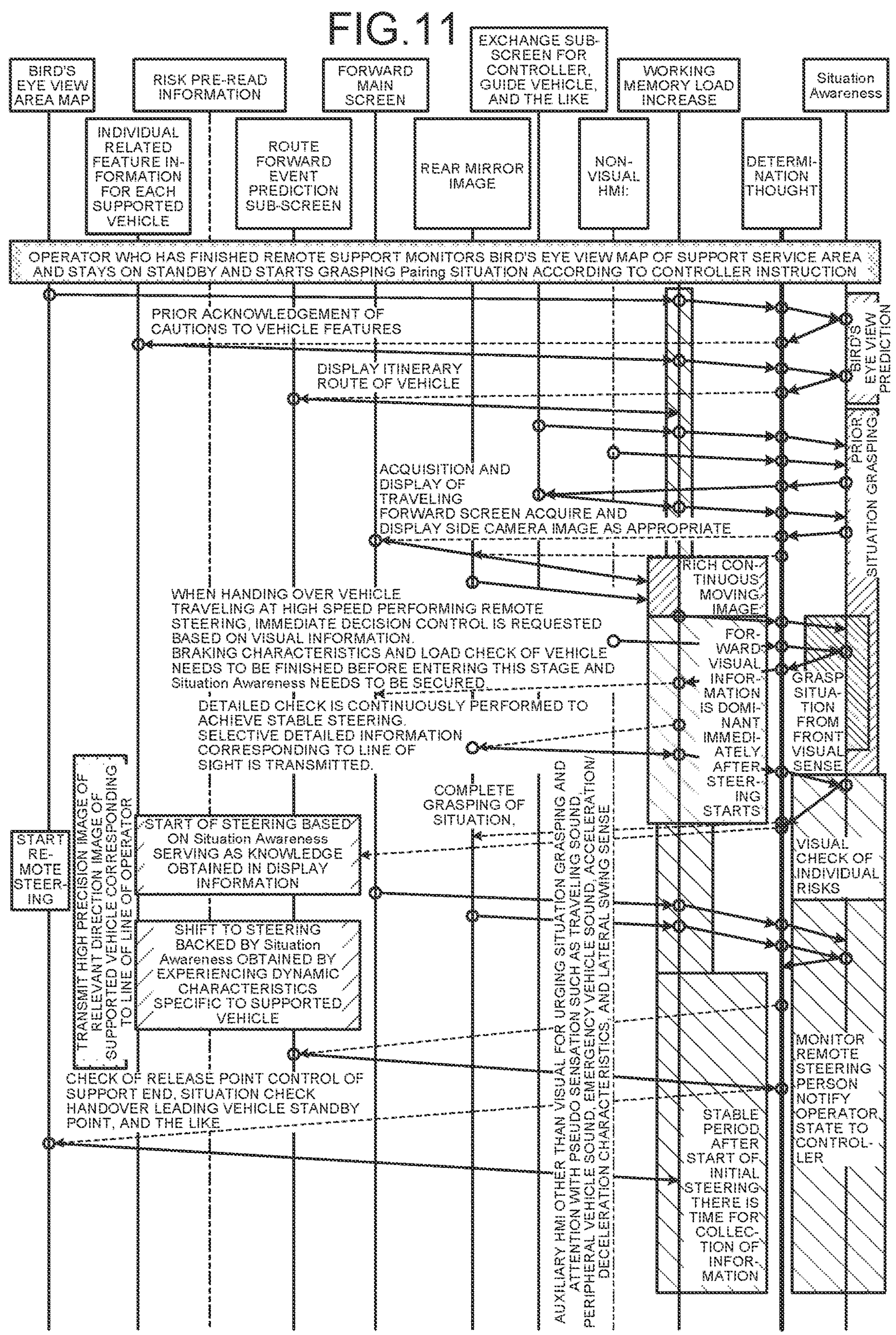
FIG. 11 is a sequence chart illustrating a processing procedure focusing on information acquisition by then operator.

Next, a processing procedure according to the first embodiment of the present disclosure is explained with reference to FIG. 10 and FIG. 11. FIG. 10 is a sequence chart for explaining a processing procedure according to the present embodiment. FIG. 11 is a sequence chart for explaining a processing procedure focusing on acquisition of information by the operator.

First, the processing procedure in the present embodiment is explained with reference to FIG. 10. First, the server 100 receives a support request and information concerning the vehicle 1 from the vehicle 1 (step S101). Subsequently, the server 100 acquires information concerning a surrounding environment of the vehicle 1 (step S102). Further, the server 100 acquires information such as an operation status of the operator via the operator HMI (step S103). Note that step S101 to step S103 may be performed in parallel and step S102 and step S103 may be repeatedly performed at a more appropriate cycle than step S101.

Subsequently, the server 100 presents a candidate of an operator appropriate to be paired with the requested vehicle 1 to the controller based on the information acquired in step S101 to step S103 explained above and finally performs pairing based on operation of the controller (step S104). Note that, during this period, the candidate operator may receive presentation of a part of the information necessary for the remote steering of the support requesting vehicle 1.

Then, the server 100 transmits the determined pairing information to the supported vehicle 1 and the operator (step S105). Further, the server 100 sequentially acquires information necessary for remote steering from the vehicle 1 and a camera and other vehicles 1 present around the vehicle 1 and transmits the information to the OPERATOR HMI 300. The operator grasps a situation of the vehicle 1 based on the presented information (step S106).

Subsequently, the operator performs handover of driving and starts the remote steering before the vehicle 1 reaches a handover point (step S107).

Before the vehicle 1 reaches a remote steering end point, the operator instructs a system mounted on the vehicle to check, according to necessity, for example, whether there is a driver in a state of capable of using automatic driving (step S108). Then, according to the instruction of the operator, the system on the vehicle side performs a test for checking a state to the driver (step S109). Further, the OPERATOR HMI 300 receives a result of the test in step S109 and the operator checks the state of the driver (step S110). Further, when confirming that there is no problem in the state of the driver, the operator ends the remote steering (step S111).

Further, a processing procedure is explained focusing on the acquisition of information of the operator. As illustrated in FIG. 11, first, the operator grasps a situation of a road (a situation of a route) and a pairing situation via a monitor on which a wide area map (a bird's eye view map) of an in-charge service area is displayed (bird's eye view prediction) during standby before performing the next remote steering support.

Subsequently, when the vehicle 1 that the operator is in charge of is determined, the operator acquires and grasps individual information (for example, information such as moving body characteristics of the vehicle 1) and cautions of the in-charge vehicle 1. At this point in time, the operator starts preparation for the remote steering mainly with Situation Awareness based on the displayed visual information. Note that, at this time, it is preferable that the operator checks a release point condition or the like for ending the remote steering support. Further, when it can be predicted from the acquired information that there is a risk that could occur when the supported vehicle 1 travels ahead, the server 100 preferably provides risk prediction information to the operator. At this point in time, the server 100 starts receiving a high-definition image (an image around the vehicle 1) such as a forward direction image of the relevant supported vehicle 1 but does not provide the image to the operator.

Next, while receiving the information of an itinerary route of the vehicle from the server 100, the operator grasps information concerning dynamics characteristics unique to the vehicle 1 while visually recognizing a forward direction image and the like of the supported vehicle 1 and shifts to steering based on such Situation Awareness.

Further, the operator checks not only the forward direction image of the supported vehicle 1 but also an image including a large amount of continuous information such as an image from side cameras of the vehicle 1 and an image of the rearview mirror. At this time, the image information becomes dominant in the Working Memory of the operator and a load of the Working Memory increases. Therefore, it is preferable that the operator ends the check of braking characteristics and the like of the vehicle before starting processing of the visual information.

Subsequently, the operator starts remote steering. Immediately after the start, the load of the Working Memory increases but the load is reduced as the steering becomes stable. Therefore, thereafter, the operator repeats visual selective information acquisition at any time. Here, if the display is started without prior information being provided to the operator before the display of the forward direction image is started, when the operator views only an image and the image is an image with which the operator wants to apply emergency brake, there is a risk that the operator steps on the brake to apply the maximum braking because the operator does not have other determination knowledge. At that time, even if there are other risks such as overturning of the vehicle when the vehicle carries a heavy load and applies sudden braking, since the situation is not grasped in advance, there is a problem in that these concerns are not reflected at all on the control at the time of quick determination. During this period, it is preferable that not only visual sensation but also pseudo sensation such as traveling sound, peripheral vehicle sound, emergency vehicle sound, vibration due to an acceleration change, and a lateral swing interval is applied to the operator at any time. Consequently, it is possible to grasp the situation and call attention. The operator may notify, to the controller who monitors the operator, the state of the remote steering at any time.

As explained above, in the present embodiment, the information necessary for the remote steering is sequentially presented to the operator in order in which the load of the Working Memory of the operator in the remote steering preparation is considered.

<6.7 Details of the HMI>

Further, details of the HMI of the controller and the operator according to the first embodiment of the present disclosure are explained with reference to FIG. 12 to FIG. 17. FIG. 12 to FIG. 17 are explanatory diagrams for explaining an example of the HMI according to the first embodiment of the present disclosure. The HMI of the controller and the operator according to the present embodiment mainly includes a monitor (a display), a speaker, a steering wheel, a lever, and a haptics device mounted on a seat.

Figure 12:
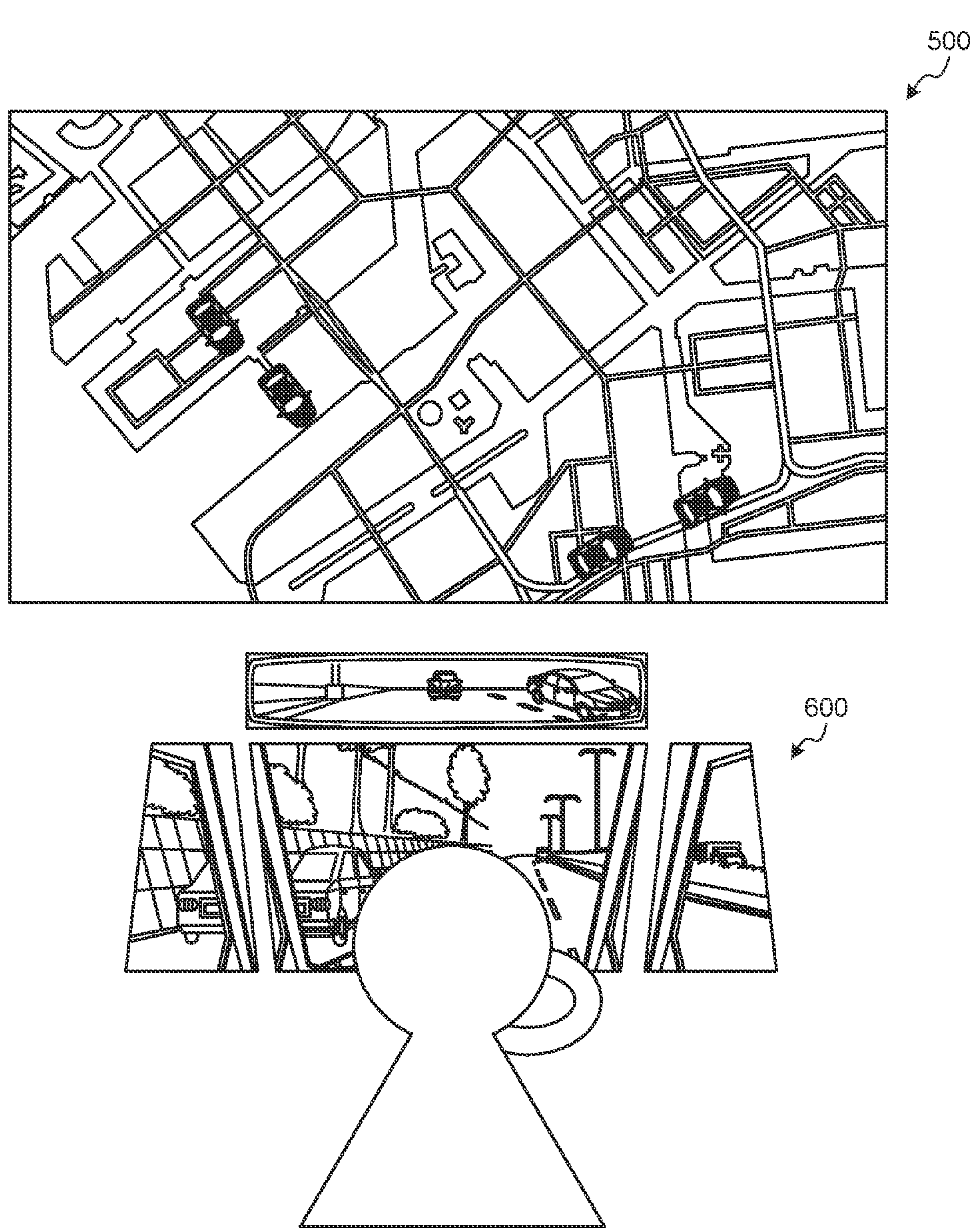
FIG. 12 is an explanatory diagram (part 1) for explaining an example of an HMI according to the first embodiment of the present disclosure.

As illustrated in FIG. 12, in the present embodiment, examples of the HMI used by the controller and the operator can include a monitor 500 for the controller and the operator to overlook a wide area map of an in-charge area and a monitor group 600 including a plurality of monitors used by individual operators. The monitor 500 and the monitor group 600 are displays that provide information acquired by the server 100 to the controller and the operator in a visual form based on operation of the controller and the operator or automatic control.

For example, the monitor 500 displays the position of the vehicle 1 requesting the remote steering support on the wide area map of the in-charge area with, for example, a vehicle-shaped icon (symbol display) or the like. For example, the monitor group 600 is disposed in front of the operators and can provide an image from the vehicle 1 to the operator as if the operator is riding the vehicle 1. Note that the monitor group 600 may include another monitor for displaying auxiliary information in addition to the monitor illustrated in FIG. 12.

Figures 13A, 13B, 13C, 13D:
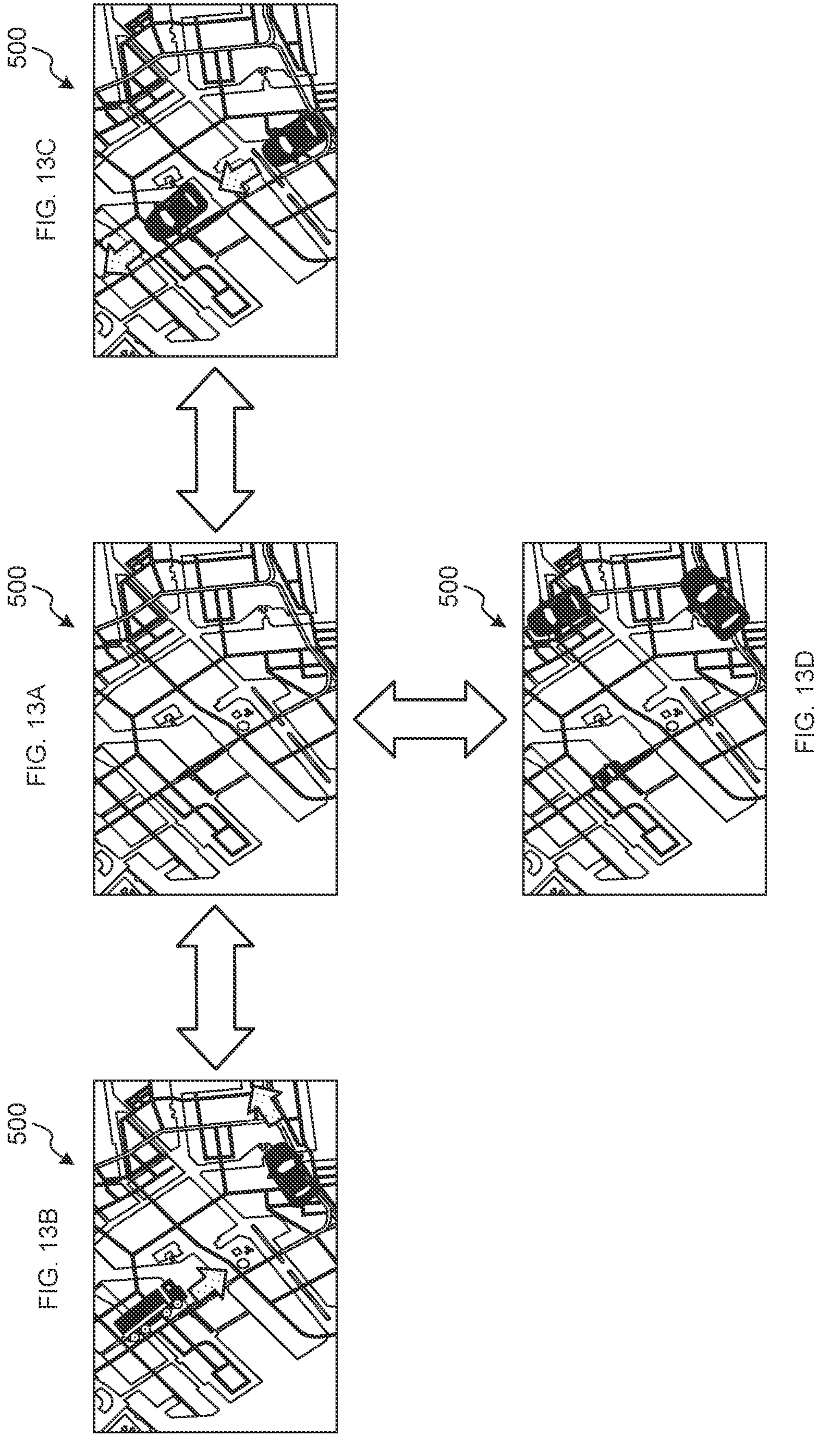
FIGS. 13A, 13B, 13C, and 13D are explanatory diagrams (part 2) for explaining the example of the HMI according to the first embodiment of the present disclosure.

First, details of display of an image by the monitor 500 are explained. As illustrated in FIG. 13A, the monitor 500 displays a wide area map of an in-charge area. As illustrated in FIGS. 13B and 13C, by switching a traveling direction with operation of the controller or the operator, only the position of the supported vehicle 1 having the relevant traveling direction may be displayed. Consequently, the controller or the operator is capable of intuitively grasping the traveling direction of the vehicle 1 requesting the support and can perform appropriate allocation. Further, consequently, it is also possible to prevent the operator from being confused in recognizing the traveling direction due to the remote steering.

Further, as illustrated in FIG. 13D, display of the relevant vehicle 1 may be changed according to the urgency of the support request. For example, in FIG. 13D, the urgency is expressed by changing the size of a vehicle-shaped icon indicating the positions of the vehicles 1.

Figure 14:
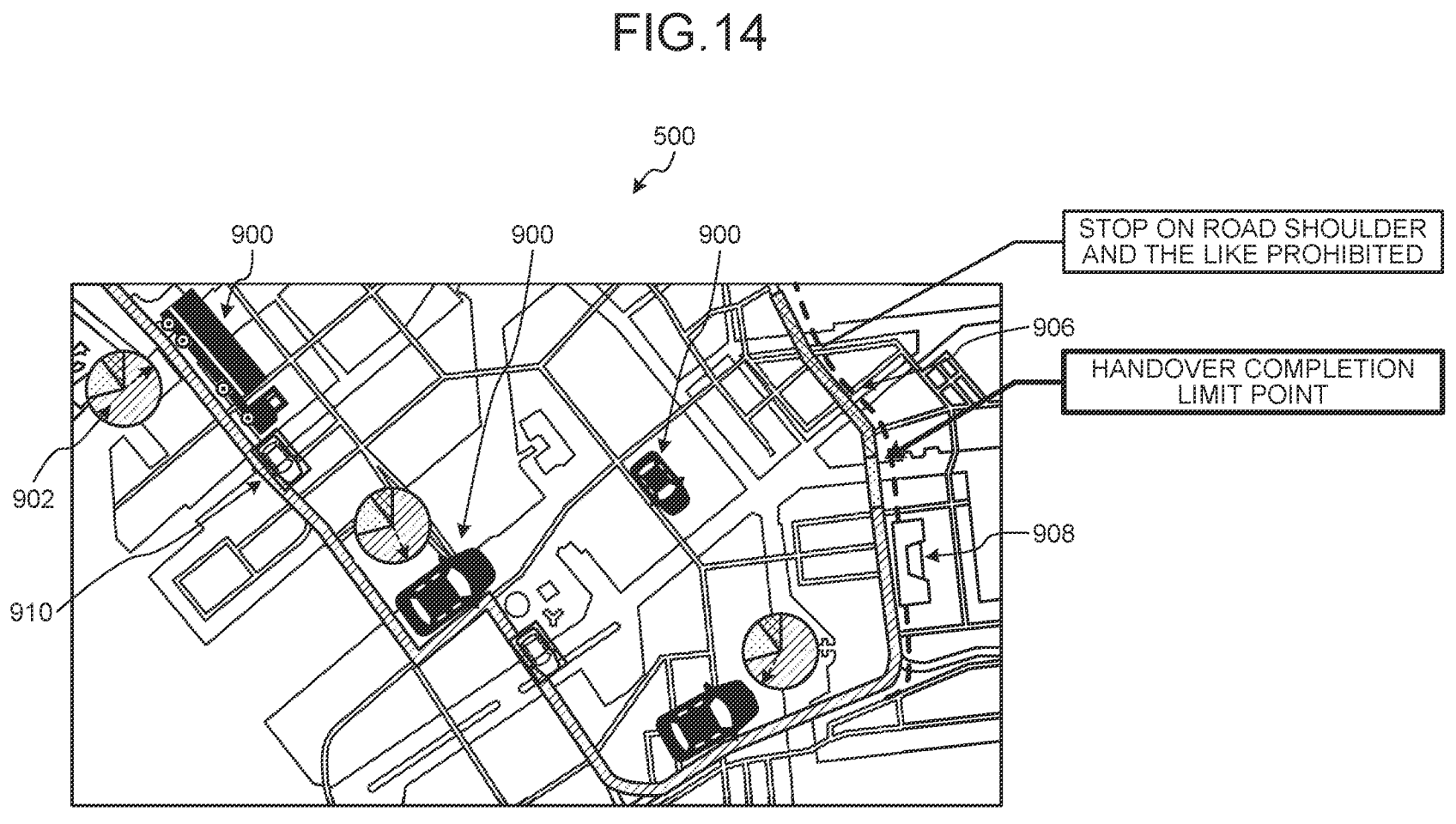

As illustrated in FIG. 14, it is preferable that the monitor 500 indicates position information of the vehicle 1 requesting the support with an icon 900 and displays a time margin (a grace time) (for example, estimated from ODD or the like of a road on which the vehicle travels or is about to travel) until the remote steering takeover of the relevant vehicle 1 with an icon 902 (a symbol of a timer) such as a timer in a form that can be intuitively grasped. Note that the grace time is estimated by the server 100 based on the current speed of the vehicle 1 and information concerning the ODD (an allowable automatic driving level) allocated to the road on which the vehicle 1 travels.

Furthermore, as illustrated in FIG. 14, it is preferable to display the positions of the vehicles 1 present in the periphery with an icon 910 in addition to the icon 900 of the vehicle 1 requesting the support. For example, the icon 910 is preferably a vehicle-shaped icon having a smaller size and a lighter color than the icon 900 of the vehicle 1 for which support is requested. Further, the monitor 500 may display a belt-like icon 906 on a relevant road in order to cause a position to be intuitively recognized in a section where remote operation is performed, a limit point where handover must be completed, a section where stopping on a road shoulder is prohibited, an emergency stopping possible region, a high-speed traveling section, or the like. The monitor 500 may display an icon 908 indicating the position of an evacuation point where the vehicle can be stopped in an emergency in preparation for a case in which immediate handling cannot be performed. Further, in the present embodiment, a congestion area, a construction part, a lane restriction point, an accident occurrence point, and the like may be displayed on a map. Further, position information of a supported vehicle candidate by a volunteer who provides guidance and support and travels near the support requesting vehicle 1 may also be displayed on the map.

For example, a traveling track of the vehicle 1 may be displayed on the map. By performing the shared display with another operator on the map on which the traveling track is drawn, information can be shared in advance even when the remote steering is suddenly handed over from another operator. By color-coding and displaying the track according to a degree of traffic congestion, average cruising speed, availability of a road shoulder, and the like, urgency of handover and the like may be intuitively grasped. By performing such display, it is possible to quickly determine an action to be prioritized. In addition, when the road on which the supported vehicle 1 is traveling or is about to travel is a non-main road, it is preferable to display, for example, a congestion status of a road with a lot of traffic used as a constant detour.

The controller needs to preferentially grasp, 1. a time margin until handover and 2. information (information of a surrounding environment, specifically, section information with good visibility and a low risk involved in deceleration, dangerous section information such as a curve or a tunnel entrance/exit where sudden deceleration due to poor visibility is a risk for the following vehicle, and the like) leading to action determination for reducing the risk when the handover has not been successfully performed, of the vehicle 1 that is requesting support. Therefore, in the present embodiment, information may be presented to the controller in another form other than the information presentation by the bird's eye view map as illustrated in FIGS. 13A, 13B, 13C, 13D, and 14 described above. For example, as in display of the monitor 510 illustrated on the left side of FIG.

15, risk information (a congestion zone, a construction site, an accident occurrence point, and the like) on a road on which the vehicle 1 requesting support will travel in the future may be displayed with visual perspective transformation as time elapses For example, it is preferable to change the thickness of a band according to a time and display the band (which is, specifically, equivalent to 3D perspective display in the case of traveling at constant speed and is display that is narrower at a distant point where it takes time to reach and is shorter in the traveling direction) and the band has a color corresponding to a congestion situation of the road. Further, it is preferable to display, with an icon that can be understood at a glance, construction, occurrence of an accident, and the like that cause traffic congestion.

Figure 16:
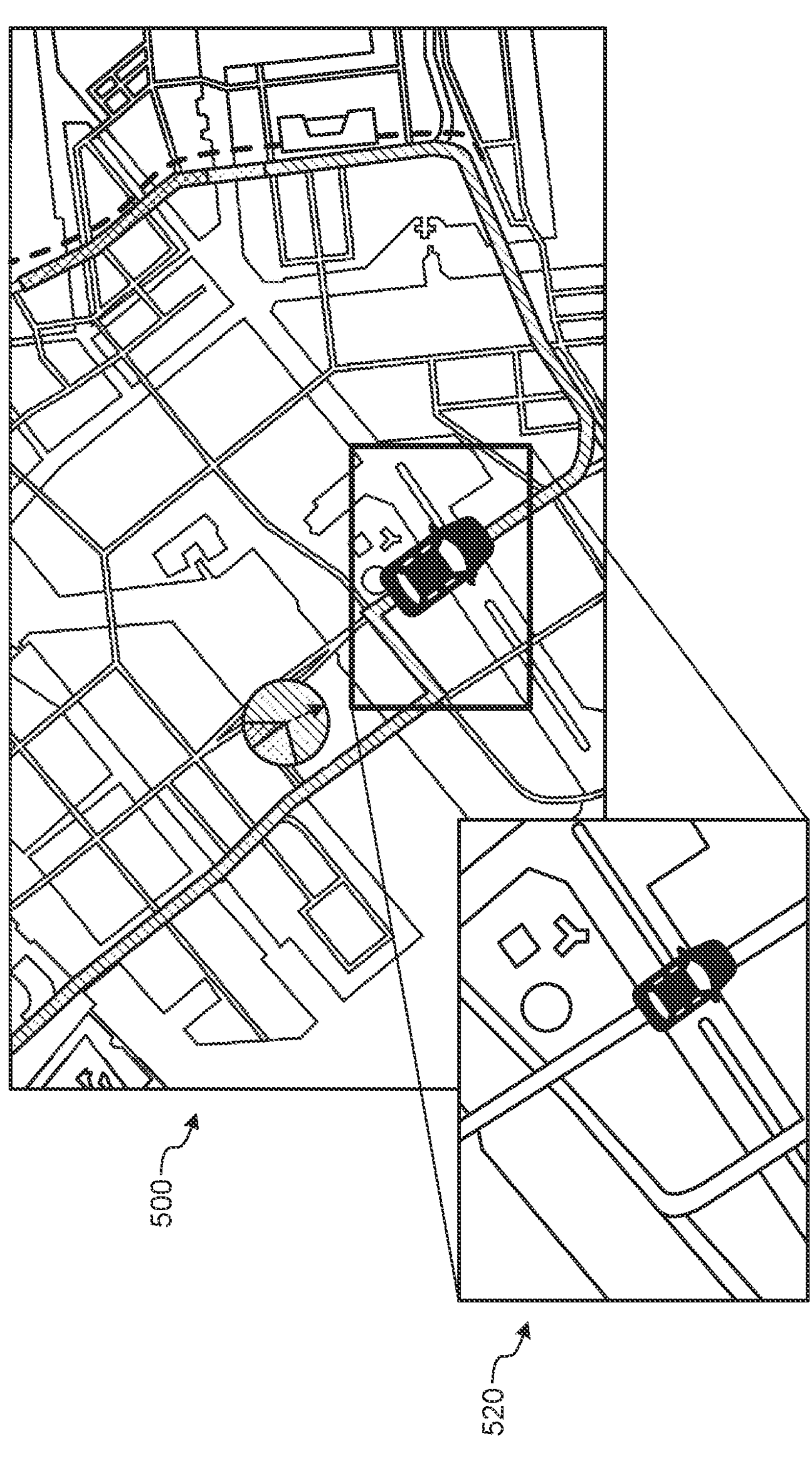
FIG. 16 is an explanatory diagram (part 5) for explaining the example of the HMI according to the first embodiment of the present disclosure.

Further, as illustrated in FIG. 16, when visual recognition is difficult the bird's eye view map, the monitor 500 may designate a region and display an enlarged map 520 according to operation of the controller.

When not the controller but the operator performs allocation, contrivance to reduce inconvenience is important. Therefore, as such contrivance, for example, a line of sight of the operator on the map may be recognized and the vehicle 1 present in the position of the line of sight may be specified and allocated. Alternatively, the operator may call an identification number or the like linked in advance with the vehicle 1 requesting the support and perform the allocation by voice recognition of the identification number. Further, robustness of allocation may be enhanced in combination with detection of operation on map display on a touch panel by the operator, gesture recognition of the operator, and the like. For example, robustness may be given to a selection instruction using gesture recognition by grasping the position of the eyes of the operator, specifying a visual line direction with the position of the eyes and a direction designated by finger pointing and further adding a pinching operation by the thumb and the index finger to instruct selection of a selection target. Further, in the present embodiment, a glasses-type virtual reality (VR) display worn on the head of the operator or the like may be used. Further, an actual display and a semitransparent spectacle type display may be used in combination.

Figure 17:
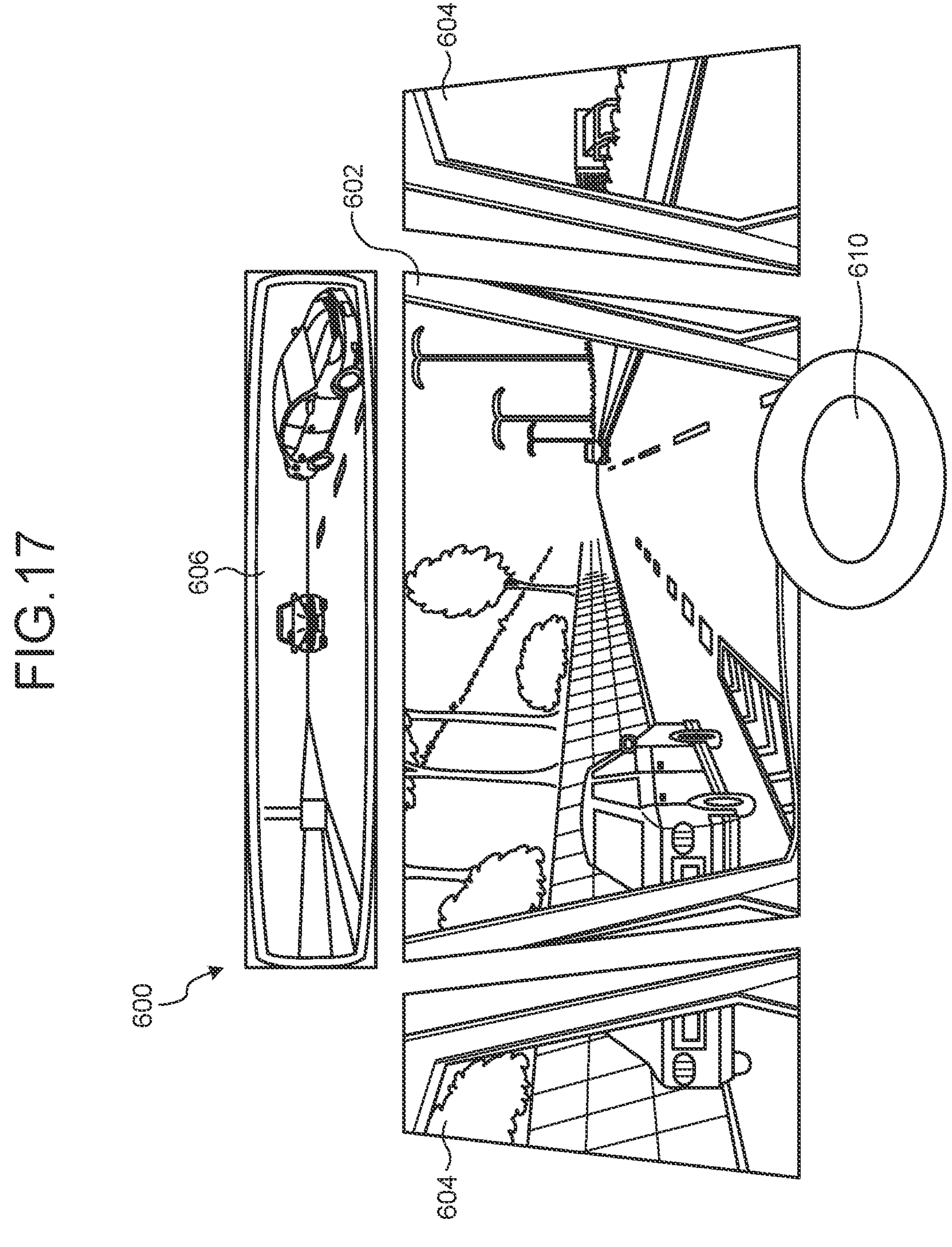
FIG. 17 is an explanatory diagram (part 6) for explaining the example of the HMI according to the first embodiment of the present disclosure.

Next, details of the OPERATOR HMI 300 are explained with reference to FIG. 17. Examples of the OPERATOR HMI 300 can include, as illustrated in FIG. 17, a monitor group including a plurality of monitors 602, 604, and 606. Specifically, the monitor 602 displays a front image of the vehicle 1, the monitor 604 displays side images of the vehicle 1, and the monitor 606 displays a rear image of the vehicle 1. Note that it is preferable that these monitors 602, 604, and 606 are disposed to give a feeling of actually riding in the vehicle 1. In the display example of FIG. 17, the monitor 604 displays an image through a window in front of the side surface. However, for example, the image may be switched to an image equivalent to the rearview mirror by being controlled by a turning direction confirmation gesture of the operator. In that case, the shape of a frame surrounding the image may be changed in order to facilitate distinction between the image through the window in front of the side surface and the rear-view mirror image. Consequently, the Situation Awareness of the switching may be enhanced.

Note that, although not illustrated in FIG. 17, information necessary for remotely steering the target vehicle 1 is displayed on the monitor group 600 or another auxiliary monitor. Note that these displays (the information concerning the situation of the route of the mobile body and the information concerning the moving body characteristics of the mobile body) are preferably displayed at timing before the front image, the side images, and the rear image display (the image around the mobile body of the vehicle 1 explaining above. Examples of the information to be displayed include information such as vehicle type, individual vehicle information such as loaded luggage, a reason for the support request, and positions of the peripheral vehicles 1 and the supported vehicle 1. Further, information such as a road condition (a congestion status, a collision risk, cruising speed, and the like), a road surface condition and a speed limit of a section, and a driving attention point (a point where accidents frequently occur, a section where traffic congestion frequently occurs, an uphill, a merging point, an emergency evacuation space, and the like) of a relevant traveling route based on past records may be displayed using a form as illustrated on the left side of FIG. 15.

Then, based on these kinds of information, the operator determines the steering amount while quickly determining to which degree of deceleration control and steering wheel control, which that prevented overturning and lane deviation, the vehicle 1 can withstand. However, since the operator is not directly riding the supported vehicle 1, the operator cannot experientially grasp a deceleration feeling or an acceleration feeling. In other words, for example, it is difficult for the operator to directly grasp a sense indicating which degree of a step-on amount of a brake pedal of the vehicle 1 leads to which degree of vehicle deceleration. Therefore, in the present embodiment, in order to complement those bodily sensations, auditory information (squeaking sound of a brake, acceleration sound of a heavy freight vehicle (environmental sound in the vehicle), sound of a flasher, environmental sound around the vehicle 1, noise converted into "environmental sound", and the like acquired on the inside of the actual vehicle 1) may be provided to the operator via a speaker (not illustrated). In the present embodiment, the server 100 may generate squeaking sound (pseudo sound) or the like of the brake in a pseudo manner based on a steering amount of the operator and present the squeaking sound or the like to the operator.

Further, resistance to operation of a steering wheel 610 or a tactile stimulus such as a lateral swing or a height change of the seat may be provided to the operator via the steering wheel 610 and a seat (not illustrated) to complement visual information. At this time, the server 100 may estimate, based on the steering amount of the operator, a vibration pattern and a weight that would be applied to the operator and simulatively present the vibration and the weight to the operator. For example, when the vehicle 1 is traveling on a slope or a downhill, a force is applied to the operator in a weight or a weight direction corresponding to the inclination of the road. A lateral shift feeling, an acceleration/deceleration feeling, and the like may be further added to the operator through haptics for a seated seat of the operator. In a vehicle with a low vehicle height such as a large vehicle or a sedan, a view of a visual field in the front from a driver's seat is different and a sense of distance from a preceding vehicle is also different. Therefore, the operator may virtually lift a seat or give a seat lowering feeling by haptics in order to instinctively grasp a difference between vehicles that the operator is requested to handle. Even when the same forward image is displayed to the driver, since control in the case in which the vehicle height of the driver's seat is high and an intuitive farther-closer distance in a vehicle having a low vehicle height affect, there is an effect of improving the grasping of a situation of the farther-closer distance. Since driver's seats of a small vehicle or a large vehicle are usually disposed at different heights, visual perspective of a visual field in direct riding is different changes according to a change in perspective. Therefore, a front visual field displayed to the remote operator in a disposition position of the camera mounted on the vehicle 1 is different. From a captured and displayed image, it is possible to learn from perspective extending to an infinite point according to the width of a road, a vehicle imaged in a peripheral visual field, or the like. However, it is not always possible to instantaneously acquire grasping of a sense of vehicle height from the image. A haptics HMI (for example, sawtooth waveform vibration) that provides a sense of movement gives a vertical movement interval without greatly moving an actual operator and assists in grasping moving body characteristics of the target supported vehicle 1, leading to improvement in operator's Situation Awareness.

In the present embodiment, the server 100 may estimate, based on a steering amount of the operator, a change in a surrounding image that would be visually recognized by the operator and display (VR display) an image based on an estimation result to be superimposed on a real space image. For example, when the steering wheel 610 is turned, an image of an image that would be seen when the vehicle 1 actually turns is displayed. Consequently, it is possible to visually check a speed change or the like based on the steering amount. Therefore, it is possible to physically grasp the moving body characteristics of the vehicle 1. A relation between an operation amount of a steering wheel of a vehicle and a curve curvature at the time of actual effective traveling of the vehicle is not uniformly determined. The relation is various because, for example, there are various factors that are different in design, a degree of application of a centrifugal force changes depending on a load weight of the vehicle and changes depending on a road surface condition or the like.

A purpose of adjusting a steering angle and an amount of application to an operation piece such as an accelerator or a brake pedal by the operator is to cause a motion change in the respective vehicles 1. However, even if the operation amount of the operation piece by the operator is the same, a response result for the operation amount is different depending on a difference in an actual traveling characteristic of each of the individual vehicles. Therefore, in order to complement a sense of such a difference for the operator, it is effective means to visually present the difference to the operator. As a more active mechanism, an input value to the operation piece of the operator is standardized to generate a control value serving as an achievement target value of control and, as control on the vehicle 1 side, actual control of the vehicle 1 is performed by multiplying the target value by a correction coefficient to be a control result. Consequently, it is possible to suppress the occurrence of a difference in control for each of vehicles for the steering amount of the operation piece operated by the operator. In any case, when the operator tries to perform uniform control without knowing the detailed characteristics of the vehicle, the unique dynamic characteristics of the vehicle 1 cannot follow the control, and the control is performed beyond an allowable amount, causing various problems such as overturning of the vehicle 1 and falling of passengers in a passenger compartment. Therefore, since such a problem occurs, controlling steering information of the operation piece of the operator by adding a correction value according to the vehicle characteristics on the vehicle 1 side is one countermeasure. However, it is still necessary to provide, to the operator, information for limiting necessary control and information for calling attention for grasping a situation from the vehicle 1.

In the present embodiment, for example, if a steering input value to the control system by the operator is the same, it is preferable that the server 100 corrects control such that a target deceleration value for decelerating any vehicle is the same and a stepping amount of the actual actuator on the vehicle side and a steering wheel steering amount are the same. For example, the server 100 (specifically, a remote control unit (not illustrated)) can perform correction based on information such as moving body characteristics of the vehicle 1 and a loading amount of cargo. In the present embodiment, by performing such correction, variations due to accelerator, brake, and steering wheel operation of the vehicles 1 are absorbed. However, in the present embodiment, since the supported vehicle 1 is a weight loaded vehicle or the like, when a steering amount is insufficient and acceleration cannot be performed as expected by the operator, it is preferable to warn the operator about a performance gap with tactile haptics (for example, the steering wheel 610 and the lever (not illustrated)) or display according to the correction explained above. Note that a mechanism for absorbing the difference in the operation amount is not necessarily disposed in the server 100 and may be configured to be incorporated in the control system of the vehicle 1. As operation, using an operation piece input of the operator as a variable targeting an actual behavior target value of the vehicle, the control system of the vehicle 1 may control various actuators of the vehicle 1 to achieve the actual behavior target value.

In a case in which a cargo is heavy, large, or unstable, there is a risk that sudden deceleration causes cargo collapse, a risk of overturning due to sudden lateral movement steering, or the like. Therefore, in such a case, it is preferable to provide, to the operator, information for calling attention not to suddenly perform the steering wheel operation. When such consideration is not made and, for example, an allowable or more braking brake is applied to the vehicle 1 loaded with a large amount of steel material or the like, for example, if the steel material in a cargo bed exceeds a fixing limit and slips out, the vehicle 1 traveling in the periphery is likely to be affected to induce a serious accident.

When the supported vehicle 1 is a middle-sized fixed-route bus, it cannot be expected that all passengers are seated and fasten seat belts. In such a case, it is also conceivable that sudden deceleration by remote steering leads to injury and the like of passengers. Therefore, it is desirable that the operator grasps a situation of the passengers when performing support of the vehicle 1. A driver riding the vehicle can directly view the passengers in the vehicle with a mirror or the like. However, the operator cannot directly view the inside of the vehicle. Moreover, the operator is not in a situation of looking at passengers getting on and off the vehicle throughout an operation route and, since the operator takes over steering halfway, does not know what kinds of passengers are already present in the vehicle in order to take over steering halfway. Therefore, in the case of such remote steering support, postures, positions, and the like of the passengers in the vehicle may be dropped into sensing data using equipment such as a ToF sensor or a stereo camera installed in the vehicle and provided to the operator as a bird's eye view map of the inside of the vehicle. Note that, since communicating a riding state is most important determination information rather than recognizing details of the passengers in the vehicle, it is not essential to display a real image in the vehicle interior and it is preferable to perform simple display such as avatar model display or illustration display for communicating the riding state. Further, in the present embodiment, sensing data may be acquired from the ToF sensor or the image sensor installed in the vehicle explained above, the sensing data may be analyzed (for example, postures of people) to extract an elderly person or a passenger with physical disabilities (passengers in predetermined states to be noted by the operator at the time of the remote steering) or an image of a white cane or the like used by a passenger with visual impairment may be extracted and these kinds of information may be generated as passenger information and presented to the operator. As explained above, in the present embodiment, it is more preferable that the HMI has a configuration capable of calling attention to the operator by specifically discriminating and distinguishing passenger features to be noted by the remote operator when controlling the vehicle, such as an elderly person, a physically handicapped passenger, and a child of a lower grade.

As explained above, in the present embodiment, by providing the information to the operator in such a form, it is possible to increase the Situation Awareness to a sufficient level before performing the remote steering. Therefore, according to the present embodiment, the operator is enabled to accurately grasp a situation of the vehicle 1, a situation around the vehicle 1, and the like, and perform appropriate remote steering.

Note that an operator who constantly and continuously carries the remote steering support is permanently subjected to a fixed or more work load. Therefore, in order to monitor an abnormality for the operator who is performing remote steering support, it is important to manage drowsiness, fatigue, and health condition equal to or more than the management performed by a driver monitoring system (DMS) for a normal driver. Since the operator works for a long time in an occupationally stable posture, more advanced work management monitoring is required. That is, by arranging driver monitoring, monitoring for abnormality prevention may be performed by combining line-of-sight evaluation, drowsiness evaluation, perspiration evaluation, heart rate/pulse wave evaluation, health abnormality evaluation, and thought floating evaluation of the operator with progress observation via not only noncontact observation equipment such as a camera but also a seating seat, a steering wheel, or the like, and dedicated equipment such as glasses or a wristwatch with. Besides recording such partial information, by transmitting information concerning an evaluation index indicating that the remote support is continuously performed satisfactorily for the supported vehicle 1, the driver and the like of the supported vehicle can also benefit from the remote steering support service with security. As a result, this leads to giving a sense of security for use, that is, a sense of being watched over and improving social acceptability to the mobility service by the remote support.

In the present specification, for convenience, the embodiments are mainly explained with a concept in which the operator operates the conventional operation pieces such as the steering wheel, the brake, and the accelerator. However, in actual operation, an input device such as a mouse, a track ball, or a touch panel on which a display is superimposed, which are widely used in a personal computer and the like, may be used, various operation pieces such as a lever type, a joystick type, a side stick type operation piece, or a slider may be used, and operation may be performed by combining these.

Further, there is no need for the operator to take timely and direct steering response on the spot (at a point of time) in all remote steering supports. For example, when an LSAD vehicle passes a part of a section while traveling in a section with a small traffic volume, there is a situation in which the LSAD vehicle can pass through the section by receiving problem handling or a detour instruction necessary for passing in advance. At the time of the supports, it is more appropriate and quick in handling to perform a pointer instruction on a traveling map with a mouse, a gesture, or the like rather than performing a conventional instruction by a steering wheel, an accelerator, or a brake such as a route instruction, a detour operation, or a prior standby point instruction. Therefore, in the OPERATOR HMI who performs a variety of supports as explained above, a variety of operation pieces may be combined in a complex manner. Consequently, it is possible to operate the interaction on the map and the direct vehicle control in combination. Here, a mouse or touch panel instruction, a line-of-sight input, and the like can easily perform an instruction input but, on the other hand, have an aspect in which an operation not intended by the operator tends to occur. Therefore, input decision is not a simple continuous input such as a mouse double click but it is desirable to incorporate a double check procedure in which a hand is intentionally moved to another operation piece or a virtual check by voice or the like is performed as well.

7. Second Embodiment

In the future, utilization of automatic driving technology is considered to be promoted as one tool for encouraging non-healthy people to participate in the society. As one of scenes of the utilization of the automatic driving technology, for example, it is assumed that, when a non-healthy person is riding the supported vehicle 1 to which remote steering is performed by an operator, the operator is requested to perform treatment or the remote steering according to a situation of the non-healthy person. Then, in order to provide such treatment without delay while avoiding traffic congestion, traffic cuts, and accident induction, it is important that information concerning non-healthy persons and the like be shared in a timely and appropriate manner among all players in the automatic driving technology including the operator.

Specifically, when the supported vehicle 1 is a fixed-route bus or the like, the operator (a remote operator) is requested to give consideration to getting on and off of wheelchair users and steer the supported vehicle 1 so that elderly people and the like do not fall. That is, the operator has to handle various and random needs of passengers as operation support. For example, when sudden deceleration is performed by remote steering, it is conceivable that this leads to injury or the like of passengers. Therefore, when the operator performs such support of the vehicle 1, it is desirable that the operator grasps situations of the passengers and performs the remote steering and support for the passengers. However, a riding driver can directly view passengers in the vehicle with a mirror or the like. However, the operator cannot directly view the inside of the vehicle or the periphery of the vehicle 1.

Therefore, as a second embodiment of the present disclosure, information (sensing data) such as postures and positions of passengers in a vehicle is acquired using equipment such as a camera installed in the vehicle, and information of a passenger who needs support based on such information is provided to an operator, for example, as a bird's eye view map of the vehicle. Further, in the present embodiment, if individual information (a body condition, age, and the like) concerning the passenger can be obtained, such information is also provided to the operator. Then, based on the provided information, the operator supports the passenger or executes the remote steering taking into account a situation of the passenger. Examples of the equipment include a camera capable of imaging the vehicle at the get-on and get-off time, a camera capable of imaging the inside of the vehicle, and an HMI including buttons operable by passengers.

Further, it is important for the operator to instantaneously recognize a situation or the like of a passenger and performs handling by recognizing details of the passenger in the vehicle. Therefore, in the present embodiment, information concerning the passenger is preferably provided by simple display (first symbol corresponding to a superordinate concept of the passenger information) such as a symbol, an avatar model, and an illustration that can be instantaneously grasped. Consequently, the operator can instantaneously grasp the situation of the passenger and only has to acquire and recognize detailed information of the passenger (a second symbol corresponding to the details of the passenger information) at the next stage according to necessity. Note that a specific display method is explained below.

Further, in the present embodiment, the support by the operator is not only performed temporarily when the passenger requests the support but also performed until the passenger who requests the support completes the use of the mobile service by the supported vehicle 1. Therefore, the information of the passenger who needs support and the like is shared not only by operators but also by controllers (other area traffic control centers) who manage the next traveling sections and operators belonging thereto. That is, in the present embodiment, the passenger information is handed over among the operators and the like during the support. Therefore, in the present embodiment, it is preferable that the passenger information is provided by simple display such as a symbol, an avatar model, and an illustration that can be instantly grasped.

Further, in the present embodiment, a moving image or the like of a passenger is acquired from the camera installed in the vehicle explained above and the moving image or the like is analyzed (for example, analysis of a posture and movement of a person) to extract an elderly or physically handicapped passenger (a passenger who is in a predetermined state to be noted by the operator at the time of the remote steering) or an image of a white cane or the like used by a passenger with visual impairment. In the present embodiment, these kinds of information are generated as passenger information and presented to the operator.

In the present embodiment, the moving image, the passenger information, the handling history by the operator, and the like acquired as explained above are stored in a predetermined server (storage unit) to be linked with, for example, identification information of a ticket owned by the passenger such that the passenger can utilize the moving image, the passenger information, the handling history by the operator, and the like when the passenger uses a transportation facility or the like again. For example, as a storage destination of such information, a vehicle operating company, a boarding pass management service company that manages information concerning a boarding pass (for example, a traffic integrated circuit (IC) card), a server of a customer information management service company, or the like is assumed. Consequently, in the present embodiment, when the remote steering or the like by the operator is performed when the passenger uses the transportation facility or the like next time, the operator can quickly perform the remote steering or the passenger support.

In the present embodiment, a person who performs support or the like is not limited to the operator. For example, there are a wide variety of persons who perform support and the like, such as a rushing support service (for example, a specialized wide-area support service, a security company, a road service, or the like that rushes using a vehicle, or a drone) for rushing to and supporting the supported vehicle 1, a leading support service for supporting the supported vehicle 1 by leading the supported vehicle 1, a supporter (for example, a vehicle operation company or a volunteer) who stands by and supports at a bus stop or the like, and a passenger who rides the supported vehicle 1. In the present embodiment, information concerning passengers who need support or the like is shared among these supporters. Further, in the present embodiment, in order to accurately perform support, the support is shared with peripheral vehicles such as a following vehicle of the supported vehicle 1. For example, information (for example, the supported vehicle 1 is stopped to support passengers) of a passenger who needs support or the like may be presented to a following vehicle or the like via an HMI that is provided in the supported vehicle 1 and presents the information to the outside of the vehicle. The operator is requested to directly or indirectly understand content of a need of the passenger and, as an intermediary, appropriately transmit the content to the supporter.

Figure 18:
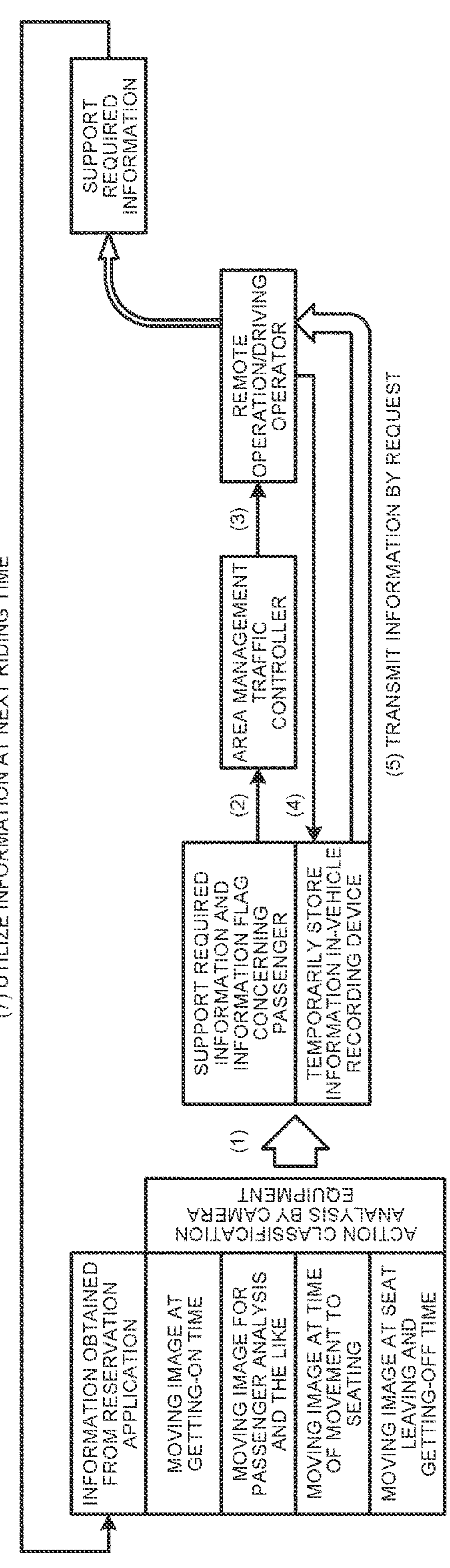
FIG. 18 is an explanatory diagram for explaining an overview of a second embodiment of the present disclosure.

First, an overview of the second embodiment of the present disclosure is explained with reference to FIG. 18. FIG. 18 is an explanatory diagram illustrating the overview of the present embodiment. In the present embodiment, as a passenger who uses the supported vehicle 1, not only a non-healthy person but also an elderly person, a pregnant woman, a person who needs support because of illness, injury, or the like, a wheelchair user, a child, a person accompanied by a child, a baby car user, and the like are also targeted.

First, as illustrated on the left side of FIG. 18, when a use reservation application for the supported vehicle 1 such as a bus is sent to, for example, a vehicle operation company or the like from a passenger, the server 100 used in the control center or the like acquires information concerning the passenger (age, a disability level, content of the support request, past handling history, and the like) of the passenger registered in advance. Specifically, the server 100 acquires information concerning the passenger based on recognition information for recognizing the passenger linked with the reservation application in advance. Alternatively, the server 100 acquires identification information of the passenger from a transportation IC pass or the like used by the passenger when the passenger got on the supported vehicle 1 and acquires information concerning the passenger linked with the acquired identification information from a predetermined server. Examples of the predetermined server include a vehicle operation company, a boarding pass management service company that manages information concerning a boarding pass, and a server of a customer information management company.

Subsequently, the server 100 acquires a moving image of the passenger captured at a station (a stopping place) or the like and the moving image of the passenger captured in the vehicle (a moving image during movement until seating, a moving image from leaving seat until getting off the vehicle, and the like) and analyzes a posture, a motion, and the like of the passenger. For example, the server 100 can recognize a tile of the posture, speed of the motion, and the like of the passenger by applying the human skeleton model to the moving image including the posture and the motion of the passenger and analyzing the moving image. For example, when the posture is greatly tilted or the motion speed is low, it can be determined that the passenger is an elderly person, in a state in which muscle strength is poor, or in a state in which a prosthetic leg or the like is worn. Furthermore, for example, when a motion of moving while leaning against a handrail is extracted, it can be determined that the passenger is in a state in which there is an obstacle that makes it difficult to promptly move a part of the body. Based on such a determination, the server 100 can predict presence or absence of necessity of support, a level and content of the necessity of the support, and the like. Further, when use of a white cane or a crutches, use of a walking tool, a wheelchair, a silver car, and a baby cart, accompanying of a guide dog, a support dog, and an assistant, or large baggage is extracted from the moving image, the server 100 may determine that there is a high possibility that support is necessary.

More specifically, the server 100 can detect a movement of the passenger by tracking the movement of the passenger from a moving image of an in-vehicle movement at the time when the passenger gets on and off, sits down, and leaves the seat. Then, the server 100 models the detected movement of the passenger by applying the human skeleton model to the movement and indexes a posture and a movement (for example, a walking ability level, a vehicle getting-on/off motion level, and a wheelchair traveling ability level) of the model. Further, the server 100 may quantify the level of the need for the support or may estimate and classify the content of the support (support at the time of getting on and off, restriction of rapid start, and the like) according to the index. In the present embodiment, when information such as age or a degree of disability of the passenger has been acquired in advance, the indexing and the like may be performed after taking into account such information. In the present embodiment, by performing such indexing and the like, the controller and the operator can immediately recognize the level of the necessity of the support and the urgency of response. Therefore, the controller and the operator can perform more appropriate handling. In the present embodiment, a method of indexing is not limited to the method explained above.

Then, as illustrated a second part from the left side in FIG. 18, the server 100 stores such a determination result in a storage unit in the vehicle together with the passenger information acquired in advance. Further, as illustrated in the second to fourth parts from the left side in FIG. 18, the server 100 presents the acquired information and the support information concerning the passenger based on the determination to the controller and the operator via simple display such as a symbol, an avatar model, and an illustration that can be instantly grasped. Then, the controller can perform pairing with the operator on standby sequentially from the supported vehicle 1 having the highest priority referring to the information concerning the passenger who needs support. Further, the operator refers to the passenger information and performs, for example, the remote steering while performing the necessary support. Note that a specific example of the presentation is explained below.

Further, the server 100 presents detailed information concerning the passenger at the next stage according to necessity of the operator. Then, the operator grasps a support need of the passenger and performs, for example, providing limitation of acceleration/deceleration at the time of the remote steering of the supported vehicle 1, departure determination (checking seating with seating check switch operation from the passenger or an image of an in-vehicle camera) after waiting for completion of seating of the passenger, and performing in-vehicle audio guidance.

In the present embodiment, the operator not only supports the passenger who has requested the support in advance but also handles, for example, a support request issued from the traveling supported vehicle 1. For example, when a fall or the like of a passenger occurs in the vehicle, the operator recognizes to that effect with an in-vehicle camera or a request of another passenger, safely stops the supported vehicle 1 according to necessity, and supports the passenger. At that time, when decelerating or stopping the supported vehicle 1, the operator performs an operation for notifying a following vehicle or the like to that effect in advance. Alternatively, in the present embodiment, the operator may automatically recognize a situation with a camera, a control unit, or the like mounted on the supported vehicle 1 without issuing the instruction of the notification explained above and automatically recognize the situation and issue abnormality notification to the following vehicle or the like. Alternatively, in the present embodiment, another passenger may recognize an abnormality and operate an emergency stop instruction button provided in the supported vehicle 1 to directly notify the abnormality to the following vehicle with the system.

Further, as illustrated on the right side of FIG. 18, the server 100 stores information concerning a history of handling performed by the operator or the like together with a moving image, an index, passenger information, and the like in a server of a vehicle operation company, a boarding pass management service company that manages information concerning a boarding pass, a customer information management company, or the like. At this time, the stored information group is stored to be linked with identification information or the like of a ticket owned by the passenger and is utilized at the time of next use or the like of the passenger. Consequently, in the present embodiment, since an operator in the next use can grasp handling content specific to the passenger, quick and appropriate handling is enabled. What is important here is to store information as an index with which necessity of support can be intuitively grasped. For example, when a moving image is stored as it is, it is necessary to reproduce and view the moving image again. Therefore, there is no time for the controller or the operator to view a reproduced image and it is necessary to occupy a large number of communication infrastructures for the reproduction. Therefore, this is not practical.

Such a processing method according to the present embodiment can be realized by an information processing system according to the present embodiment illustrated in FIG. 19. FIG. 19 is an explanatory diagram for explaining an overview of the information processing system according to the present embodiment.

As illustrated in FIG. 19, the information processing system according to the present embodiment includes a control unit installed in the supported vehicle 1, a communication unit installed in the vehicle 1, a camera for tracking a passenger in the vehicle, a passenger support request button, a passenger seating confirmation button, and an in-vehicle passenger HMI. The control unit controls these functional units installed in the vehicle. The communication unit performs communication between these functional units and an external device. Specifically, as explained above, the camera that tracks a passenger in the vehicle is a camera that can track a posture and a motion of the passenger in the vehicle and can be realized by, for example, an RGB camera, a ToF sensor, or the like. The passenger support request button is a button that can be operated by a passenger as a sign of intention when requesting support. The passenger seating confirmation button is a button that can be operated to transmit the fact that a passenger has been seated when the passenger has completed seating. Further, the in-vehicle passenger HMI is an interface with which a passenger in the vehicle can exchange information with an operator or an automatic response artificial intelligence (AI) serving as a substitute for the operator or the like. The in-vehicle passenger HMI includes, for example, a display, a speaker, a microphone, a touch panel, and the like.

Further, as illustrated in FIG. 19, the control unit may acquire a moving image from a camera that is installed, for example, at a station and images a passenger at the time of getting on and off the vehicle or may control an HMI for exterior that presents information to a following vehicle outside the vehicle.

As illustrated in FIG. 19, the control unit may transmit information acquired from the functional units to a traffic control center and a terminal of an operator belonging thereto via the communication unit and may further transfer the information to a traffic control center in another area. The operator may transfer information to a server and a terminal of a rushing support service, a leading support service, or the like according to necessity.

Further, as illustrated in FIG. 19, in order to acquire information (age, a disability level, content of a support request, a past handling history, and the like) of a passenger registered in advance, the control unit can transmit and receive the information to and from a server of a vehicle operation company, a boarding pass management service company that manages information concerning a boarding pass, or a customer information management company via the communication unit. Note that, in the present embodiment, the indexing of passenger support and the like may be performed by the control unit installed in the supported vehicle 1 or may be performed by a server of a traffic control center or the like and is not particularly limited.

Figure 20:
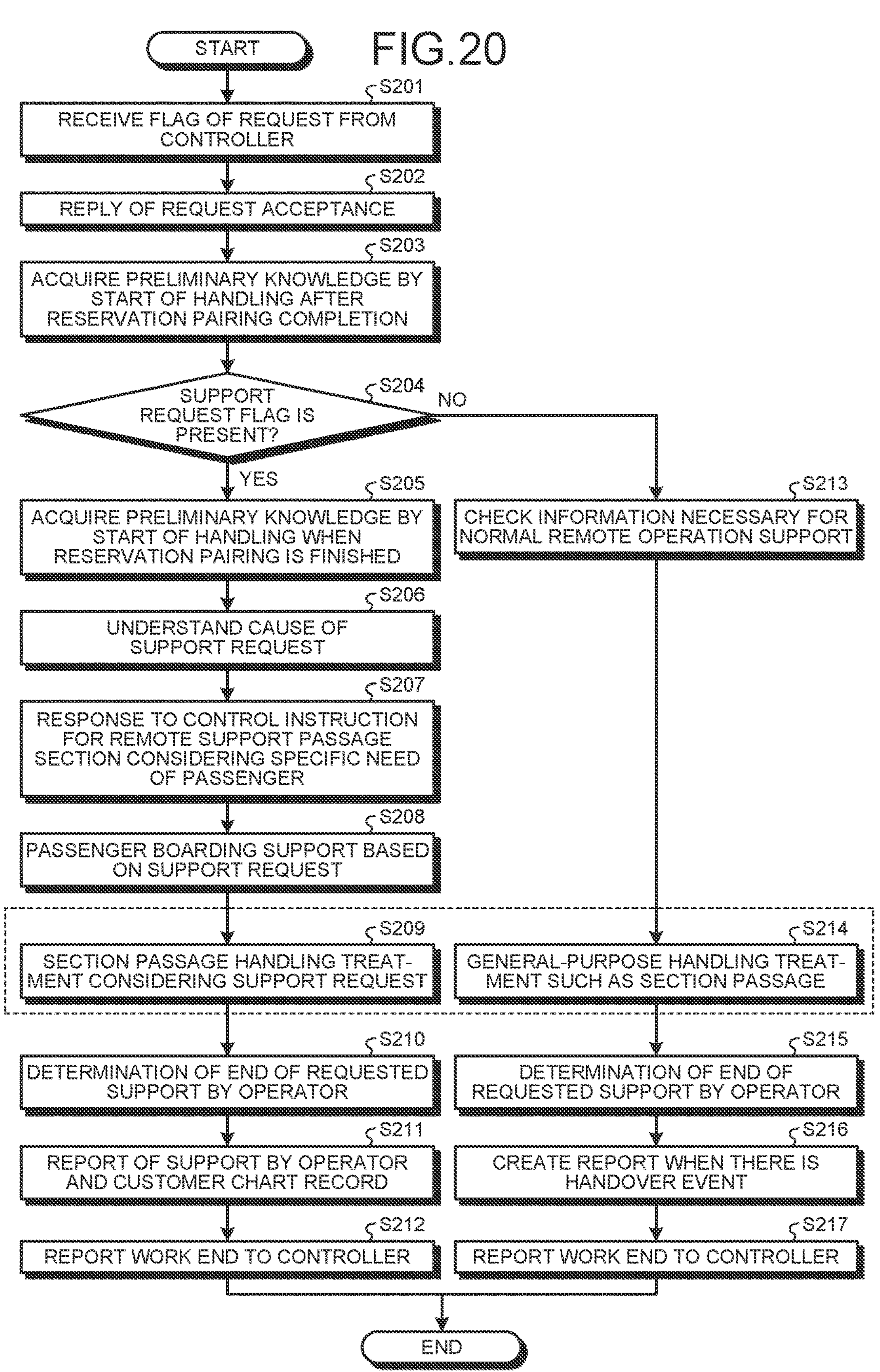
FIG. 20 is a flowchart for explaining an example of a work flow of an operator according to a second embodiment of the present disclosure.

Next, an example of a work flow of an operator is explained with reference to FIG. 20. FIG. 20 is a flowchart for explaining an example of a work flow of an operator according to the present embodiment. As illustrated in FIG. 20, in the present embodiment, the operator executes, for example, a plurality of steps from step S201 to step S217. Details of these steps are explained below.

First, the operator (specifically, a terminal of the operator) receives a flag of a pairing request from a controller (step S201). Subsequently, the operator performs an acceptance reply to the request (step S202). Further, the server 100 pairs the operator and the supported vehicle 1 relating to the request in advance (reservation pairing), acquires preliminary knowledge necessary to remotely steer the supported vehicle 1, and presents the acquired preliminary knowledge to the operator (step S203).

The operator checks whether a support request flag is erected in the supported vehicle 1 paired with the operator (step S204). When the support request flag is erected (step S204: Yes), the process proceeds to step S205 and, when the support request flag is not erected, the process proceeds to step S213 (step S204: No). The support request flag described herein is a flag for calling attention requested for operation by a non-healthy person or the like and is a flag that can be used to distinguish the support request from a support request by an operation of a type that does not request special consideration for passengers in normal remote steering support.

Then, the operator acquires preliminary knowledge for remote steering after completion of the reserved pairing and before a start of handling such as the remote steering (step S205). Subsequently, the operator understands a cause of the support request (step S206). Then, the operator performs handling such as control and an instruction for traveling in a remote support section considering a special need (a support request) of a passenger (step S207). Further, the operator performs get on and off support for the passenger based on the support request (step S208).

Subsequently, the operator performs handling and treatment for traveling in the remote support section considering the support request (step S209). Then, the operator determines an end of the support requested to the operator (step S210). Further, the operator creates a report in which content of the support performed to that point are recorded and a support history (a customer chart) of the supported passenger (step S211). Finally, the operator transmits the created record and the like to the controller together with a work end report (step S212).

In order to execute normal remote steering support, the operator smoothly preferentially checks information necessary for section traveling (step S213). Subsequently, the operator performs general-purpose handling and treatment for traveling in the remote support section (step S214). Then, the operator determines an end of the support (step S215). Further, when there is an event to be taken over to the next operator or the like, the operator creates a report in which content of the event is recorded (step S216). Finally, the operator transmits the created record and the like to the controller together with the work end report (step S217). If excessive work due to continuous work, a break request, a termination application, or the like is not issued, the operator who has transmitted the work report shifts to a standby state in response to the next support request and is recognized as a standby operator by the controller.

Figure 21A:
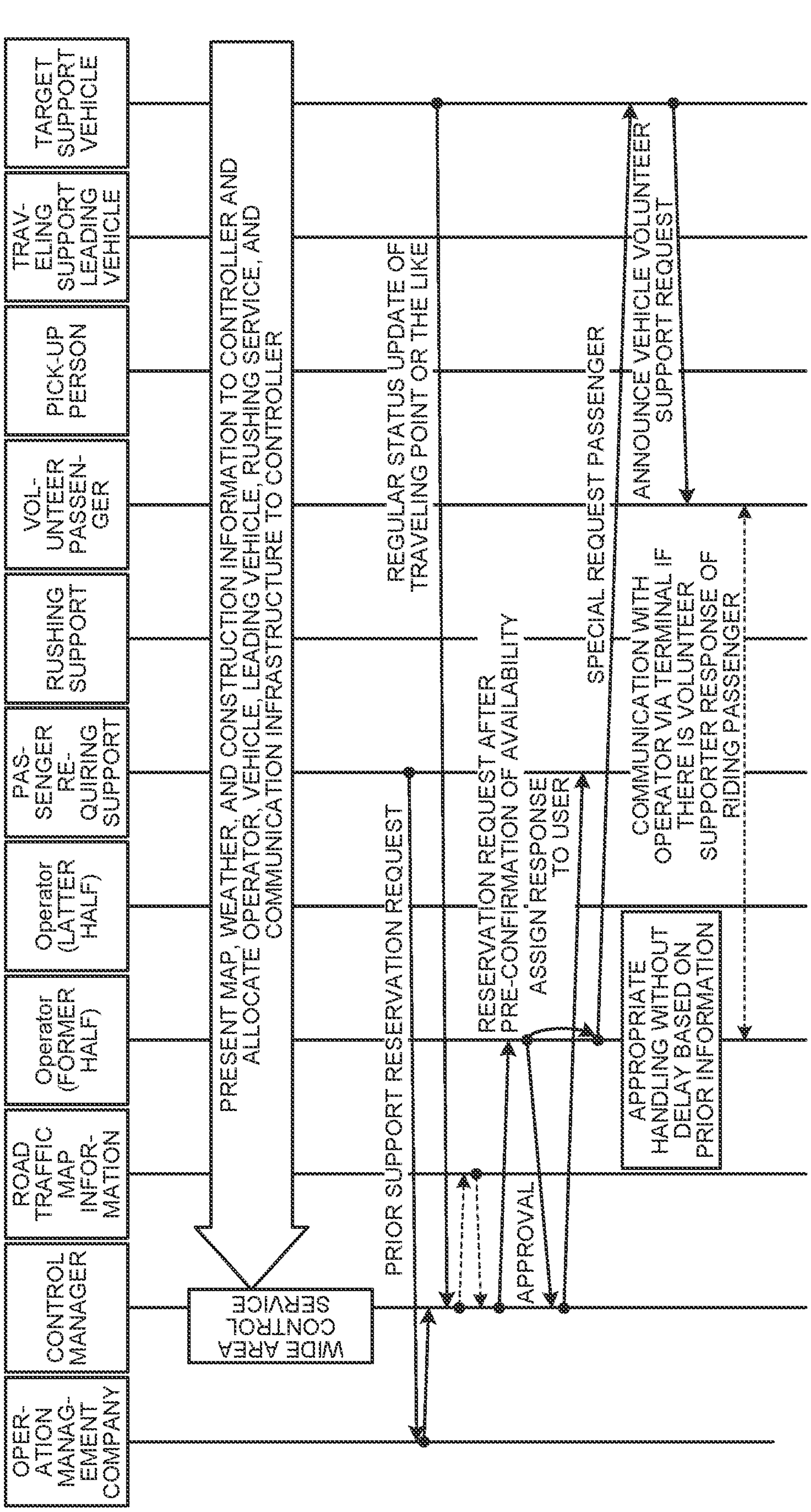
FIG. 21A is a sequence chart (part 1) for explaining a processing procedure according to the second embodiment of the present disclosure.

Next, a processing procedure according to the present embodiment is explained with reference to FIGS. 21A and 21B. FIGS. 21A and 21B are sequence charts for explaining a processing procedure according to the present embodiment.

As illustrated in the upper part of FIG. 21A, a map, weather, an accident, and construction information in a service area are presented to a controller or an operation manager, information necessary for appropriate operation management of a service area section is collected from an operator, a vehicle, a leading vehicle, a rushing service, a communication infrastructure, and the like, and respective broad needs are allocated according to a use situation prediction in a relevant section in the service area (not illustrated). Further, the controller or the like grasps an overall request for support and collects and grasps information such as a level of urgency. Note that it is assumed that such an operation by the controller or the like is always executed.

Subsequently, as illustrated in the middle part of FIG. 21A, a passenger who requests support makes a reservation for a request for support together with a reservation for vehicle use to an operating company or the like and information concerning the reservation is notified to the operating company and the controller. The supported vehicle 1 to be remotely steered by the operator periodically notifies information such as a traveling point to the controller. At this stage, although pairing between the operator and the supported vehicle 1 has not yet been confirmed, in response to transmission of information from the supported vehicle 1 side that needs support or reception of application information from a user or both of the supported vehicle 1 and the user, a service area operation controller checks presence or absence of a symbol of request vehicle information on a map and an operator on standby who can perform handling. Then, the controller makes a reservation request to the standby operator. Subsequently, with an acknowledgement (an approval) of the operator, the controller shares the information obtained to that point with the operator according to necessity.

Further, as illustrated in the middle part of FIG. 21A, the controller checks availability of operators and makes a request for support to an operator who can perform handling. When the requested operator can handle the request, the requested operator makes an approval response to the controller. Further, the controller responds to the passenger (a vehicle system) requesting the support that the controller accepts the support.

Subsequently, as illustrated in the lower part of FIG. 21A, when the operator determines that boarding support at a station is necessary, the operator transmits a request to that effect to the supported vehicle 1. Further, the operator performs appropriate handling without delay based on information obtained in advance. At that time, the operator or the system makes an in-vehicle announcement to the passenger to request support as a volunteer or communicates with the volunteer according to necessity. Note that, concerning the volunteer, it is considered sufficient to directly communicate with the passenger who requests the support. However, depending on a situation, in order to prevent traffic obstruction and traffic accidents, it is sometimes necessary to perform handling or the like against peripheral vehicles during the support. Therefore, it is preferable that the support by the volunteer is performed under control of an operator who grasps the whole situation. Therefore, in the present embodiment, the operator communicates with the volunteer.

Subsequently, as illustrated in the upper part of FIG. 21B, the operator selectively acquires, from a camera or the like of the supported vehicle 1, according to necessity, a moving image or the like from boarding to seating of a passenger who requests support, determines content of the support from information obtained from the moving image or the like, and performs the support. For example, in the case of a passenger who has, for example, a risk of falling down during traveling such as an elderly person, an injured person, or a passenger looking at a smartphone while walking, the operator makes an in-vehicle announcement to urge the user to be seated, confirms the seating, and then departs, or sets an upper limit of traveling speed of the supported vehicle 1. When an elderly passenger who is not seated is detected or there is a passenger classified into an unstable posture, it is sometimes necessary to limit traveling speed or the like in order to prevent falling of the passenger by a centrifugal force generated at the time of turning a curve or the like. Further, when it is predicted that a stopping time will be long for the passenger to get on, the operator displays "passenger attendance", "wheelchair getting on and off", and the like via the HMI for exterior provided in the supported vehicle 1. Then, the operator records the content of the support in the chart. Appropriate display by the HMI for exterior is an important status notification for attracting attention of a driver of a following vehicle and peripheral road users and leading to a correct standby action.

As illustrated in the middle part of FIG. 21B, the supported vehicle 1 acquires updated map data for determining propriety of passage through a specific section. Further, the supported vehicle 1 requests the controller for expected support based on the updated map data. Then, the controller checks the availability of operators and makes a request for support to an operator who can perform handling. When the requested operator can handle the request, the requested operator makes an approval response to the controller.

As illustrated in the lower part of FIG. 21B, when the supported vehicle 1 is about to travel in a section where the supported vehicle 1 cannot autonomously travel, the controller gives an instruction necessary for passage through the section to the supported vehicle 1. A similar instruction may be given by an operator who has taken over the support. Note that, when it takes time to prepare for the takeover of the operator, the supported vehicle 1 may be temporarily put on standby in an evacuation place. Note that it is ideal to separately perform a control job and an actual remote steering support operation job. As a job of the controller, it is assumed that direct instruction to a vehicle is not basically performed. However, in the present embodiment, unlike the air traffic control, in road traffic control using automatic driving, there is a case in which an operator corresponding to a pilot is absent in a target vehicle. Therefore, an evacuation instruction up to a supportable situation can also be carried out by the controller.

Further, details of display in the HMI of the controller and the operator according to the present embodiment is explained with reference to FIG. 22 to FIG. 27. FIG. 22 to FIG. 27 are explanatory diagrams for explaining an example of the HMI according to the present embodiment. As explained above, the HMI of the controller and the operator according to the present embodiment mainly includes the monitor (the display), the auxiliary lamp, the speaker, the steering wheel, the lever, and the haptics device mounted on the seat.

Figure 22:
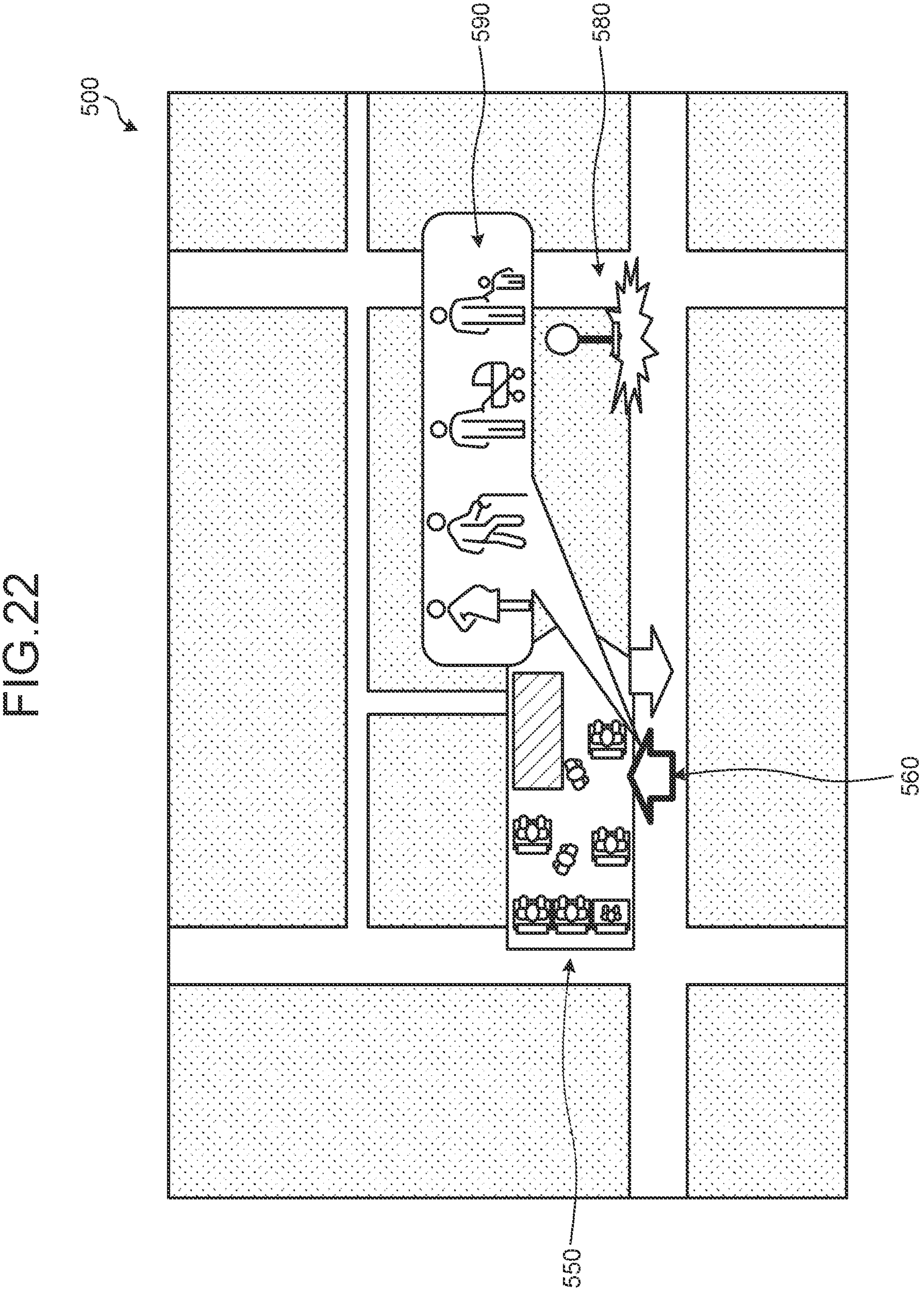
FIG. 22 is an explanatory diagram (part 1) for explaining an example of an HMI according to the second embodiment of the present disclosure.

For example, in the example illustrated in FIG. 22, a symbol 550 indicating the supported vehicle 1 such as a ridesharing bus that performs remote steering is displayed on the monitor 500 for the controller or the operator to view a wide area map of an in-charge area in a bird's eye view manner together with a map of the in-charge area where control is performed. Specifically, in the example illustrated in FIG. 22, an arrow-shaped symbol 560 indicating that support is necessary at the time of getting on the vehicle flashes together with the symbol 550 of the supported vehicle 1. Further, a symbol 580 indicating a position of a station flashes to indicate in a position of which station the support is necessary. In the present embodiment, by visually recognizing such flashing, the controller or the operator can intuitively recognize the supported vehicle 1 in which a passenger requiring support is present. Further, in the example illustrated in FIG. 22, by performing operation to obtain detailed information, the operator can display a symbol 590 indicating a detailed situation of the passenger who needs support. For example, in the example illustrated in FIG. 22, the symbol 590 indicates that the passenger who needs support is a pregnant woman, an elderly person, a person who uses a baby cart, and a person accompanied by an infant. In the present embodiment, by displaying such a symbol, the controller can intuitively grasp urgency and a support request target. Further, when being handed over to the operator, the operator can intuitively grasp, from visual information by the symbols and a sense of distance on the map, a grace time until actual support starts and a situation of a passenger who requests support.

For example, if a large amount of information is notified at a time, it takes time to understand and determine the information. Therefore, the operator sometimes forcibly stops or decelerates the supported vehicle 1 suddenly because it takes time for determination. Such a sudden stop or sudden deceleration causes an accident such as a collision or a fall. However, in the present embodiment, by changing an amount of information to be notified stepwise according to necessity, the operator can smoothly understand a situation and determine handling. In the present embodiment, the operator can quickly understand only information that should be preferentially understood and then perform appropriate support and handling such as quickly performing support. In addition, in the present embodiment, since ranking of determination of handling actions is possible from intuitive information, occurrence of accidents in the remote steering of the operator can be suppressed.

Figure 23:
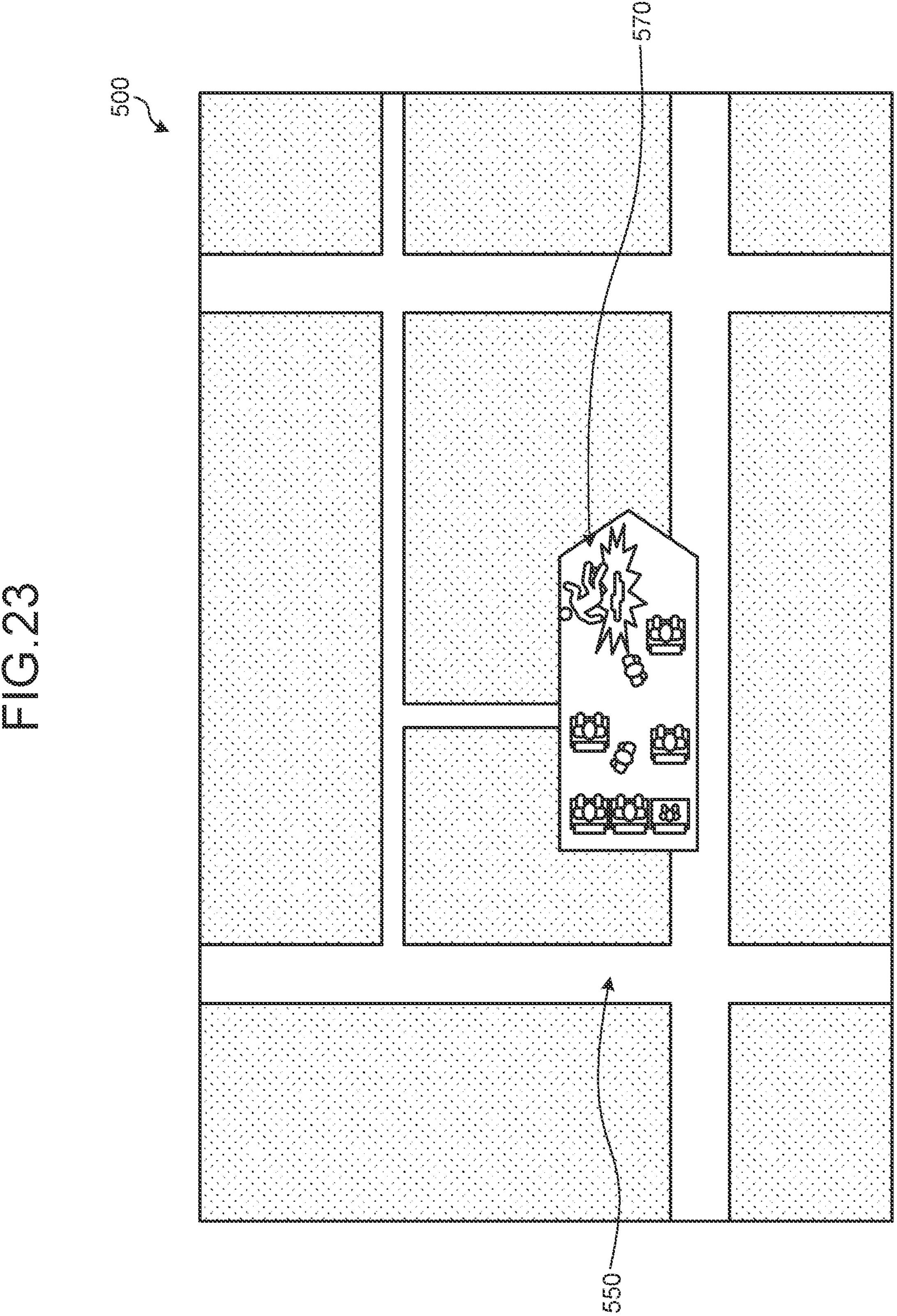
FIG. 23 is an explanatory diagram (part 2) for explaining the example of the HMI according to the second embodiment of the present disclosure.

For example, in the example illustrated in FIG. 23, the symbol 550 indicating the supported vehicle 1 that performs remote steering is displayed on the monitor 500 together with the map of the in-charge area where control is performed. Further, in the example illustrated in FIG. 23, a symbol 570 indicating that a falling accident has occurred in the vehicle flashes together with the symbol 550 of the supported vehicle 1. In the present embodiment, occurrence of a falling accident inside the vehicle may be detected, for example, by analyzing a camera image capturing the inside of the vehicle or may be detected by operation on a button or an HMI operable by a passenger. In the present embodiment, by visually recognizing such flashing, the controller and the operator can intuitively recognize the a fall of a passenger. In such a case, rather than simply stopping the supported vehicle 1 immediately on the spot, in view of a surrounding traffic condition and a secondary damage risk to a following vehicle or the like involved in the stop, a determination is sometimes made in which priority is given to handling after the supported vehicle 1 is decelerated, slowed down, and stopped at the nearest safe point. That is, content of handling determination greatly depends on which road section on the map an event has occurred with respect to the supported vehicle 1.

Figure 24:
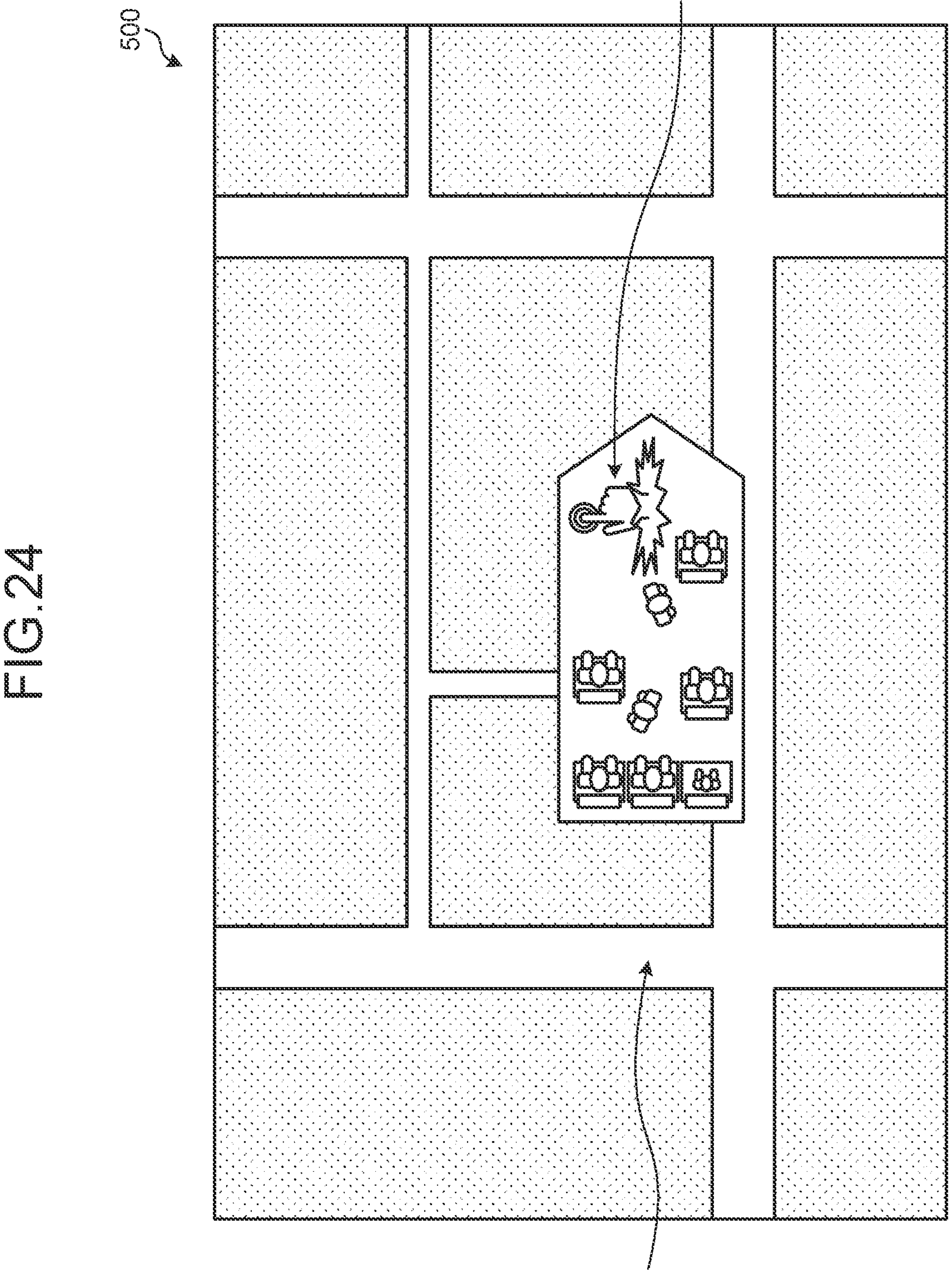
FIG. 24 is an explanatory diagram (part 3) for explaining then example of the HMI according to the second embodiment of the present disclosure.

For example, in the example illustrated in FIG. 24, the symbol 550 indicating the supported vehicle 1 that performs the remote steering is displayed on the monitor 500 together with the map of the in-charge area where control is performed. Further, in the example illustrated in FIG. 24, a symbol 572 indicating that a button for requesting support from the inside of the vehicle has been operated flashes together with the symbol 550 of the supported vehicle 1. In the present embodiment, by visually recognizing such flashing, the controller and the operator can intuitively recognize a request for support from a passenger. Note that, in the present embodiment, even in the case of a support request from the same passenger, a request transmitted in response to operation of emergently stopping the supported vehicle 1 and a support request not involving emergent stop operation may be distinguished and displayed, thereby leading to a more accurate and quick response.

Figure 25:
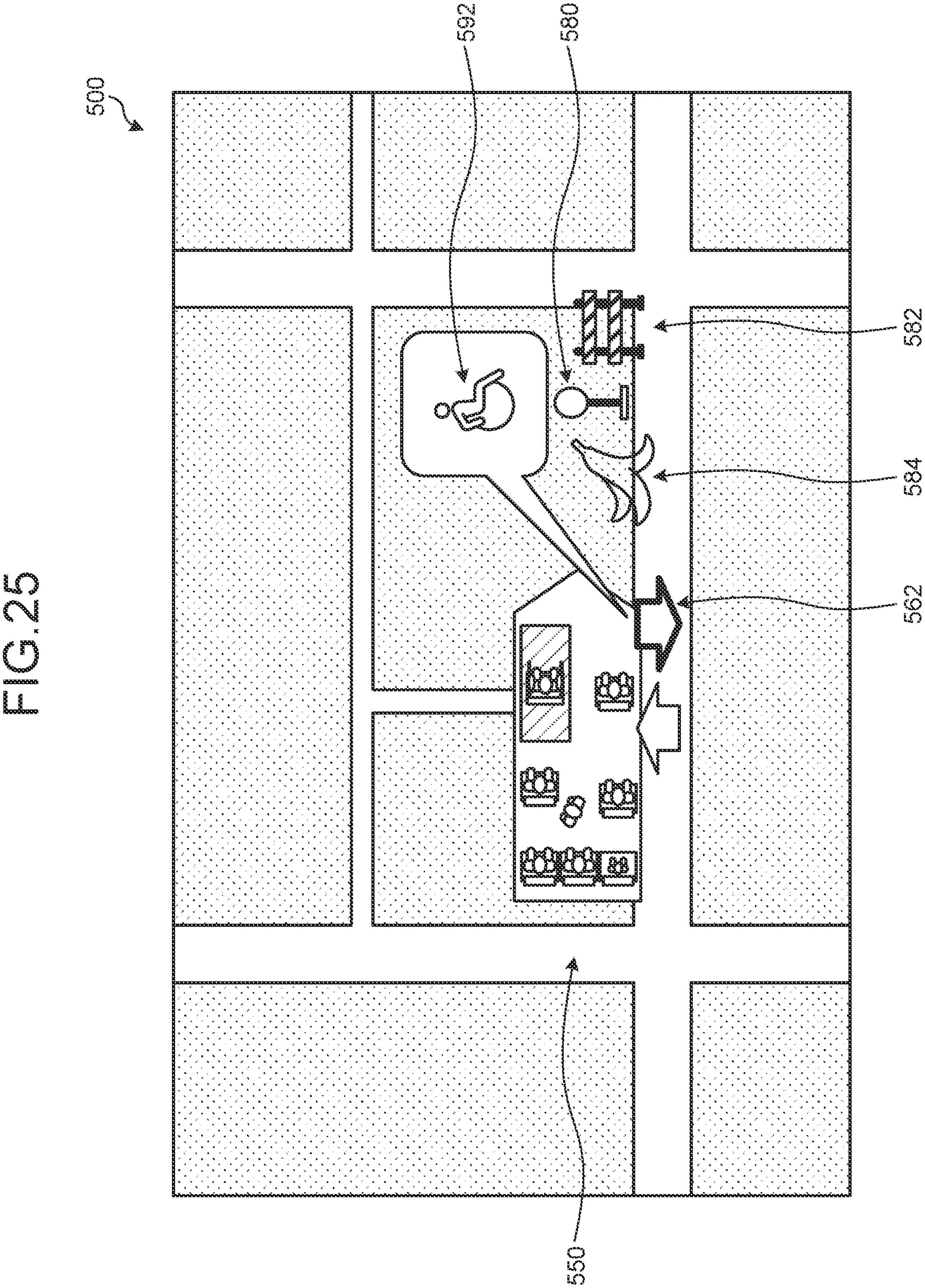
FIG. 25 is an explanatory diagram (part 4) for explaining the example of the HMI according to the second embodiment of the present disclosure.

Further, for example, in the example illustrated in FIG. 25, the symbol 550 indicating the supported vehicle 1 that performs the remote steering is displayed on the monitor 500 together with the map of the in-charge area where control is performed. Specifically, in the example illustrated in FIG. 25, an arrow-shaped symbol 562 indicating that support is necessary at the time of getting off flashes together with the symbol 550 of the supported vehicle 1. The symbol 580 indicating a position of a station flashes to indicate in a position of which station support is necessary. Further, a symbol 582 indicating that construction is being performed around the station and a symbol 584 indicating a slippery state due to rainfall are also displayed. Further, in the example illustrated in FIG. 25, by performing operation to obtain detailed information, the operator can display a symbol 592 indicating a situation of a passenger who needs support. For example, in the example illustrated in FIG. 25, a symbol 592 indicates that a passenger who needs support is a person who uses a wheelchair. These illustrated display examples are exemplary for explaining functions. When the present embodiment is widely used in the society in the future, it is preferable to use a highly intuitive symbol that can be incorporated as a universal design.

Figure 26:
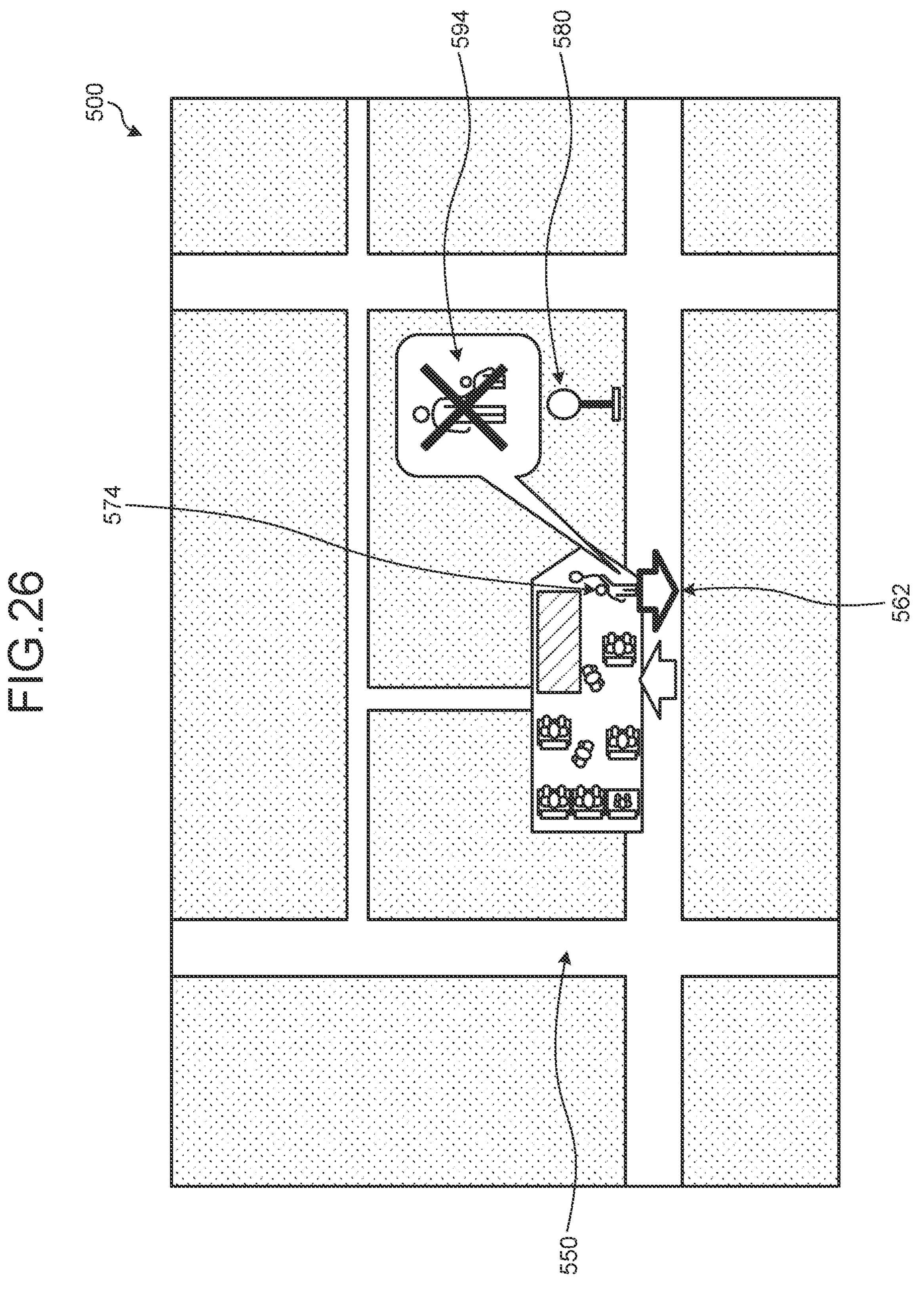
FIG. 26 is an explanatory diagram (part 5) for explaining the example of the HMI according to the second embodiment of the present disclosure.

For example, in the example illustrated in FIG. 26, the symbol 550 indicating the supported vehicle 1 that performs the remote steering is displayed on the monitor 500 together with the map of the in-charge area where control is performed. Specifically, in the example illustrated in FIG. 26, the arrow-shaped symbol 562 indicating that support is necessary at the time of getting off flashes together with the symbol 550 of the supported vehicle 1. The symbol 580 indicating a position of a station is displayed to indicate in a position of which station support is necessary. Further, in the example illustrated in FIG. 26, by performing operation to obtain detailed information, the operator can display symbols 574 and 594 indicating a situation of a passenger who needs support. For example, in the example illustrated in FIG. 26, the symbol 574 indicates that a passenger who needs support is a child who gets off alone and the symbol 594 indicates that there is no adult who picks up the child at the time of getting off.

Figure 27:
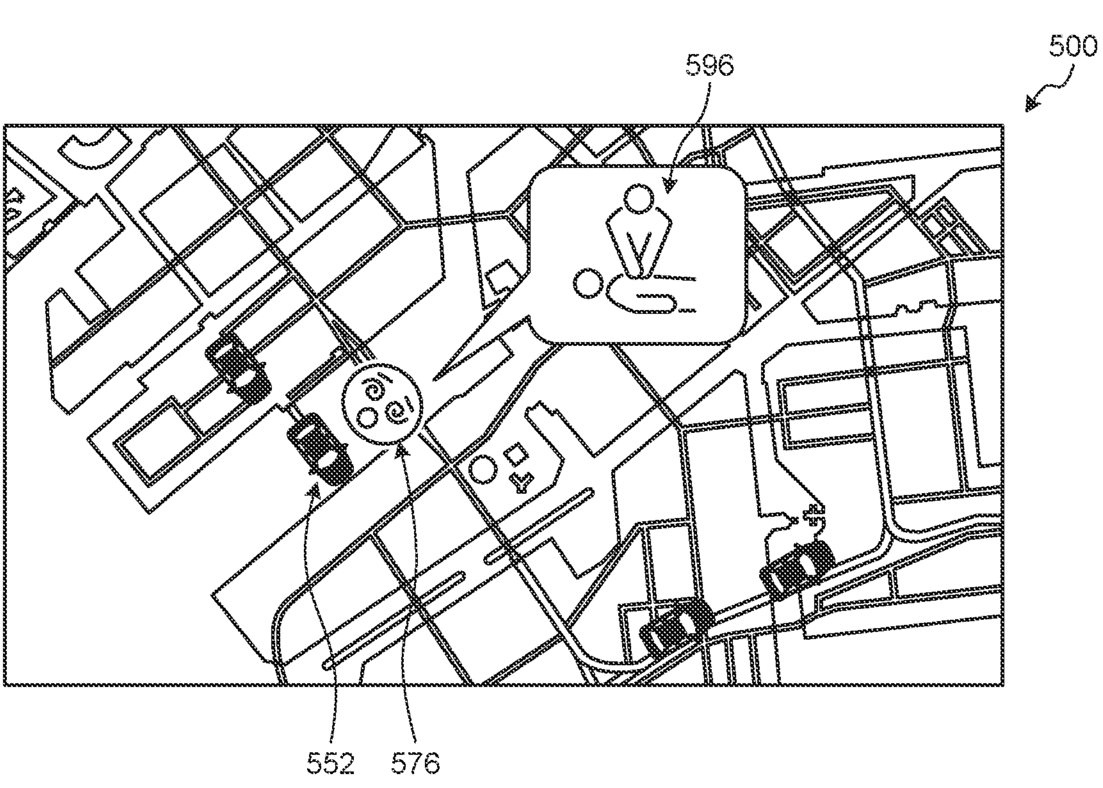
FIG. 27 is an explanatory diagram (part 6) for explaining the example of the HMI according to the second embodiment of the present disclosure.

For example, in the example illustrated in FIG. 27, a symbol 552 of a general vehicle indicating the supported vehicle 1 that performs the remote steering is displayed on the monitor 500 together with the map of the in-charge area where control is performed. Specifically, in the example illustrated in FIG. 27, a symbol 576 indicating that support is necessary flashes together with the symbol 552 of the supported vehicle 1. Further, in the example illustrated in FIG. 27, by performing operation to obtain detailed information, the operator can display a symbol 596 indicating a situation of a passenger who needs support. For example, in the example illustrated in FIG. 27, the symbol 596 indicates that a passenger who needs support has fallen into consciousness lowering or a respiratory failure. In the present embodiment, when an emergency support request indicating such information is generated, an information flag indicating a vehicle type of the supported vehicle 1 and a status of the passenger is displayed, whereby an important clue for determining priority of emergency handling is given to the operator and the like, leading to promptly determining priority order of actions that should be taken quickly such as preparation of a request for an ambulance, support in rushing to the nearest place, and an instruction to slow down the supported vehicle 1 to a safety point.

In the example explained above, the detailed information of the passenger who needs the support is displayed by the symbol. However, not only this, but, for example, the monitor 500 may display, according to a request of the operator, a moving image or a still image of the passenger which has a large amount of information, consumes a transmission band, and requires a lot of time for understanding and interpretation.

Note that the present embodiment is explained above with reference to, as an example, the case of the present embodiment is used in the remote steering of the ridesharing bus or the like in the automatic driving system. However, without being limited to such a case, the present embodiment can also be used at the time of remote support for work (assistance for an emergency case) by a driver in a mobile body (a bus, a train, and or like) of a public institution driven by a driver.

Even when a wide variety of mobile bodies such as public ridesharing buses are included in targets of the remote steering support, the controller and the operator are requested to quickly understand individual request contents intuitively from a support request instruction shown on the map in the service area and then perform handling. Further, in a situation in which there are a large number of players such as support by an operator, a controller, and an outsider, appropriate and prompt communication of handover of individual needs and situations of vehicle users is a key to appropriate operation. If information is not intuitively communicated by using the symbol or the like as explained in the embodiments of the present disclosure and operation is performed by relying on a moving image and direct interaction with individual passengers, an operation in which the operator or the controller carefully observes a moving image of passengers and the like and grasps needs that greatly fluctuate depending on customers and a situation requiring support is indispensable. In order to perform the remote steering support without delay, the number of the supported vehicles 1 that can be handled by a person such as a controller or an operator is markedly limited. Therefore, in order to commercially establish such a service of the remote steering support, almost all handlings can be performed irrespective of what kind of a situation the automatic driving system is in. Social introduction of automatic driving cannot be performed, unless the technology that brings about a situation in which the number of the above-mentioned requests decreases is established.

8. Summary

As explained above, the embodiments of the present disclosure enables the operator to accurately grasp the situation of the vehicle 1, the situation around the vehicle 1, the risk of the road section where the vehicle 1 travels and enters, and the like at an early stage and start appropriate remote steering without panicking. That is, the embodiments of the present disclosure enables the operator to grasp the situation of the vehicle 1 and the situation around the vehicle 1 early and accurately and shift to appropriate remote steering.

Note that, in the embodiments of the present disclosure, the automobile is explained as an example. However, the present embodiments are not limited to be applied to the automobile and can be applied to mobile bodies such as an automobile, an electric automobile, a hybrid electric automobile, a motorcycle, a personal mobility, an airplane, a ship, a construction machine, and an agricultural machine (a tractor). That is, the embodiments of the present disclosure can also be applied to remote steering operations of various mobile bodies and the like.

In the embodiments explained in the present specification, the remote operator effectively functioning in various scenes of performing movement support is established by not only support implementation equipment of the supported vehicle 1 but also cooperative data exchange with various kinds of road use and maintenance equipment such as prior information obtained from other peripheral vehicles, prior support information obtained from a leading vehicle, and a risk notification function and is supported by this mutual support ecosystem organically functioning.

9. Hardware Configuration

Figure 28:
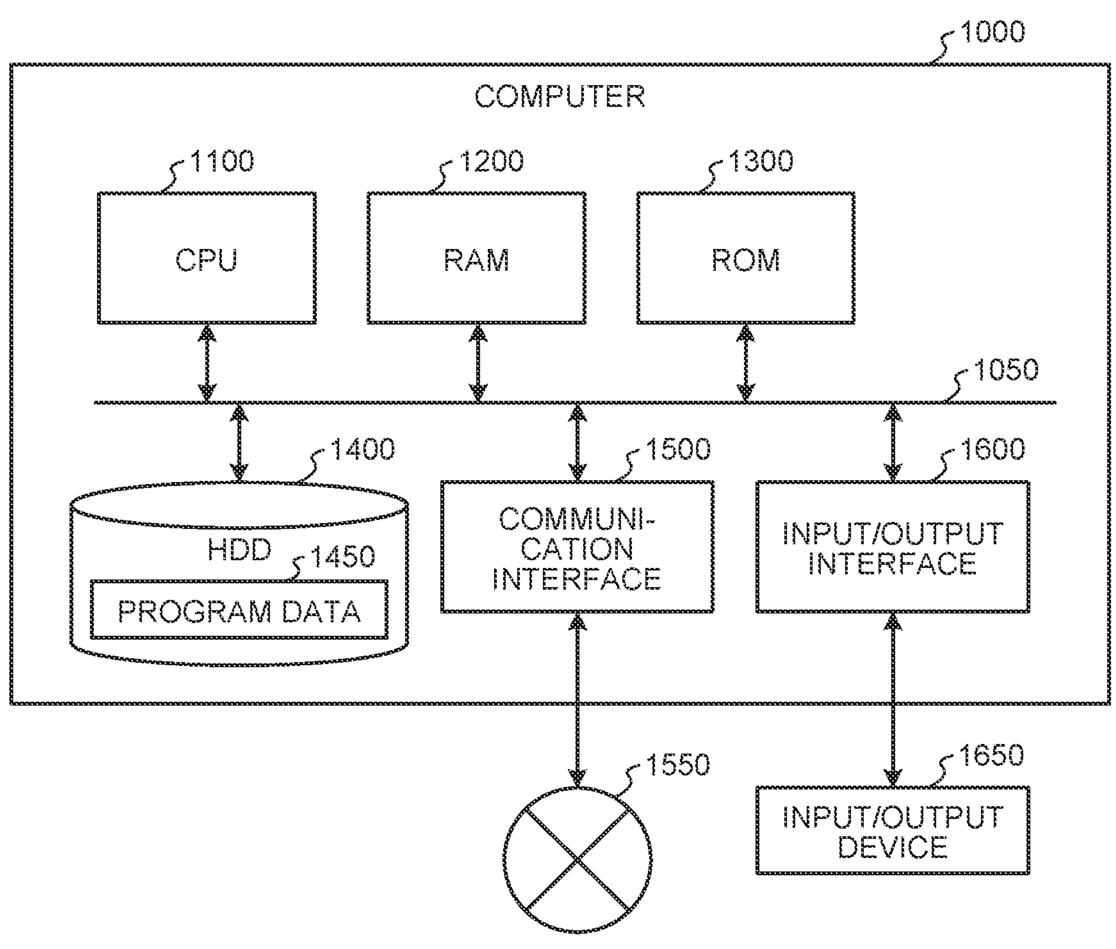
FIG. 28 is a hardware configuration diagram illustrating an example of a computer 1000 that implements at least a part of functions of a server 100.

The entire or a part of the control unit according to the embodiments explained above is realized by, for example, a computer 1000 having a configuration as illustrated in FIG. 28. FIG. 28 is a hardware configuration diagram illustrating an example of the computer 1000 that implements at least some functions of the server 100. The computer 1000 includes a CPU 1100, a RAM 1200, a read only memory (ROM) 1300, a hard disc drive (HDD) 1400, a communication interface 1500, and an input/output interface 1600. The units of the computer 1000 are connected by a bus 1050.

The CPU 1100 operates based on programs stored in the ROM 1300 or the HDD 1400 and controls the units. For example, the CPU 1100 develops the programs stored in the ROM 1300 or the HDD 1400 in the RAM 1200 and executes processing corresponding to various programs.

The ROM 1300 stores a boot program such as a basic input output system (BIOS) executed by the CPU 1100 at a start time of the computer 1000, a program depending on hardware of the computer 1000, and the like.

The HDD 1400 is a computer-readable recording medium that non-transiently records a program to be executed by the CPU 1100, data to be used by such a program, and the like. Specifically, the HDD 1400 is a recording medium that records an information processing program according to the present disclosure, which is an example of program data 1450.

The communication interface 1500 is an interface for the computer 1000 to be connected to an external network 1550 (for example, the Internet). For example, the CPU 1100 receives data from other equipment and transmits data generated by the CPU 1100 to the other equipment via the communication interface 1500.

The input/output interface 1600 is an interface for connecting an input/output device 1650 and the computer 1000. For example, the CPU 1100 receives data from an input/output device 1650 such as a keyboard, a mouse, or a microphone via the input/output interface 1600. The CPU 1100 transmits data to an output device such as a display, a speaker, or a printer via the input/output interface 1600. The input/output interface 1600 may function as a media interface that reads a program or the like recorded in a predetermined recording medium (a medium). The medium is, for example, an optical recording medium such as a digital versatile disc (DVD) or a phase change rewritable Disk (PD), a magneto-optical recording medium such as a magneto-optical disk (MO), a tape medium, a magnetic recording medium, or a semiconductor memory.

For example, when the computer 1000 functions as at least a part of the server 100 according to the embodiments of the present disclosure, the CPU 1100 of the computer 1000 executes a program stored in the RAM 1200 to thereby implement the functions of the pairing unit 120, the steering information generation unit 122, and the like. An information processing program and the like according to the present disclosure are stored in the HDD 1400. Note that the CPU 1100 reads the program data 1450 from the HDD 1400 and executes the program data. However, as another example, the CPU 1100 may acquire these programs from another device via the external network 1550.

The server 100 and the like according to the present embodiments may be applied to a system including a plurality of devices based on connection to a network (or communication among devices) such as Cloud computing. That is, the server 100 according to the present embodiments explained above can be implemented as, for example, the information processing system according to the present embodiments by a plurality of devices. An example of at least a part of the hardware configuration of the server 100 is explained above. The components explained above may be configured using general-purpose members or may be configured by hardware specialized for the functions of the components. Such a configuration can be changed as appropriate according to a technical level at each time to be implemented.

10. Supplement

Note that the embodiment of the present disclosure explained above can include, for example, an information processing method executed by the information processing device or the information processing system explained above, a program for causing the information processing device to function, and a non-transitory tangible medium in which the program is recorded. The program may be distributed via a communication line (including wireless communication) such as the Internet.

The steps in the information processing method in the embodiment of the present disclosure explained above may not always be processed according to the described order. For example, the steps may be processed with the order changed as appropriate. The steps may be partially processed in parallel or individually instead of being processed in time series. Further, the processing of the steps may not always be processed according to the described method and may be processed by, for example, another functional unit according to another method.

The preferred embodiment of the present disclosure is explained in detail above with reference to the accompanying drawings. However, the technical scope of the present disclosure is not limited to such an example. It is evident that those having the ordinary knowledge in the technical field of the present disclosure can arrive at various alterations or corrections within the category of the technical idea described in claims. It is understood that these alterations and corrections naturally belong to the technical scope of the present disclosure.

The effects described in the present specification are only explanatory or illustrative and are not limiting. That is, the technique according to the present disclosure can achieve other effects obvious for those skilled in the art from the description of the present specification together with or instead of the effects described above.

Note that the present technique can also take the following configurations.

(1) An information processing system for performing remote steering of a mobile body, the information processing system comprising:

- an information acquisition unit that acquires information concerning the mobile body and information concerning a periphery of the mobile body; and
- an information generation unit that generates, based on the acquired information, tactile information for performing the remote steering and presents, via an interface corresponding to the tactile information, the generated tactile information to an operator who performs the remote steering.

(2) The information processing system according to (1), wherein the information generation unit generates, based on the acquired information, visual information and auditory information for performing the remote steering and presents, via an interface corresponding to a type of sensation of these kinds of information, the generated visual information and the generated auditory information to the operator who performs the remote steering.

(3) The information processing system according to (2), wherein the information generation unit sequentially presents a plurality of kinds of generated information in order determined based on a thought load of the operator in the remote steering.

(4) The information processing system according to (3), wherein the information generation unit presents information concerning a situation of a route of the mobile body and information concerning a moving body characteristic of the mobile body before presenting an image of the periphery of the mobile body.

(5) The information processing system according to (4), wherein the information concerning the situation of the route of the mobile body includes at least one of a congestion situation of the route, a speed limit, cruising speed, obstacle position information, risk information, position information of an emergency evacuation space, position information of peripheral vehicles, and position information of a support vehicle.

(6) The information processing system according to any one of (2) to (5), wherein the visual information includes symbol display.

(7) The information processing system according to any one of (2) to (6), wherein the auditory information includes environmental sound in the mobile body or environmental sound around the mobile body.

(8) The information processing system according to any one of (2) to (7), wherein the tactile information is presented via a steering wheel, a lever, or a seat operated by the operator.

(9) The information processing system according to (8), wherein the moving body characteristic of the mobile body is presented to the operator as the tactile information via the steering wheel or the lever.

(10) The information processing system according to any one of (2) to (9), further comprising an operator information acquisition unit that acquires information concerning steering control of the operator, wherein the information generation unit generates at least one of the visual information, the auditory information, and the tactile information based on the remote steering of the operator.

(11) The information processing system according to (10), wherein the visual information includes VR display based on the remote steering of the operator.

(12) The information processing system according to (10) or (11), wherein the auditory information includes false sound based on the remote steering of the operator.

(13) The information processing system according to any one of (10) to (12), wherein the tactile information includes pseudo vibration or pseudo weighting based on the remote steering of the operator.

(14) The information processing system according to any one of (10) to (13), further comprising a control unit that controls the mobile body based on a remote steering amount of the operator, wherein

- the control unit corrects the remote steering amount according to a moving body characteristic of the mobile body or a cargo amount of the mobile body.

(15) The information processing system according to any one of (1) to (14), wherein the mobile body is a mobile body on which an automatic driving control device is mounted.

(16) The information processing system according to (15), wherein

- the information acquisition unit acquires a remote steering support request from a driver of the mobile body and information concerning an automatic driving level allocated to a route of the mobile body, and the information generation unit generates information concerning a grace time until a start of support of the mobile body and presents the information to the operator.

(17) The information processing system according to (16), wherein the grace time is displayed by a symbol of a timer.

(18) The information processing system according to (16) or (17), wherein the information acquisition unit acquires sensing data indicating a state of one or a plurality of passengers in the mobile body, and the information generation unit generates, based on the acquired sensing data, passenger information concerning the passenger who is in a predetermined state to be noted at a time of the remote steering and presents the generated passenger information to the operator via the interface.

(19) The information processing system according to (18), further including a storage unit that stores the sensing data or the passenger information in order to provide the sensing data or the passenger information for next use of the mobile body by the passenger.

(20) The information processing system according to (19), wherein the sensing data or the passenger information is stored in the storage unit to be linked with identification information of a ticket owned by the passenger together with a handling history for the passenger at a time of using the mobile body.

(21) The information processing system according to any one of (18) to (20), wherein the passenger information is presented to the operator by a first symbol corresponding to a superordinate concept of the passenger information.

(22) The information processing system according to any one of (18) to (21), wherein the information generation unit generates passenger information on the passenger by indexing a level of support for the passenger based on the acquired sensing data.

(23) An information processing device for performing remote steering of a mobile body, the information processing device comprising:

an information acquisition unit that acquires information concerning the mobile body and information concerning a periphery of the mobile body; and an information generation unit that generates, based on the acquired information, tactile information for performing the remote steering and presents the generated tactile information to an operator who performs the remote steering via an interface corresponding to the tactile information.

REFERENCE SIGNS LIST

1 VEHICLE
11 VEHICLE CONTROL SYSTEM
21 VEHICLE CONTROL ECU (Electronic Control Unit)
22 COMMUNICATION UNIT
23 MAP INFORMATION ACCUMULATION UNIT
24 POSITION INFORMATION ACQUISITION UNIT
25 EXTERNAL RECOGNITION SENSOR
26 IN-VEHICLE SENSOR
27 VEHICLE SENSOR
28 STORAGE UNIT
29 TRAVELING SUPPORT/AUTOMATIC DRIVING CONTROL UNIT
30 DRIVER MONITORING SYSTEM (DMS)
31 HUMAN MACHINE INTERFACE (HMI)
32 VEHICLE CONTROL UNIT
41 COMMUNICATION NETWORK
51 CAMERA
52 RADAR
53 LiDAR
54 ULTRASONIC SENSOR
61 ANALYSIS UNIT
62 ACTION PLANNING UNIT
63 OPERATION CONTROL UNIT
71 SELF-POSITION ESTIMATION UNIT
72 SENSOR FUSION UNIT
73 RECOGNITION UNIT
81 STEERING CONTROL UNIT
82 BRAKE CONTROL UNIT
83 DRIVE CONTROL UNIT
84 BODY SYSTEM CONTROL UNIT
85 LIGHT CONTROL UNIT
86 HORN CONTROL UNIT
100 SERVER
102 VEHICLE DATA ACQUISITION UNIT
104 SURROUNDING ENVIRONMENT DATA ACQUISITION UNIT
110 OPERATOR DATA ACQUISITION UNIT
120 PAIRING UNIT
122 STEERING INFORMATION GENERATION UNIT
124 DRIVER CONDITION CHECK UNIT
500, 510, 602, 604, 606 MONITOR
520 ENLARGED MAP
550, 552, 560, 562, 570, 572, 574, 576, 580, 582, 584, 590, 592, 594, 596 SYMBOL
600 MONITOR GROUP
610 STEERING WHEEL
900, 902, 906, 908, 910 ICON

The invention claimed is:

1. An information processing system, comprising:

a central processing unit (CPU) configured to:

acquire first information that is associated with a mobile body;

acquire second information that is associated with a periphery of the mobile body;

generate, based on each of the acquired first information and the acquired second information, a plurality of types of information that is associated with a remote steering of the mobile body, wherein the plurality of types of information includes tactile information associated with the remote steering of the mobile body;

determine information associated with an operator based on a plurality of monitored evaluations associated with the operator wherein the plurality of monitored evaluations include a line-of-sight evaluation associated with the operator, a drowsiness evaluation associated with the operator, a perspiration evaluation associated with the operator, a heart rate evaluation associated with the operator, a health abnormality evaluation associated with the operator, and a thought floating evaluation associated with the operator, and the operator performs the remote steering of the mobile body;

determine an order of a presentation of the plurality of types of information based on the determined information associated with the operator; and present, via a plurality of interfaces that corresponds to a plurality of types of sensations that is associated with the plurality of types of information, the plurality of types of information to the operator in a sequence based on the determined order.

2. The information processing system according to claim 1, wherein the plurality of types of information further includes each of visual information and auditory information, each of the visual information and the auditory information is associated with the remote steering of the mobile body, and the CPU is further configured to:

present, via a first interface of the plurality of interfaces that corresponds to a first type of sensation that is associated with the visual information, the visual information to the operator, wherein the plurality of types of sensations includes the first type of sensation; and present, via a second interface of the plurality of interfaces that corresponds to a second type of sensation that is associated with the auditory information, the auditory information to the operator, wherein the plurality of types of sensations includes the second type of sensation.

3. The information processing system according to claim 2, wherein the visual information includes a symbol that is associated with the mobile body.

4. The information processing system according to claim 2, wherein the auditory information includes one of a first environmental sound within the mobile body or a second environmental sound around the mobile body.

5. The information processing system according to claim 2, wherein the tactile information is presented via at least one of a steering wheel operated by the operator, a lever operated by the operator, or a seat operated by the operator.

6. The information processing system according to claim 2, wherein the CPU is further configured to:

acquire third information that is associated with a steering control of a steering wheel operated by the operator; and generate at least one of the visual information, the auditory information, or the tactile information based on the third information.

7. The information processing system according to claim 6, wherein the visual information includes information associated with a virtual reality (VR) display based on the remote steering of the mobile body.

8. The information processing system according to claim 6, wherein the auditory information includes a false sound that is associated with the remote steering of the mobile body.

9. The information processing system according to claim 6, wherein, the tactile information includes one of a pseudo vibration or a pseudo weighting, and each of the pseudo vibration and the pseudo weighting is associated with the remote steering of the mobile body.

10. The information processing system according to claim 6, the CPU is further configured to:

control the mobile body based on a remote steering amount that is associated with the remote steering of the mobile body by the operator; and correct the remote steering amount based on one of a moving body characteristic of the mobile body or a cargo amount of the mobile body.

11. The information processing system according to claim 1, wherein the CPU is further configured to:

present third information to the operator at a first time period, wherein the third information is associated with a situation of a route of the mobile body;

present fourth information to the operator at a second time period, wherein the fourth information is associated with a moving body characteristic of the mobile body; and present, at a third time period, an image of the periphery of the mobile body to the operator, wherein the third time period is subsequent to each of the second time period and the first time period.

12. The information processing system according to claim 11, wherein the third information includes at least one of a congestion situation of the route, a speed limit associated with the mobile body, a cruising speed associated with the mobile body, obstacle position information associated with the mobile body, risk information associated with the mobile body, position information of an emergency evacuation space, position information of a plurality of peripheral vehicles that surrounds the mobile body, or position information of a support vehicle associated with the mobile body.

13. The information processing system according to claim 1, wherein the CPU is further configured to present, as the tactile information, a moving body characteristic of the mobile body to the operator via one of a steering wheel operated by the operator or a lever operated by the operator.

14. The information processing system according to claim 1, wherein the mobile body includes an automatic driving control device, and the automatic driving control device is on the mobile body.

15. The information processing system according to claim 14, wherein the CPU is further configured to:

acquire a remote steering support request from a driver of the mobile body;

acquire third information associated with an automatic driving level that is associated with a route of the mobile body, wherein the driver of the mobile body is different from the operator of the mobile body;

generate fourth information that includes a grace time, wherein the grace time is a time period from a time of the acquisition of the remote steering support request to a start time of the remote steering of the mobile body; and present the generated fourth information to the operator.

16. The information processing system according to claim 15, wherein the CPU is further configured to present the grace time as a symbol of a timer.

17. The information processing system according to claim 15, wherein the CPU is further configured to:

acquire sensing data that indicates a state of at least one of a plurality of passengers in the mobile body;

generate, based on the acquired sensing data, passenger information that is associated with a specific passenger of the plurality of passengers, wherein the passenger information indicates that the specific passenger is in a specific state at a time of the remote steering; and present, via at least one interface of the plurality of interfaces, the generated passenger information to the operator.

18. An information processing device, comprising:

a central processing unit (CPU) configured to:

acquire first information that is associated with a mobile body;

acquire second information that is associated with a periphery of the mobile body;

generate, based on each of the acquired first information and the acquired second information, a plurality of types of information that is associated with a remote steering of the mobile body, wherein the plurality of types of information includes tactile information associated with the remote steering of the mobile body;

determine information associated with an operator based on a plurality of monitored evaluations associated with the operator wherein the plurality of monitored evaluations include a line-of-sight evaluation associated with the operator, a drowsiness evaluation associated with the operator, a perspiration evaluation associated with the operator, a heart rate evaluation associated with the operator, a health abnormality evaluation associated with the operator, and a thought floating evaluation associated with the operator, and the operator performs the remote steering of the mobile body;

determine an order of a presentation of the plurality of types of information based on the determined information associated with the operator; and present, via a plurality of interfaces that corresponds to a plurality of types of sensations that is associated with the plurality of types of information, the plurality of types of information to the operator in a sequence based on the determined order.

* * * * *